United States Patent
Park

(10) Patent No.: US 11,973,542 B2
(45) Date of Patent: Apr. 30, 2024

(54) METHOD FOR CONTROLLING COMMUNICATION CONNECTION IN WIRELESS POWER TRANSMISSION SYSTEM, AND APPARATUS THEREFOR

(71) Applicant: LG ELECTRONICS INC., Seoul (KR)

(72) Inventor: Joonho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

(21) Appl. No.: 17/594,212

(22) PCT Filed: Apr. 17, 2020

(86) PCT No.: PCT/KR2020/005153
§ 371 (c)(1),
(2) Date: Oct. 6, 2021

(87) PCT Pub. No.: WO2020/213980
PCT Pub. Date: Oct. 22, 2020

(65) Prior Publication Data
US 2022/0182102 A1 Jun. 9, 2022

(30) Foreign Application Priority Data

Apr. 17, 2019 (KR) .................. 10-2019-0044853
Apr. 25, 2019 (KR) .................. 10-2019-0048487

(51) Int. Cl.
*H02J 50/80* (2016.01)
*H04B 5/00* (2006.01)
(Continued)

(52) U.S. Cl.
CPC ............ *H04B 5/0037* (2013.01); *H02J 50/80* (2016.02); *H04W 52/383* (2013.01); *H02J 50/12* (2016.02)

(58) Field of Classification Search
CPC .... H04B 5/0037; H04W 52/383; H02J 50/80; H02J 50/12
See application file for complete search history.

(56) References Cited

U.S. PATENT DOCUMENTS 5,991,639 A * 11/1999 Rautiola ............ H04Q 11/0478
455/445
8,831,677 B2 * 9/2014 Villa-Real ............... H04M 1/66
455/552.1
(Continued)

FOREIGN PATENT DOCUMENTS

KR 1020160125048 10/2016
KR 101896902 9/2018
(Continued)

OTHER PUBLICATIONS

PCT International Application No. PCT/KR2020/005153, International Search Report dated Aug. 6, 2020, 16 pages.

*Primary Examiner* — Hai V Nguyen
(74) *Attorney, Agent, or Firm* — LEE, HONG, DEGERMAN, KANG & WAIMEY

(57) ABSTRACT

The present invention relates to wireless power transmission. A method for controlling a communication connection for a wireless charging device supporting in-band communication and out-band communication, according to an embodiment of the present invention, may comprise: a step of receiving a first packet from a device through in-band communication; a step of generating a power transmission contract on the basis of the first packet; a step of performing an out-band communication connection on the basis of the power transmission contract; a step of controlling power by using out-band communication when the out-band communication connection is successful.

10 Claims, 30 Drawing Sheets

(51) Int. Cl.
*H04W 52/38* (2009.01)
*H02J 50/12* (2016.01)

(56) References Cited

U.S. PATENT DOCUMENTS

| | | | | |
|---|---|---|---|---|
| 9,642,006 | B2* | 5/2017 | Bronk | H02J 50/10 |
| 10,186,892 | B2* | 1/2019 | Hosseini | H04W 8/005 |
| 10,271,359 | B2* | 4/2019 | Bernsen | H04L 63/0492 |
| 10,559,984 | B2* | 2/2020 | Shichino | H02J 50/90 |
| 10,651,694 | B2* | 5/2020 | Park | H02J 50/80 |
| 10,749,384 | B2* | 8/2020 | Park | H02J 50/90 |
| 10,749,574 | B2* | 8/2020 | Park | H02J 50/402 |
| 10,979,994 | B2* | 4/2021 | Shan | H04W 60/00 |
| 10,986,602 | B2* | 4/2021 | Shan | H04W 12/06 |
| 10,998,775 | B2* | 5/2021 | Park | H04W 12/062 |
| 11,005,294 | B2* | 5/2021 | Kang | H02J 50/80 |
| 11,005,307 | B2* | 5/2021 | Park | H02J 50/12 |
| 11,063,636 | B2* | 7/2021 | Park | H04W 36/14 |
| 11,289,954 | B2* | 3/2022 | Park | H04L 5/0055 |
| 11,316,384 | B2* | 4/2022 | Park | H02J 50/60 |
| 11,387,687 | B2* | 7/2022 | Lee | H02J 7/0047 |
| 11,405,873 | B2* | 8/2022 | Park | H02J 50/12 |
| 11,469,627 | B2* | 10/2022 | Choi | H02J 50/90 |
| 11,509,173 | B2* | 11/2022 | Chung | H02J 50/80 |
| 11,527,924 | B2* | 12/2022 | Park | H02J 50/80 |
| 11,552,504 | B2* | 1/2023 | Park | H02J 50/80 |
| 11,641,220 | B2* | 5/2023 | Park | H02J 7/00045 |
| | | | | 726/6 |
| 11,652,369 | B2* | 5/2023 | Leabman | H02J 50/20 |
| | | | | 307/104 |
| 11,657,137 | B2* | 5/2023 | Lee | H04L 67/02 |
| | | | | 726/2 |
| 11,658,520 | B2* | 5/2023 | Park | H02J 50/402 |
| | | | | 307/104 |
| 11,707,996 | B2* | 7/2023 | Waters | H02J 50/90 |
| | | | | 320/108 |
| 11,715,980 | B2* | 8/2023 | Johnston | G01K 7/22 |
| | | | | 307/149 |
| 11,715,982 | B2* | 8/2023 | Park | H04W 12/069 |
| | | | | 307/142 |
| 11,727,741 | B2* | 8/2023 | Kyung | H04W 4/80 |
| | | | | 340/5.61 |
| 11,736,146 | B2* | 8/2023 | Park | H02J 50/12 |
| | | | | 340/12.5 |
| 2012/0329405 | A1* | 12/2012 | Lee | H02J 50/12 |
| | | | | 455/73 |
| 2015/0350820 | A1* | 12/2015 | Son | H04W 12/03 |
| | | | | 455/41.2 |
| 2016/0050563 | A1* | 2/2016 | Bronk | H04L 63/062 |
| | | | | 726/7 |
| 2016/0126749 | A1* | 5/2016 | Shichino | H04B 5/0081 |
| | | | | 307/104 |
| 2016/0278006 | A1* | 9/2016 | Lee | H04W 12/04 |
| 2017/0070101 | A1* | 3/2017 | Kim | H02J 50/12 |
| 2017/0187223 | A1* | 6/2017 | Hosseini | H02J 50/20 |
| 2017/0324279 | A1* | 11/2017 | Kang | H02J 50/80 |
| 2018/0123379 | A1* | 5/2018 | Ha | H02J 50/20 |
| 2018/0316388 | A1* | 11/2018 | Lee | H04W 4/50 |
| 2018/0375368 | A1* | 12/2018 | Leabman | H04B 1/3883 |
| 2019/0006891 | A1* | 1/2019 | Park | H02J 50/80 |
| 2019/0102837 | A1* | 4/2019 | Smith | G06Q 20/223 |
| 2019/0174449 | A1* | 6/2019 | Shan | H04W 60/04 |
| 2019/0260241 | A1* | 8/2019 | Park | H02J 7/02 |
| 2019/0296799 | A1* | 9/2019 | Park | H04L 27/12 |
| 2019/0342851 | A1* | 11/2019 | Shan | H04W 76/11 |
| 2019/0386513 | A1* | 12/2019 | Bavisi | H02J 50/80 |
| 2020/0036212 | A1* | 1/2020 | Choi | H02J 50/80 |
| 2020/0161907 | A1* | 5/2020 | Yang | H02J 50/10 |
| 2020/0202465 | A1* | 6/2020 | Massover | G06F 21/6272 |
| 2020/0252886 | A1* | 8/2020 | Park | H04W 52/286 |
| 2020/0274401 | A1* | 8/2020 | Park | H02J 13/00026 |
| 2020/0280198 | A1* | 9/2020 | Kwon | H02J 50/10 |
| 2020/0336021 | A1* | 10/2020 | Park | H04W 12/062 |
| 2020/0382166 | A1* | 12/2020 | Park | H02J 50/10 |
| 2020/0389060 | A1* | 12/2020 | Park | G06F 1/266 |
| 2021/0036555 | A1* | 2/2021 | Park | H04L 9/40 |
| 2021/0064736 | A1* | 3/2021 | Lee | H04W 12/06 |
| 2021/0257867 | A1* | 8/2021 | Park | H02J 50/12 |
| 2021/0265869 | A1* | 8/2021 | Kang | H02J 50/80 |
| 2021/0306036 | A1* | 9/2021 | Park | H02J 50/10 |
| 2021/0314899 | A1* | 10/2021 | Shan | H04W 60/04 |
| 2021/0352608 | A1* | 11/2021 | Chun | H04M 1/724 |
| 2022/0066456 | A1* | 3/2022 | Ebrahimi Afrouzi | |
| | | | | A47L 9/2873 |
| 2022/0077722 | A1* | 3/2022 | Seo | H02J 50/90 |
| 2022/0077893 | A1* | 3/2022 | Lim | H04W 36/03 |
| 2022/0085667 | A1* | 3/2022 | Park | H04B 5/0037 |
| 2022/0140628 | A1* | 5/2022 | Perri | H02J 7/00034 |
| | | | | 381/315 |
| 2022/0158493 | A1* | 5/2022 | Choi | H02J 50/10 |
| 2022/0190646 | A1* | 6/2022 | Park | H02J 50/12 |
| 2022/0200661 | A1* | 6/2022 | Lee | H04B 5/0037 |
| 2022/0216737 | A1* | 7/2022 | Park | H02J 50/80 |
| 2022/0239161 | A1* | 7/2022 | Park | H04L 9/40 |
| 2022/0278561 | A1* | 9/2022 | Choi | H02J 50/70 |
| 2022/0346032 | A1* | 10/2022 | Park | H04B 5/0081 |
| 2023/0084965 | A1* | 3/2023 | Park | H02J 50/40 |
| | | | | 307/149 |
| 2023/0134962 | A1* | 5/2023 | Lim | H02J 50/80 |
| | | | | 320/108 |
| 2023/0198318 | A1* | 6/2023 | Choi | H02J 50/10 |
| | | | | 320/108 |
| 2023/0208194 | A1* | 6/2023 | Lee | H04B 5/0037 |
| | | | | 320/108 |
| 2023/0246484 | A1* | 8/2023 | Park | H04L 67/303 |
| | | | | 320/108 |

FOREIGN PATENT DOCUMENTS

| | | |
|---|---|---|
| KR | 1020180125826 | 11/2018 |
| KR | 1020190000363 | 1/2019 |
| WO | 2018111921 | 6/2018 |

* cited by examiner

FIG. 3B

| b7 | b6 | b5 | b4 | b3 | b2 | b1 | b0 | |
|----|----|----|----|----|----|----|----|---|
| Application Profile ||||||||  Byte0 |
| Version ||||||||  Byte1 |
| Profile-specific data ||||||||  Byte 2~N-1 |

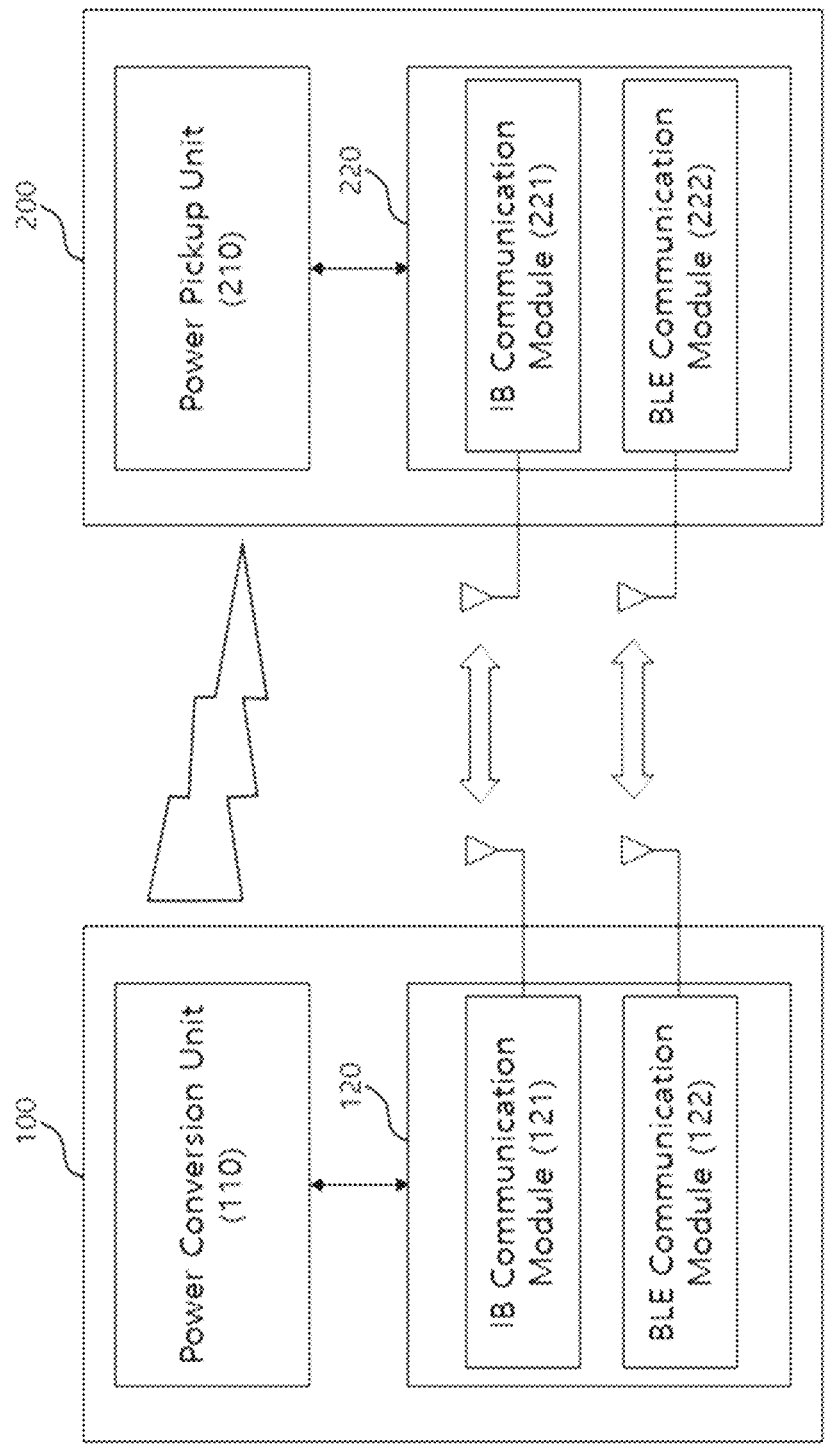

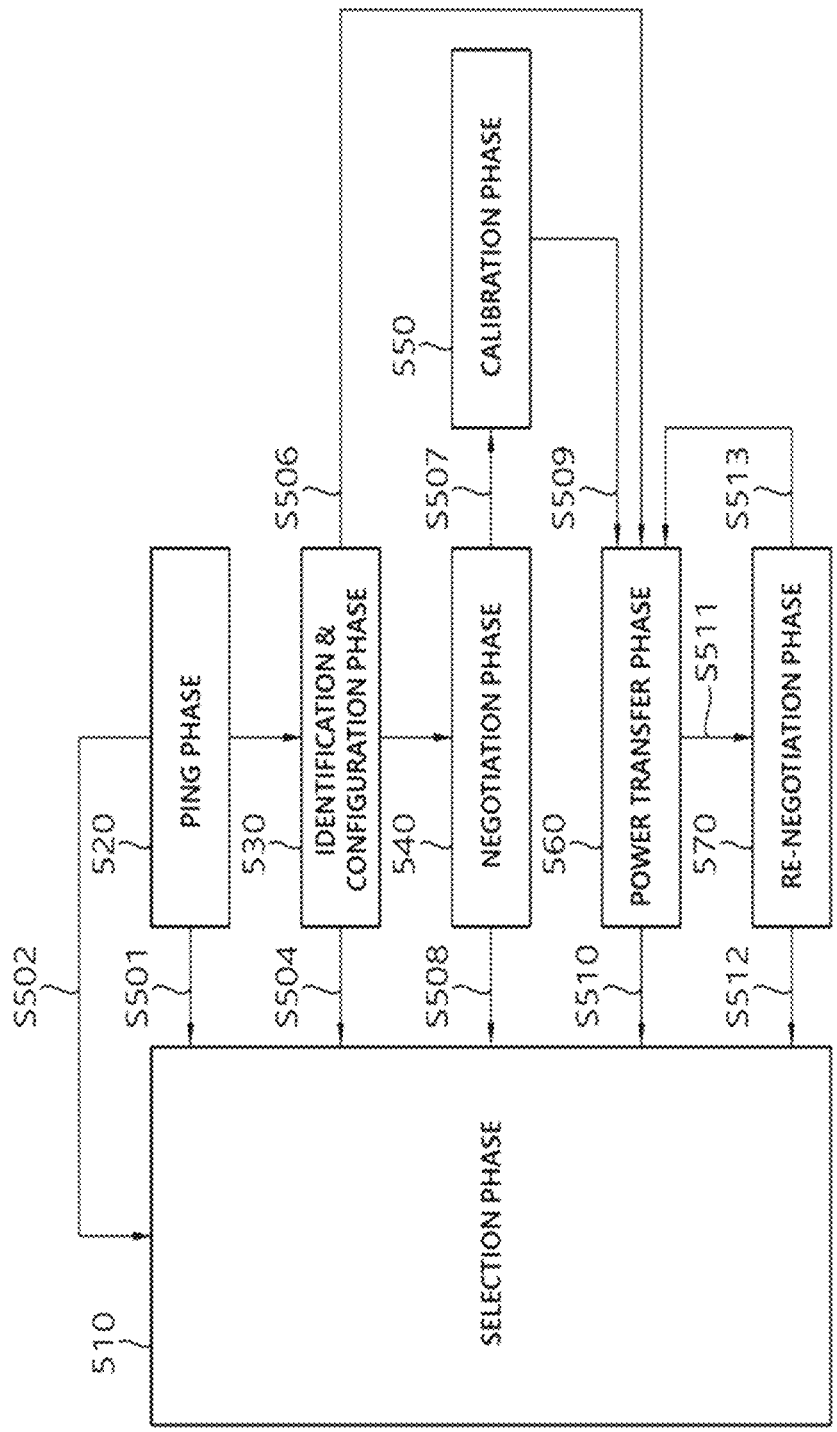

FIG. 10

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

FIG. 12

| | b7 | b6 | b5 | b4 | b3 | b2 | b1 | b0 |
|---|---|---|---|---|---|---|---|---|
| B0 | Qi Authentication Certificate Structure Version ||||||||
| B1 | Reserved |||||| PTx Leaf | Certificate Type |
| B2 | Signature Offset ||||||||
| B3 ... B11 | Serial Number (MSB ... LSB) ||||||||
| B12 ... B17 | Issuer ID ||||||||
| B18 ... B23 | Subject ID ||||||||
| B24 ... B56 | Public Key ||||||||
| B57 ... B120 | Signature ||||||||

FIG. 13

| | b7 | b6 | b5 | b4 | b3 | b2 | b1 | b0 |
|---|---|---|---|---|---|---|---|---|
| $B_0$ | Power Class | | Guaranteed Power Value | | | | | |
| $B_1$ | Reserved | | | Potential Power Value | | | | |
| $B_2$ | AI | AR | OB | Reserved | | | WPID | Not Res Sens |

FIG. 14

| | b7 | b6 | b5 | b4 | b3 | b2 | b1 | b0 |
|---|---|---|---|---|---|---|---|---|
| B₀ | Power Class | Maximum Power Value | | | | | | |
| B₁ | Reserved | | | | | | | |
| B₂ | Prop | AI | AR | OB | Zero | Count | | |
| B₃ | | | Window Size | | | | Window Offset | |
| B₄ | Neg | Polarity* | | Depth* | | Reserved | | |

FIG. 20

| PARAMETER | VALUE |
|---|---|
| GUARANTEED POWER | 5W |
| MAXIMUM POWER | DERIVED FROM THE MAXIMUM POWER VALUE CONTAINED IN THE CONFIGURATION PACKET |
| RECEIVED POWER PACKET FORMAT | HEADER OF THE 8-BIT RECEIVED POWER PACKET(0x04) |
| FSK POLARITY / MODULATION DEPTH | VALUE CONTAINED IN THE CONFIGURATION PACKET |
| BLE STATUS | BLE SUPPORT / BLE CONNECTION STATUS |

…

METHOD FOR CONTROLLING COMMUNICATION CONNECTION IN WIRELESS POWER TRANSMISSION SYSTEM, AND APPARATUS THEREFOR

CROSS-REFERENCE TO RELATED APPLICATIONS

This application is the National Stage filing under 35 U.S.C. 371 of International Application No. PCT/KR2020/005153, filed on Apr. 17, 2020, which claims the benefit of earlier filing date and right of priority to Korean Patent Application Nos. 10-2019-0044853, filed on Apr. 17, 2019, and 10-2019-0048487, filed on Apr. 25, 2019, the contents of which are all incorporated by reference herein in their entirety.

TECHNICAL FIELD

The present disclosure relates to wireless power transfer, and more particularly, to a method of controlling communication connection in a wireless power transfer system capable of in-band communication and out-band communication and apparatus therefor.

BACKGROUND ART

The wireless power transfer technology is a technology for wirelessly transferring power between a power source and an electronic device. For example, the wireless power transfer technology enables charging of the battery of a wireless terminal such as a smartphone or tablet by simply placing the wireless terminal on a wireless charging pad, thereby providing better mobility, convenience, and safety than wired charging using cable charging connectors. The wireless power transfer technology is attracting attention as a replacement for the wired power transfer system in various fields such as electric vehicles, wearable devices such as Bluetooth earphones and 3D glasses, home appliances, furniture, underground facilities, buildings, medical devices, robots, and leisure, in addition to wireless charging of wireless terminals.

The wireless power transfer method is also referred to as a contactless power transfer method, a power transfer method with no point of contact, or a wireless charging method. The wireless power transfer system includes a wireless power transmitter configured to supply electrical energy based on the wireless power transfer method and a wireless power receiver configured to receive the electrical energy wirelessly supplied from the wireless power transmitter and provide the power to a power receiving device such as a battery cell.

The wireless power transfer technology includes various power transfer methods: a power transfer method based on magnetic coupling, a power transfer method based on radio frequency (RF), a power transfer method based on microwaves, a power transfer method based on ultrasonic waves, and so on. The magnetic coupling-based method is further classified into a magnetic induction method and a magnetic resonance method. The magnetic induction method is a method of transferring energy based on a current induced in the coil of a receiver due to a magnetic field generated by the coil battery cell of the transmitter according to electromagnetic coupling between the coil of the transmitter and the coil of the receiver. The magnetic resonance method is similar to the magnetic induction method in that the magnetic field is used. However, the magnetic resonance method is different from the magnetic induction method in that resonance occurs when a specific resonant frequency is applied to the coil of the transmitter and the coil of the receiver.

DISCLOSURE

Technical Problem

One object of the present disclosure is to provide a wireless power transmitter, a wireless power transmission method, a wireless power receiver, a wireless power reception method, and a wireless charging system.

Another object of the present disclosure is to provide a method of controlling communication connection in a wireless power transfer system supporting in-band communication and out-band communication and apparatus therefor.

Another object of the present disclosure is to provide a method of controlling communication connection in a wireless power transfer system capable of performing handover between in-band and out-band independently of a wireless power state machine and apparatus therefor.

Another object of present disclosure is to provide a method of controlling communication connection in a wireless power transfer system capable of performing out-band reconnection at all phases based on a power transfer contract without initialization to a selection phase in handover failure from in-band to out-band by maintaining out-band support and connection state information in the power transfer contract and apparatus therefor.

Another object of the present disclosure is to provide a method of controlling communication connection in a wireless power transfer system capable of enhancing security due to a random MAC address transmitted by a wireless power receiver in in-band mode at all wireless charging phases and apparatus therefor.

Another object of the present disclosure is to provide a method of controlling communication connection in a wireless power transfer system capable of improving communication reliability by performing handover between in-band and out-band adaptively depending on changes in power demand, communication volume, and communication quality during wireless charging and apparatus therefor.

Another object of the present disclosure is a method of controlling communication connection in a wireless power transfer system capable of preventing wireless charging interruption and improve charging speeds by enabling fast and repeatable reconnection attempts in out-band mode and apparatus therefor.

A further object of the present disclosure is to provide a wireless power transmitter and wireless power receiver having two or more mutually complementary communication modules.

Technical Solution

Specific features of the present disclosure are described below.

In an aspect of the present disclosure, a method of controlling a communication connection by a wireless charger supporting in-band communication and out-band communication is provided. The method may include: receiving a first packet from a device through the in-band communication; creating a power transfer contract based on the first packet; establishing an out-band communication connection based on the power transfer contract; and performing power control through the out-band communication based on success of the out-band communication connection.

In an embodiment, the method may include: performing handover to out-band by entering a handover phase according to the power transfer contract; and maintaining the power transfer contract and performing an out-band reconnection procedure based on failure of the handover.

In an embodiment, the out-band reconnection procedure may include: receiving a second packet including a random address from the device through the in-band communication; and registering the device related to the random address in a whitelist. The out-band reconnection procedure may be performed with a device included in the whitelist.

In an embodiment, the out-band reconnection procedure may be periodically repeated.

In an embodiment, the first packet may include a handover flag, and the first packet may be received in a configuration phase of a state machine.

In an embodiment, the power transfer contract may include information on whether the device supports the out-band communication and information an out-band communication connection state. Whether the out-band communication is supported may be determined based on the handover flag, and the power transfer contract may be renewed based on the success of the out-band communication connection.

In an embodiment, the power transfer contract may be renewed in a renegotiation phase of the state machine.

In an embodiment, the out-band communication may be Bluetooth Low Energy (BLE) communication.

In an embodiment, the method may include: detecting a timeout of the out-band communication; determining whether the device supports the out-band communication based on the power transfer contract; determining an out-band communication connection state with the device based on the power transfer contract; and performing the out-band reconnection procedure based on the out-band communication being supported and the out-band communication being not connected. When the out-band communication is not supported, charging may be stopped and the state machine may be initialized.

In an embodiment, the method may include: transmitting a write request packet requesting to change communication based on the out-band communication being supported and the out-band communication being connected; and switching to the out-band communication based on reception of a response packet for the write request packet. The charging may be stopped and the state machine may be initialized when the response packet is not received.

Advantageous Effects

As is apparent from the above description, the present disclosure has effects as follows.

The present disclosure may provide a method of adaptively controlling communication connection in a wireless power transfer system supporting in-band communication and out-band communication and apparatus therefor.

The present disclosure may provide a method of controlling communication connection in a wireless power transfer system capable of preventing mutual influence between a wireless power state machine and a communication module in advance by performing handover between in-band and out-band independently of the wireless power state machine and apparatus therefor.

The present disclosure may provide a method of controlling communication connection in a wireless power transfer system capable of performing out-band reconnection at all phases based on a power transfer contract without initialization to a selection phase in handover failure from in-band to out-band by maintaining out-band support and connection phase information in the power transfer contract and apparatus therefor.

The present disclosure may provide a method of controlling communication connection in a wireless power transfer system capable of enhancing security due to a random MAC address transmitted by a wireless power receiver in in-band mode at all wireless charging phases and apparatus therefor.

The present disclosure may provide a method of controlling communication connection in a wireless power transfer system capable of improving communication reliability by performing handover between in-band and out-band adaptively depending on changes in the communication environment such as changes in power demand, communication volume, and communication quality during wireless charging and apparatus therefor.

The present disclosure may provide a method of controlling communication connection in a wireless power transfer system capable of preventing wireless charging interruption and improve charging speeds by enabling fast and repeatable reconnection attempts in out-band mode and apparatus therefor

DESCRIPTION OF DRAWINGS

FIG. 3B illustrates an exemplary Wireless Power Consortium (WPC) near-field communication (NFC) data exchange profile format (NDEF) in a wireless power transfer system.

FIG. 4C is a block diagram illustrating a wireless power transfer system using Bluetooth Low Energy (BLE) communication according to an embodiment of the present disclosure.

FIG. 5 is a state transition diagram for explaining a wireless power transfer procedure.

FIG. 10 illustrates a structure of a synchronization pattern according to an embodiment of the present disclosure.

FIG. 12 is a block diagram illustrating a wireless charging certificate format according to an embodiment of the present disclosure.

FIG. 13 illustrates a structure of a capability packet of a wireless power transmitter according to an embodiment of the present disclosure.

FIG. 14 illustrates a structure of a configuration packet of a wireless power receiver according to an embodiment of the present disclosure.

FIG. 20 is a diagram for explaining a method of adding information on whether out-band (i.e., BLE) is supported and information on a connection state to a power contract according to an embodiment of the present disclosure.

BEST MODE

In an embodiment of the present disclosure, a method of controlling a communication connection by a wireless charger supporting in-band communication and out-band communication is provided. The method may include: receiving a first packet from a device through the in-band communication; creating a power transfer contract based on the first packet; establishing an out-band communication connection based on the power transfer contract; and performing power control through the out-band communication based on success of the out-band communication connection.

MODE FOR THE DISCLOSURE

The term "wireless power" used hereinafter refers to any form of energy related to electric, magnetic, and electromagnetic fields transferred from a wireless power transmitter to a wireless power receiver without the use of physical electromagnetic conductors. Wireless power may be called a wireless power signal and may refer to an oscillating magnetic flux enclosed by primary and secondary coils. For example, this document describes power conversion in a system for charging devices including a mobile phone, cordless phone, iPod, MP3 player, and headset wirelessly. In general, the basic principles of wireless power transfer include power transfer based on magnetic coupling, power transfer based on radio frequency (RF), power transfer based on microwaves, and power transfer based on ultrasonic waves.

Figure 1:
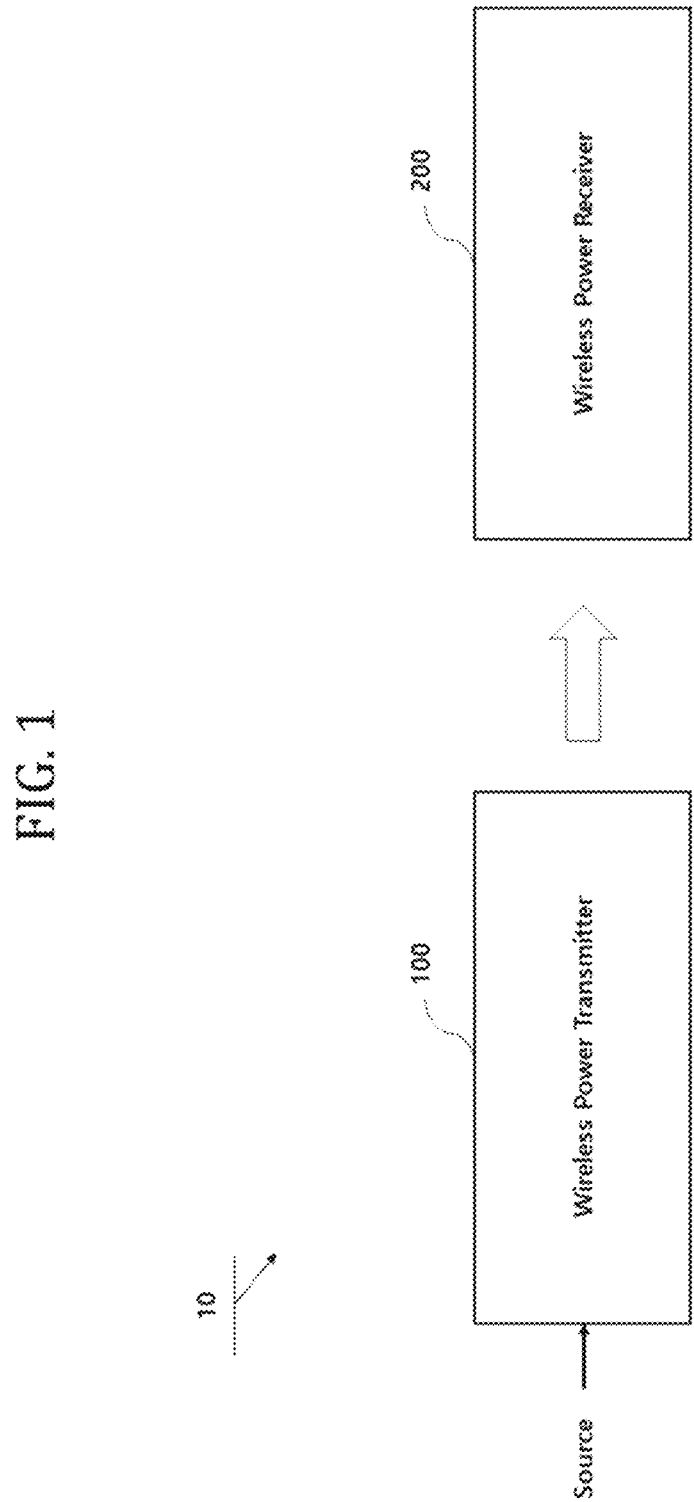
FIG. 1 is a block diagram of a wireless power system 10 according to an embodiment of the present disclosure.
Figure 2:
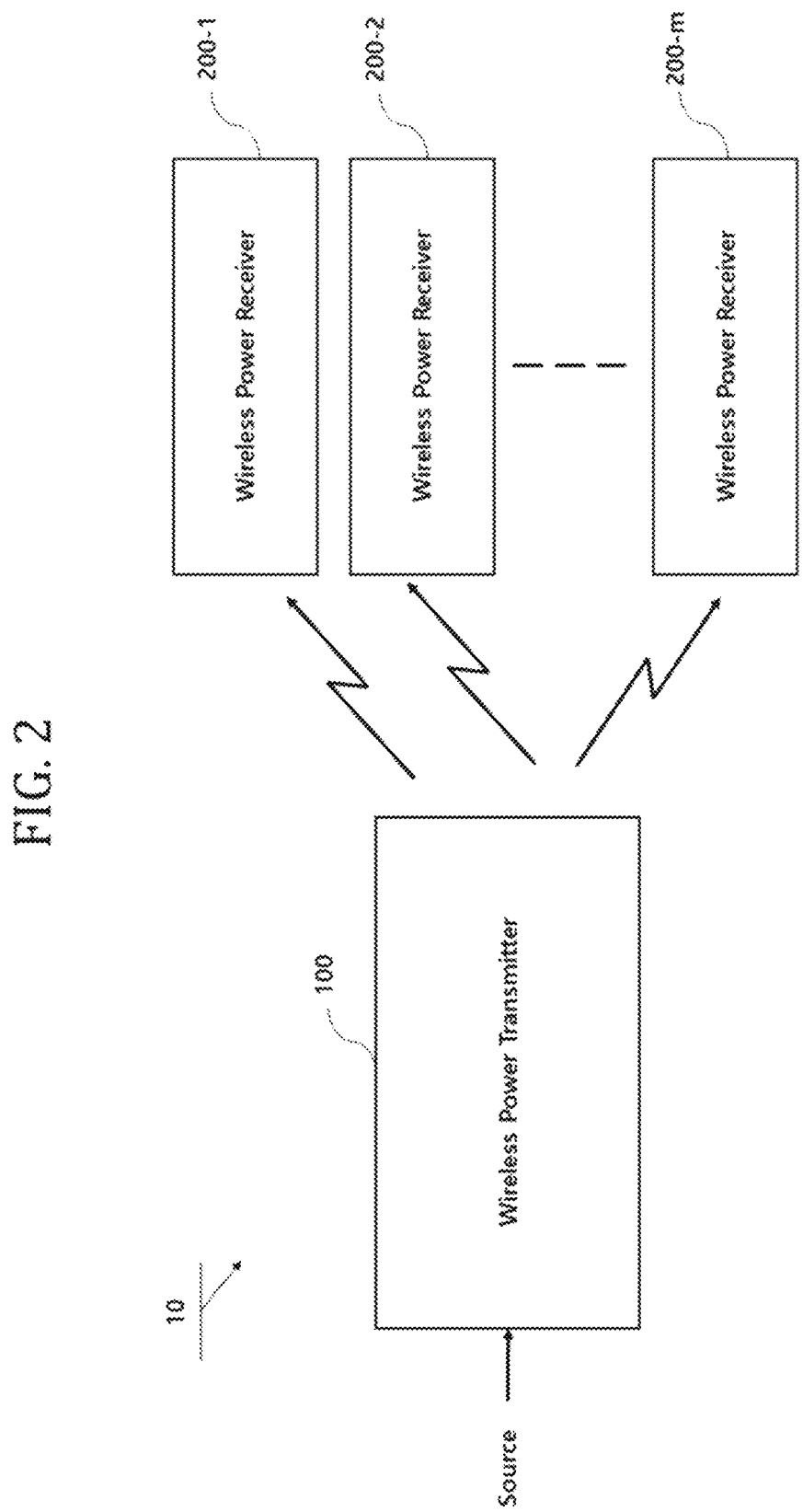
FIG. 2 is a block diagram of the wireless power system 10 according to another embodiment of the present disclosure.

FIG. 1 is a block diagram of a wireless power system 10 according to an embodiment of the present disclosure.

Referring to FIG. 1, the wireless power system 10 includes a wireless power transmitter 100 and a wireless power receiver 200.

The wireless power transmitter 100 receives power from an external power source S and generates a magnetic field. The wireless power receiver 200 receives power wirelessly by generating currents based on the generated magnetic field.

The wireless power transmitter 100 and the wireless power receiver 200 in the wireless power system 10 may transmit and receive various pieces of information required for wireless power transfer. Here, communication between the wireless power transmitter 100 and the wireless power receiver 200 may be performed according to either in-band communication using a magnetic field for wireless power transfer or out-band communication using a separate communication carrier. Out-band communication may also be called out-of-band communication. In the following, the terms are unified as out-band communication. For example, out-band communication includes near-field communication (NFC), Bluetooth, and Bluetooth Low Energy (BLE).

Here, the wireless power transmitter 100 may be a fixed or mobile type of wireless power transmitter. For example, the fixed type of transmitter includes a transmitter embedded in an indoor ceiling or wall or furniture such as a table; a transmitter implanted in an outdoor parking lot, bus stop or subway station; or a transmitter installed in a transportation such as a vehicle or train. The mobile type of wireless power transmitter may be implemented as a mobile device with a portable weight or size or as part of another device such as a laptop computer cover.

The wireless power receiver 200 should be construed as a comprehensive concept including various types of electronic devices equipped with a battery and various home appliances driven by receiving power wirelessly rather than a power cable. Typical examples of the wireless power receiver 200 include a portable terminal, cellular phone, smartphone, personal digital assistant (PDA), portable media player (PMP), Wibro terminal, tablet, phablet, laptop computer, digital camera, navigation terminal, television, and electric vehicle (EV).

The wireless power system 10 may include one or a plurality of wireless power receivers 200. Although FIG. 1 illustrates a case where the wireless power transmitter 100 and the wireless power receiver 200 transmit and receive power one-to-one, one wireless power transmitter 100 transmits power to a plurality of wireless power receivers 200-1, 200-2, ..., 200-M. In particular, when wireless power transfer is conducted based on magnetic resonance, one wireless power transmitter 100 may simultaneously transmit power to multiple wireless power receivers 200-1, 200-2, ..., 200-M by applying simultaneous transmission or time-division transmission.

Although FIG. 1 illustrates a case where the wireless power transmitter 100 transmits power directly to the wireless power receiver 200, a wireless power transceiver such as a relay or repeater for increasing the range of wireless power transmission may be provided between the wireless power transmitter 100 and the wireless power receiver 200. In this case, the wireless power transmitter 100 may transmit power the wireless power transceiver, and the wireless power transceiver may transmit the power to the wireless power receiver 200.

In this document, the wireless power receiver 200 refers to a wireless power receiver, a power receiver, and a receiver. Also, the wireless power transmitter 100 refers to a wireless power transmitter, a power transmitter, and a transmitter.

Figure 3A:
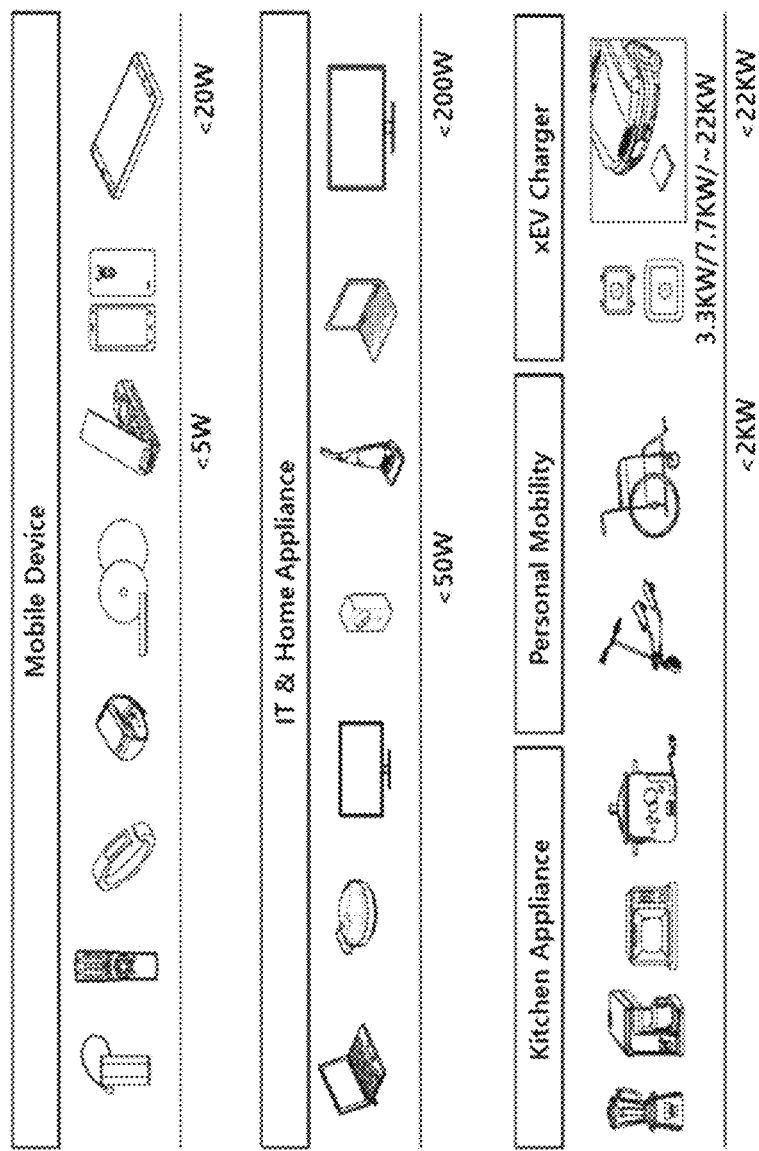
FIG. 3A illustrates examples of various electronic devices to which a wireless power transfer system is introduced.

FIG. 3A illustrates examples of various electronic devices where a wireless power transfer system is introduced.

In FIG. 3A, electronic devices are categorized according to the amount of transferred power in a wireless power transmission system. Referring to FIG. 3A, low power wireless charging (smaller than about 5 or 20 W) may be applied to wearable devices such as a smart watch, head mounted display (HMD), smart ring, and smart glasses and mobile electronic devices (or portable electronic devices) such as an earphone, remote controller, smartphone, PDA, and tablet PC.

Medium power wireless charging (smaller than about 50 or 200 W) may be applied to small and medium-sized home appliances such as a laptop computer, robot cleaner, TV, sound device, vacuum cleaner, and monitor. High power wireless charging (small than about 2 or 22 kW) may be applied to kitchen appliances such as a blender, microwave oven, and electric rice cooker; and personal mobility devices (or electric device/mobility means) such as a wheelchair, electric kickboard, electric bicycle, and electric vehicle.

The electronic devices/mobility means described above (or shown in FIG. 1) may each include a wireless power receiver, which will be described later. Therefore, the above-described electronic devices/mobility means may be charged by receiving power wirelessly from a wireless power transmitter.

The present disclosure will be described based on a mobile device to which wireless power charging is applied, but this is merely exemplary. That is, the wireless charging method according to the present disclosure may be applied to various electronic devices.

Wireless power transfer standards include those studied by Wireless Power Consortium (WPC), Air Fuel Alliance (AFA), and Power Matters Alliance (PMA).

WPC standards define baseline power profile (BPP) and extended power profile (EPP). BPP is related to wireless power transmitters and receivers that support power transmission of 5 W, and EPP is related to wireless power transmitters and receivers that support power transmission in the range of 5 and 30 W.

Each standard covers various wireless power transmitters and receivers using different power levels and also classifies the wireless power transmitters and receivers into different power classes or categories.

For example, the WPC classifies wireless power transmitters and receivers in terms of power classes (PC): PC-1, PC0, PC1, and PC2 and provides standard specifications for each PC. The PC-1 standard is related to wireless power transmitters and receivers that provide guaranteed power less than 5 W. PC-1 applications include wearable devices such as smart watches.

The PC0 standard is related to wireless power transmitters and receivers that provide guaranteed power of 5 W. The PC0 standard includes the EPP in which guaranteed power reaches up to 30 W. Although in-band (IB) communication is a mandatory communication protocol for PC0, out-band (OB) communication, which is used as an optional backup channel, may also be used for PC0. Whether a wireless power receiver supports OB may be identified by configuring an OB flag in a configuration packet. If the wireless power transmitter supports OB, the wireless power transmitter may enter an OB handover phase by transmitting a bit pattern for OB handover as a response to the configuration packet. The response to the configuration packet may be an NAK, an ND, or a newly defined 8-bit pattern. PC0 applications include smartphones.

The PC1 standard is related to wireless power transmitters and receivers providing guaranteed power ranging from 30 W to 150 W. OB is a mandatory communication channel for PC1, and IB is used for initialization and link establishment to OB. The wireless power transmitter may enter the OB handover phase by transmitting the bit pattern for OB handover as a response to the configuration packet. PC1 applications include laptop computers or power tools.

The PC2 standard is related to wireless power transmitters and receivers providing guaranteed power ranging from 200 W to 2 kW. PC2 applications include kitchen appliances.

As described above, PCs may be divided based on power levels, and compatibility within the same PC may be optional or mandatory. Here, the compatibility within the same PC means that power transmission and reception is allowed within the same PC. For example, if a wireless power transmitter of PC x is capable of charging a wireless power receiver with the same PC (i.e., PC x), it may be regarded that compatibility is maintained within the same PC. Similarly to the above, compatibility between different PCs may also be supported. Here, the compatibility between different PCs means that power transmission and reception is allowed between different PCs. For example, if a wireless power transmitter of PC x is capable of charging a wireless power receiver with PC y, it may be regarded that compatibility is maintained between different PCs.

The support of compatibility between PCs is an important issue in terms of user experience and infrastructure development. However, maintaining the compatibility between PCs may cause various technical problems as follows.

For example, when compatibility within the same PC is supported, a wireless power receiver such a laptop, which is stably charged only when power is transmitted continuously, may have a problem in receiving power reliably from a wireless power transmitter such as a power tool scheme that transmits power discontinuously. When compatibility between different PCs is supported, for example, if a wireless power transmitter with minimum guaranteed power of 200 W transmits power to a wireless power receiver with maximum guaranteed power is 5 W, the wireless power receiver may be damaged due to overvoltage. As a result, it is difficult to take the PC as an indicator/reference for representing/indicating compatibility.

Wireless power transmitters and receivers may provide very convenient user experience and interface (UX/UI). In other words, a smart wireless charging service may be provided. The smart wireless charging service may be implemented based on the UX/UI of a smartphone including the wireless power transmitter. For such an application, an interface between the processor of the smartphone and the wireless power receiver allows "drop and play" two-way communication between the wireless power transmitter and receiver.

For example, a user may experience the smart wireless charging service at a hotel. If the user enters a hotel room and places the smartphone on a wireless charger in the room, the wireless charger transmits wireless power to the smartphone, and the smartphone receives the wireless power. In this process, the wireless charger transmits, to the smartphone, information about the smart wireless charging service. If the smartphone detects that it is placed on the wireless charger, detects the wireless power reception, or receives the information about the smart wireless charging service from the wireless charger, the smartphone enters a state for asking the user to opt-in into an additional feature. To this end, the smartphone may display a message on the screen with or without an alarm sound. For example, the message may include the following sentences: "Welcome to ###hotel. Select "Yes" to activate smart charging functions: Yes|No Thanks." The smartphone receives a user input selecting Yes or No Thanks and performs the next procedure selected by the user. If Yes is selected, the smartphone transmits the corresponding information to the wireless charger. The smartphone and the wireless charger perform the smart charging function together.

The smart wireless charging service may also include receiving auto-filled WiFi credentials. For example, the wireless charger transmits WiFi credentials to the smartphone, and the smartphone automatically inputs the WiFi credentials received from the wireless charger by executing an appropriate app.

The smart wireless charging service may also include executing a hotel application that provides hotel promotions or obtaining remote check-in/check-out and contact information.

In another example, a user may experience the smart wireless charging service inside a vehicle. If the user gets into the vehicle and places the smartphone on a wireless charger, the wireless charger transmits wireless power to the smartphone, and the smartphone receives the wireless power. In this process, the wireless charger transmits information about the smart wireless charging service to the smartphone. If the smartphone detects that it is placed on the wireless charger, detects the wireless power reception, or receives the information about the smart wireless charging service from the wireless charger, the smartphone enters a state for asking the user about the identity.

In this state, the smartphone is automatically connected to the vehicle via WiFi and/or Bluetooth. The smartphone may display a message on the screen with or without an alarm sound. For example, the message may include the following sentences: "Welcome to your car. Select "Yes" to synch device with in-car controls: Yes|No Thanks." The smartphone receives a user input selecting Yes or No Thanks and performs the next procedure selected by the user. If Yes is selected, the smartphone transmits the corresponding information to the wireless charger. The smartphone and wireless charger may perform an in-vehicle smart control function together by executing in-vehicle application/display software. The user may enjoy desired music and check a regular map location. The in-vehicle application/display software may include a function that provides synchronization access for passers-by.

In another example, a user may experience smart wireless charging at home. If the user enters a room and places the smartphone on a wireless charger in the room, the wireless charger transmits wireless power to the smartphone, and the smartphone receives the wireless power. In this process, the wireless charger transmits, to the smartphone, information about the smart wireless charging service. If the smartphone detects that it is placed on the wireless charger, detects the wireless power reception, or receives the information about the smart wireless charging service from the wireless charger, the smartphone enters a state for asking the user to opt-in into an additional feature. To this end, the smartphone may display a message on the screen with or without an alarm sound. For example, the message may include the following sentences: "Hi xxx, would you like to activate night mode and secure the building?: Yes|No Thanks." The smartphone receives a user input selecting Yes or No Thanks and performs the next procedure selected by the user. If Yes is selected, the smartphone transmits the corresponding information to the wireless charger. The smartphone and the wireless charger may at least recognize a user pattern and recommend the user to lock doors and windows, turn off lights, or set an alarm.

Herein, 'profile' is newly defined as an indicator/reference for representing/indicating compatibility. In other words, when wireless power transmitters and receivers have the same profile, compatibility may be maintained therebetween so that stable power transmission and reception may be allowed. When wireless power transmitters and receivers have different profiles, stable power transmission and reception may not be allowed. The profile may be defined according to compatibility and/or applications regardless of (or independently of) PCs.

For example, profiles may be divided into three categories: i) Mobile and Computing, ii) Power Tool, and iii) Kitchen.

Alternatively, the profiles may be divided into four categories: i) Mobile, ii) Power Tool, iii) Kitchen, and iv) Wearable.

In the 'Mobile' profile, the PC may be PC0 and/or PC1. The communication protocol/scheme may be IB and OB, and the operating frequency may be from 87 kHz to 205 kHz. Applications may include smartphones, laptop computers, and so on.

In the 'Power Tool' profile, the PC may be PC1. The communication protocol/scheme may be IB, and the operating frequency may be from 87 kHz to 145 kHz. Applications may include power tools.

In the 'Kitchen' profile, the PC may be PC2. The communication protocol/scheme may be based on NFC, and the operating frequency may be less than 100 kHz. Applications may include kitchen or home appliances.

In the 'Power Tool and Kitchen' profiles, NFC communication may be employed between the wireless power transmitter and receiver. The wireless power transmitter and receiver may confirm that each of them is an NFC device by exchanging a WPC NFC data exchange profile format (NDEF). For example, as shown in FIG. 3B, the WPC NDEF may include an application profile field (e.g., IB), a version field (e.g., IB), and profile-specific data (e.g., IB). The application profile field indicates whether the corresponding device is one of the following profiles: i) Mobile and Computing, ii) Power Tool, and iii) Kitchen. The upper nibble of the version field indicates the major version, and the lower nibble of the version field indicates the minor version. Also, the profile specific data defines contents for kitchen.

In the 'Wearable' profile, the PC may be PC-1. The communication protocol/scheme may be IB, and the operating frequency may be from 87 kHz to 205 kHz. Applications may include wearable devices worn on the body of a user.

Maintaining compatibility within the same profile may be mandatory, but maintaining compatibility between different profiles may be optional.

The above-described profiles (Mobile profile, Power Tool profile, Kitchen profile, and Wearable profile) may be generalized to first to n-th profiles, and new profiles may be added to/substituted for old profiles according to WPC specifications and embodiments.

When profiles are defined as described above, a wireless power transmitter may perform power transmission selectively only to a wireless power receiver with the same profile as the wireless power transmitter, thereby enabling more stable power transmission. In addition, the burden on a wireless power transmitter may be reduced, and power transmission to incompatible wireless power receivers may not attempted, thereby preventing the wireless power transmitter from damaging wireless power receivers.

PC1 of the 'Mobile' profile may be defined by employing an optional extension such as OB based on PC0. PC1 of the 'Power Tool' profile may be defined simply as a modified version of PC1 of the 'Mobile' profile. The wireless transfer technology has been developed to maintain compatibility within the same profile until now. However, in the future, the wireless transfer technology may be further developed to maintain compatibility between different profiles. The wireless power transmitter or receiver may inform its profile to a peer device in various ways.

In the AFA standard, a wireless power transmitter is referred to as a power transmitting unit (PTU), and a wireless power receiver is referred to as a power receiving unit (PRU). PTUs are classified into a plurality of classes as shown in Table 1, and PRUs are classified into a plurality of categories as shown in Table 2.

TABLE 1

| | $P_{TX\_IN\_MAX}$ | Minimum category support requirement | Minimum value for maximum number of supported devices |
|---|---|---|---|
| Class 1 | 2 W | 1 × Category 1 | 1 × Category 1 |
| Class 2 | 10 W | 1 × Category 3 | 2 × Category 2 |
| Class 3 | 16 W | 1 × Category 4 | 2 × Category 3 |
| Class 4 | 33 W | 1 × Category 5 | 3 × Category 3 |
| Class 5 | 50 W | 1 × Category 6 | 4 × Category 3 |
| Class 6 | 70 W | 1 × Category 7 | 5 × Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC and Phablet |
| Category 5 | 25 W | Laptop with a small form factor |
| Category 6 | 37.5 W | Regular laptop |
| Category 7 | 50 W | Home appliance |

As shown in Table 1, the maximum output power capability of a PTU of class n is larger than or equal to the value of P TX_IN_MAX of the corresponding class. A PRU is not allowed to draw larger power than specified in the corresponding category.

Figure 4A:
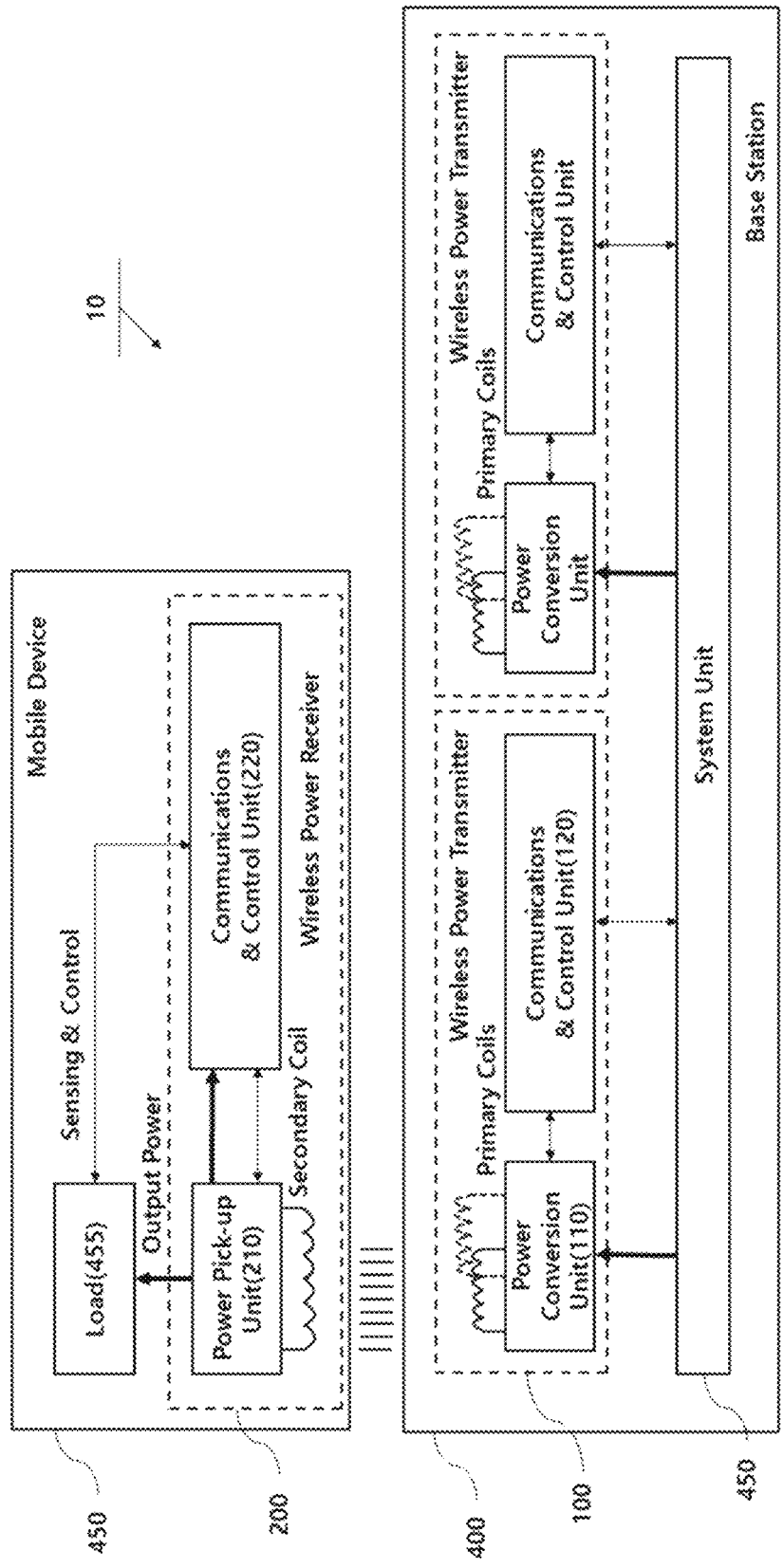
FIG. 4A is a block diagram of a wireless power transfer system according to another embodiment of the present disclosure.

FIG. 4A is a block diagram illustrating a wireless power transmission system according to another embodiment of the present disclosure.

Referring to FIG. 4A, a wireless power transfer system 10 includes a mobile device 450 configured to receive power wirelessly and a base station 400 configured to transmit power wirelessly.

The base station 400 may provide inductive or resonant power and include at least one wireless power transmitter 100 and a system unit 405. The wireless power transmitter 100 may transmit the inductive or resonant power and control transmission. The wireless power transmitter 100 may include: a power conversion unit 110 configured to convert electric energy to a power signal by generating a magnetic field based on primary coil(s); and a communication and control unit 120 configured to control communication with the wireless power receiver 200 and power transmission to transmit an appropriate amount of power. The system unit 405 may control operations of the base station 400 such as input power provisioning, control of a plurality of wireless power transmitters, and control of a user interface.

The primary coil may generate an electromagnetic field based on alternating current (AC) power (voltage or current). The primary coil may receive AC power (voltage or current) at a specific frequency output from the power conversion unit 110 and generate a magnetic field at the specific frequency. The magnetic field may be generated in a non-radial or radial form. The wireless power receiver 200 may receive the magnetic field to generate a current. In other words, the primary coil may transmit power wirelessly.

For magnetic induction, primary and secondary coils may have arbitrarily suitable shapes. For example, such a coil may be implemented by winding a copper wire around a high permeability member such as ferrite or amorphous metal. The primary coil may also be called a primary core, primary winding, or primary loop antenna. Meanwhile, the secondary coil may be called a secondary core, secondary winding, secondary loop antenna, or pickup antenna.

When magnetic resonance is used, the primary and secondary coils may be provided as a primary resonant antenna and a secondary resonant antenna. A resonant antenna may have a resonance structure including a coil and a capacitor. The resonant frequency of the resonant antenna may be determined by the inductance of the coil and the capacitance of the capacitor. Here, the coil may be formed to have a loop shape. In addition, a core may be disposed inside the loop. The core may include a physical core such as a ferrite core or an air core.

Energy transfer between the primary resonant antenna and the secondary resonant antenna may be achieved by resonance in a magnetic field. The resonance is a phenomenon in which high efficiency energy transfer occurs between two resonant antennas when the two resonant antennas are coupled to each other. Specifically, when one of the two resonant antennas generates a near field at a resonant frequency and the other resonant antenna is located in the vicinity thereof, the two resonant antennas may be coupled so that high efficiency energy transfer may occur therebetween. If a magnetic field is generated at the resonant frequency between the primary and secondary resonant antennas, the primary and secondary resonant antennas may resonate to each other. Thus, the magnetic field may be radiated to the secondary resonant antenna with high efficiency compared to when the magnetic field generated by the primary resonant antenna is radiated into the free space so that energy may be transferred from the primary resonant antenna to the secondary resonant antenna with high efficiency. The magnetic induction method may be implemented in a similar way to the magnetic resonance. However, in this case, the frequency of the magnetic field does not need to be the resonant frequency. Instead, for the magnetic induction, the loops of the primary and secondary coils need to match with each other, and the distance between the loops needs to be very short.

Although not shown in the drawing, the wireless power transmitter 100 may further include a communication antenna. The communication antenna may transmit and receive a communication signal on a communication carrier in addition to magnetic field communication. For example, the communication antenna may transmit and receive a communication signal based on WiFi, Bluetooth, BLE, ZigBee, NFC, and so on.

The communication and control unit 120 may transmit and receive information to and from the wireless power receiver 200. The communication and control unit 120 may include at least one of an IB communication module or an OB communication module.

The IB communication module may transmit and receive information based on a magnetic wave having a specific frequency as the center frequency. For example, the communication and control unit 120 may perform IB communication by loading information on a magnetic wave and transmitting the magnetic wave through the primary coil or by receiving a magnetic wave containing information through the primary coil. In this case, a modulation scheme such as binary phase shift keying (BPSK) or amplitude shift keying (ASK) and a coding scheme such as Manchester coding or non-return-to-zero level (NZR-L) coding may be used to load information on magnetic waves or interpret information contained in magnetic waves. When the IB communication is applied, the communication and control unit 120 may transmit and receive information up to a distance of several meters at a data rate of several kbps.

The OB communication module may perform OB communication through the communication antenna. For example, the communication and control unit 120 may be provided as a short-range communication module. For example, the short-range communication module may include communication modules based on Wi-Fi, Bluetooth, BLE, ZigBee, NFC, and so on.

The communication and control unit 120 may control overall operations of the wireless power transmitter 100. The communication and control unit 120 may compute and process various information and control each element of the wireless power transmitter 100.

The communication and control unit 120 may be implemented as a computer or a device similar to the computer based on hardware, software, or combination thereof. For hardware implementation, the communication and control unit 120 may be provided as an electronic circuit for processing electric signals and performing control functions. For software implementation, the communication and control unit 120 may be provided as a program for driving the hardware of the communication and control unit 120.

The communication and control unit 120 may control transmission power by controlling an operating point. The operating point to be controlled may correspond to a combination of a frequency (or phase), duty cycle, duty ratio, and voltage amplitude. The communication and control unit 120 may control transmission power by adjusting at least one of the frequency (or phase), duty cycle, duty ratio, or voltage amplitude. In addition, the wireless power receiver 200 may control reception power by controlling the resonant frequency while the transmitter 100 supplies constant power.

The mobile device 450 may include the wireless power receiver 200 configured to receive wireless power through the secondary coil and a load 455 configured to receive and store the power received by the wireless power receiver 200 and supply the stored power to devices.

The wireless power receiver 200 may include a power pick-up unit 210 and a communication and control unit 220. The power pick-up unit 210 may receive wireless power through the secondary coil and convert the received wireless power to electric energy. The power pick-up unit 210 may rectify an AC signal obtained from the secondary coil to convert to a direct current (DC) signal. The communication and control unit 220 may control transmission and reception of wireless power (power transmission and reception).

The secondary coil may receive wireless power transmitted from the wireless power transmitter 100. The secondary coil may receive power based on a magnetic field generated by the primary coil. In this case, if the specific frequency is the resonant frequency, the magnetic resonance may be generated between the primary and secondary coils, and thus the secondary coil may receive power more efficiently.

Although not shown in FIG. 4A, the communication and control unit 220 may further include a communication antenna. The communication antenna may transmit and receive a communication signal on a communication carrier in addition to magnetic field communication. For example, the communication antenna may transmit and receive a communication signal based on WiFi, Bluetooth, BLE, ZigBee, NFC, and so on.

The communication and control unit 220 may transmit and receive information to and from the wireless power receiver 100. The communication and control unit 220 may include at least one of an IB communication module or an OB communication module.

The IB communication module may transmit and receive information based on a magnetic wave having a specific frequency as the center frequency. For example, the communication and control unit 220 may perform IB communication by loading information on a magnetic wave and transmitting the magnetic wave through the primary coil or by receiving a magnetic wave containing information through the primary coil. In this case, a modulation scheme such as BPSK or ASK and a coding scheme such as Manchester coding or NZR-L coding may be used to load information on magnetic waves or interpret information contained in magnetic waves. When the IB communication is applied, the communication and control unit 220 may transmit and receive information up to a distance of several meters at a data rate of several kbps.

The OB communication module may perform OB communication through the communication antenna. For example, the communication and control unit 220 may be provided as a short-range communication module.

For example, the short-range communication module may include communication modules based on Wi-Fi, Bluetooth, BLE, ZigBee, NFC, and so on.

The communication and control unit 220 may control overall operations of the wireless power transmitter 200. The communication and control unit 220 may compute and process various information and control each element of the wireless power transmitter 200.

The communication and control unit 220 may be implemented as a computer or a device similar to the computer based on hardware, software, or combination thereof. For hardware implementation, the communication and control unit 220 may be provided as an electronic circuit for processing electric signals and performing control functions. For software implementation, the communication and control unit 220 may be provided as a program for driving the hardware of the communication and control unit 220.

Figure 4B:
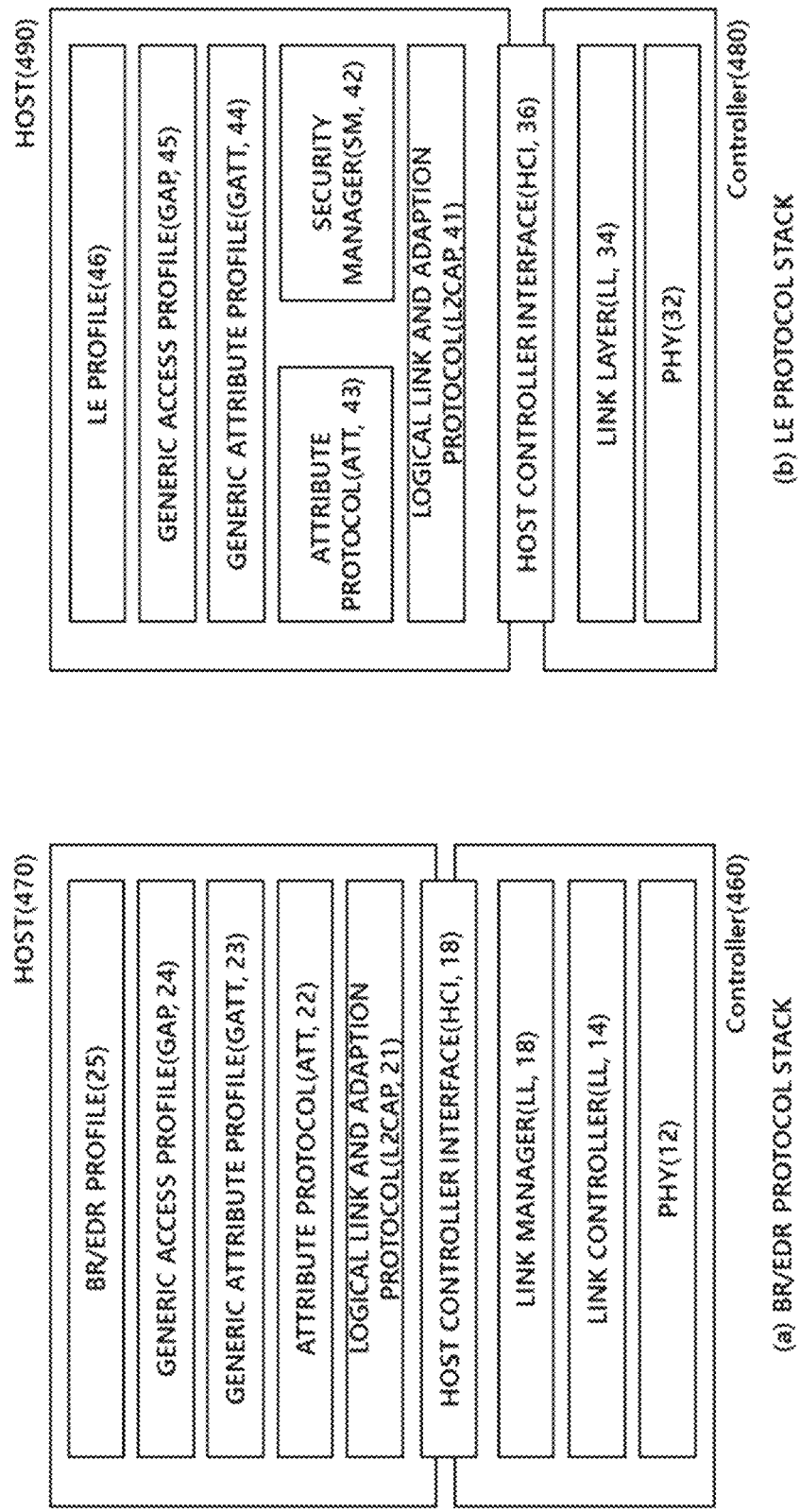
FIG. 4B is a diagram illustrating an exemplary Bluetooth communication architecture to which the present disclosure is applicable.

When the OB communication modules or short-range communication modules of the communication and control unit 120 and the communication and control unit 220 employ Bluetooth or BLE, the communication and control unit 120 and the communication and control unit 220 may have a communication architecture as shown in FIG. 4B.

FIG. 4B is a diagram illustrating an exemplary Bluetooth communication architecture to which the present disclosure is applicable.

Referring to FIG. 4B, (a) shows an exemplary Bluetooth basic rate (BR)/enhanced data rate (EDR) protocol stack supporting a generic attribute profile (GATT), and (b) shows an exemplary BLE protocol stack.

Specifically, as shown in (a) of FIG. 4B, the Bluetooth BR/EDR protocol stack may include an upper control stack 460 and a lower host stack 470 with respect to a host controller interface (HCI) 18.

The host stack (or host module) 470 refers to hardware for transmitting or receiving a Bluetooth packet to or from a wireless transmission/reception module configured to receive a Bluetooth signal of 2.4 GHz. The controller stack 460 may be connected to the Bluetooth module to control operations of the Bluetooth module.

The host stack 470 may include a BR/EDR physical (PHY) layer 12, a BR/EDR baseband layer 14, and a link manager layer 16.

The BR/EDR PHY layer 12 may transmit and receive a 2.4 GHz radio signal. When Gaussian frequency shift keying (GFSK) modulation is used, the BR/EDR PHY layer 12 may transmit data by hopping 79 RF channels.

The BR/EDR baseband layer 14 may transmit a digital signal, select a channel sequence for hopping 1400 times per second, and transmit a time slot with a length of 625 us for each channel.

The link manager layer 16 may control overall operations (e.g., link setup, control, security) of Bluetooth connection based on a link manager protocol (LMP).

The link manager layer 16 may perform the following functions.

ACL/SCO logical transport, logical link setup, and control

Detach: if connection is disconnected, the link manager layer 16 may inform a peer device of a reason for the disconnection.

Power control and role switch

Security (authentication, pairing, encryption, etc.)

The host controller interface layer 18 may provide an interface between a host module and a controller module so that the host may provide commands and data to the controller and the controller may provide events and data to the host.

The host stack (or host module) 470 may include a logical link control and adaptation protocol (L2CAP) 21, an attribute protocol 22, a GATT 23, a generic access profile (GAP) 24, and a BR/EDR profile 25.

The L2CAP 21 may provide one two-way channel for transmitting data to a specific protocol or profile.

The L2CAP 21 may multiplex various protocols, profiles, and so on provided from Bluetooth.

The L2CAP of the Bluetooth BR/EDR may use dynamic channels. In addition, the L2CAP of the Bluetooth BR/EDR may support protocol service multiplexers, retransmission, streaming modes and provide segmentation and reassembly, per-channel flow control, and error control.

The GATT 23 may act as a protocol for explaining how the attribute protocol 22 is used when services are configured. For example, the GATT 23 may act to specify how the attributes of the attribute protocol (ATT) are grouped together into services and also act to describe features related to the services.

Accordingly, the GATT 23 and the ATT 22 may use features to describe the states and services of a device and explain how the features are related to each other and how the features are used.

The ATT 22 and the BR/EDR profile 25 may define a service (profile) using the Bluetooth BR/EDR and an application protocol for exchanging data. The GAP 24 may define device discovery, connectivity, and security.

As shown in (b) of FIG. 4B, the BLE protocol stack includes a controller stack 480 configured to process a wireless device interface where timing is important and a host stack 490 configured to process high level data.

To implement the controller stack 480, a communication module including a Bluetooth wireless device and a processor module including a processing device such as a microprocessor may be used.

The host stack 490 may be implemented as part of an OS operated on the processor module or implemented as instantiation of a package on the OS.

In some examples, the controller stack and the host stack may be operated or executed on the same processing device within the processor module.

The controller stack 480 may include a PHY layer 32, link layer 34, and a HCI 36.

The PHY layer (wireless transceiver module) 32 is a layer for transmitting and receiving a 2.4 GHz wireless signal. The PHY layer may uses GFSK modulation and frequency hopping including 40 RF channels.

The link layer 34 may serve to transmit or receive a Bluetooth packet. Specifically, the link layer 34 may perform advertising and scanning on three advertising channels, generate connection between devices, and exchange a data packet of up to 257 bytes over 37 data channels.

The host stack 490 may include a GAP 40, a L2CAP 41, a security manager (SM) 42, an ATT 43, a GATT 44, a GAP 25, and an LE profile 46. However, the host stack 490 is not limited thereto and may further include various protocols and profiles.

The host stack may multiplex various protocols, profiles, and so on provided from Bluetooth based on L2CAP.

The L2CAP 41 may provide one two-way channel for transmitting data to a specific protocol or profile.

The L2CAP 41 may be configured to multiplex data between higher layer protocols, segment and reassemble packages, and manage multicast data transmission.

In BLE, three fixed channels are basically used (one is used for CH signaling, another is used for the SM, and the other is used for the ATT). If necessary, a dynamic channel may also be used.

For the BR/EDR, a dynamic channel may be basically used. A protocol service multiplexer, retransmission, streaming mode, and so on may be supported.

The SM 42 is a protocol for authenticating devices and providing key distribution.

The ATT 43 may define a rule for accessing data of a peer device based on a server-client structure. The ATT has the following 6 message types: Request, Response, Command, Notification, Indication, and Confirmation.

① Request and Response messages: The request message is a message for a client device to request specific information from a server device. The response message is a response to the request message, which is transmitted from the server device to the client device.

② Command message: The command message is a message transmitted from the client device to the server device to instruct a specific operation. The server device sends no response to the command message to the client device.

③ Notification message: The Notification message is a message transmitted from the server device to the client device to notify an event. The client device sends no confirmation message to the notification message to the server device.

④ Indication and Confirmation messages: The indication message is a message transmitted from the server device to the client device to notify an event. However, unlike the Notification message, the client device transmits the Confirmation message for the Indication message to the server device According to the present disclosure, when long data is requested, the GATT using the ATT 43 may let a client to know the length of data by sending the data length and receive a characteristic value from a server based on a universal unique identifier (UUID).

The GAP 45 is a newly implemented layer for BLE technology. The GAP 45 may be used to select a role for communication between BLE devices and control the occurrence of multi-profile operation.

In addition, the GAP 45 is mainly used for device discovery, connection creation, and security procedures. The GAP 45 may define a method for providing information to a user, and also define the following attribute types.

① Service: It defines the basic operation of a device based on a combination of data related behaviors.
② Include: It defines a relationship between services.
③ Characteristics: It is a data value used for a service.
④ Behavior: It is a format readable by a computer defined by a UUID (value type).

The LE profile 46 includes profiles dependent on the GATT. The LE profile 46 may be mainly applied to BLE devices. The LE profile 46 may include, for example, Battery, Time, FindMe, Proximity, Time, Object Delivery Service, and so on. Details of the GATT-based profiles are as follows.

① Battery: Battery information exchange
② Time: Time information exchange
③ FindMe: Provision of alarm service according to distance
④ Proximity: Battery information exchange
⑤ Time: Time information exchange The GATT 44 may act as a protocol for explaining how the ATT 43 is used when services are configured. For example, the GATT 44 may act to define how ATT attributes are grouped together with services and operate to describe features associated with services. For example, the GATT 44 may act to specify how the attributes of the ATT are grouped together into services and also act to describe features related to the services.

Accordingly, the GATT 44 and the ATT 43 may use features to describe the states and services of a device and explain how the features are related to each other and how the features are used.

Hereinafter, procedures for the BLE technology will be briefly described.

The BLE procedures may be classified into a device filtering procedure, an advertising procedure, a scanning procedure, a discovering procedure, and a connecting procedure.

Device Filtering Procedure

The device filtering procedure corresponds to a method of reducing the number of devices that respond to a request, an indication, a notification, etc. in the controller stack.

When requests are received from all the devices, it is unnecessary to respond thereto. Thus, the controller stack may reduce the number of transmitted requests to reduce power consumption in the BLT controller stack.

An advertisement device or a scanning device may perform the device filtering procedure to limit devices that will receive an advertisement packet, a scan request, or a connection request.

Here, the advertising device refers to a device transmitting an advertising event, i.e., a device performing advertising. The advertising device may be referred to as an advertiser.

The scanning device refers to a device performing scanning, i.e., a device transmitting a scan request.

In BLE, when the scanning device receives some advertisement packets from the advertising device, the scanning device needs to transmit a scan request to the advertisement device.

However, if the device filtering procedure is used so that scan request transmission is not required, the scanning device may disregard the advertising packets transmitted from the advertising device.

The device filtering procedure may also be used for a connection request procedure. If device filtering is used in the connection request procedure, it is not necessary to transmit a response to the connection request by ignoring the connection request.

Advertising Procedure

The advertising device performs the advertising procedure to perform undirected broadcast to devices in an area.

Here, the undirected broadcast (undirected advertising) is advertising directed to all devices rather than broadcast directed to a specific device. All devices may scan the advertising and make an additional information request or a connection request.

However, in directed broadcast (directed advertising), only a device designated as the receiving device may scan advertising and make an additional information request or a connection request.

The advertising procedure may be used to establish a Bluetooth connection with a nearby initiating device.

Alternatively, the advertising procedure may be used to provide periodic broadcast of user data to scanning devices that are listening on an advertising channel.

In the advertising procedure, all advertisements (or advertising events) are broadcast on an advertising physical channel.

The advertising device may receive a scan request from a listening device that are listening to obtain additional user data from the advertising device. The advertising device transmits a response to the scan request to the device, which transmits the scan request, over the same advertising physical channel as the advertising physical channel on which the scan request is received.

Broadcast user data, which is sent as part of advertisement packets, is dynamic data, whereas scan response data is generally static data.

The advertising device may receive a connection request from the initiating device on the advertising (broadcast) physical channel. If the advertising device uses a connectable advertising event and the initiating device is not filtered by the device filtering procedure, the advertising device may stop advertising and enter a connected mode. The advertising device may start advertising again after the connected mode.

Scanning Procedure

The scanning device, that is, a device that performs scanning performs the scanning procedure to listen to undirected broadcast of user data from advertising devices using advertising physical channels.

The scanning device transmits a scan request to the advertising device over the advertising physical channel to request additional data from the advertising device. The advertising device transmits a scan response, which is a response to the scan request, including additional data requested by the scanning device on the advertising physical channel.

The scanning device may use the scanning procedure while establishing connection with another BLE device in the BLE piconet.

If the scanning device receives a broadcast advertising event and is in an initiator mode capable of initiating a connection request, the scanning device may transmit the connection request to the advertising device over the advertising physical channel in order to initiate a Bluetooth connection with the advertising device.

When the scanning device sends the connection request to the advertising device, the scanning device may stop the initiator mode scanning for additional broadcast and enter the connected mode.

Discovering Procedure

Devices capable of Bluetooth communication (hereinafter referred to as Bluetooth devices) may perform the advertising procedure and scanning procedure to discover nearby devices or to be discovered by other devices within a given area.

The discovery procedure is performed asymmetrically. A Bluetooth device attempting to discover other nearby devices is called a discovering device. The discovering device listens to discover devices that advertise a scannable advertising event. An available Bluetooth device discovered by other devices is called a discoverable device. The discoverable device actively broadcasts an advertising event over the advertisement (broadcast) physical channel so that other devices scan the advertising event.

Both the discovering device and discoverable device may be already connected to other Bluetooth devices in the piconet.

Connecting Procedure

The connecting procedure is asymmetric. For the connecting procedure, it is required that other Bluetooth devices perform the scanning procedure while a specific Bluetooth device performs the advertising procedure.

That is, the advertising procedure may be the goal, so that only one device will respond to advertising. After receiving an accessible advertising event from the advertising device, the device may initiate connection by sending a connection request to the advertising device over the advertising (broadcast) physical channel.

Hereinafter, operation states in the BLE technology such as an advertising state, a scanning state, an initiating state, and a connection state will be briefly reviewed.

Advertising State

The link layer (LL) enters the advertising state according to an instruction from the host (stack). When the LL is in the advertising state, the LL transmits advertising packet data units (PDUs) for advertising events.

Each advertising event may include at least one advertisement PDU, and the advertising PDUs may be transmitted by advertising channel indices in use. The advertising event may be terminated when the advertising event is transmitted by the advertising channel indices where the advertising PDU(s) are used. If the advertising device needs to reserve a space for performing other functions, the advertising event may be terminated earlier.

Scanning State

The LL enters the scanning state according to an instruction from the host (stack). In the scanning state, the LL listens to advertising channel indices.

The scanning state has two types: passive scanning and active scanning. Each scanning type is determined by the host.

A separate time or advertising channel index for performing scanning is not defined.

In the scanning state, the LL listens to an advertising channel index for a scan window (scanWindow) duration. A scan interval (scanInterval) is defined as the interval between the starting points of two consecutive scan windows.

If there is no collision in scheduling, the LL should complete all scan intervals of scan windows as instructed by the host. In each scan window, the LL should scan a different advertising channel index. The LL uses every available advertising channel index.

For passive scanning, the LL only receives packets and does not transmit any packets.

For active scanning, the LL performs listening to receive an advertising PDU type for requesting advertising PDUs and additional information related to the advertising device from the advertising device.

Initiating State

The LL enters the initiating state according to an instruction from the host (stack).

When the LL is in the initiating state, the LL listens to advertising channel indices.

In the initiating state, the LL listens to an advertising channel index for a scan window duration.

Connection State

The LL enters the connection state when the initiating device, i.e., a device performing a connection request transmits a CONNECT_REQ PDU to the advertising device or when the advertising device receives the CONNECT_REQ PDU from the initiating device.

After the LL enters the connection state, connection may be created. However, the connection may not need to be established when the LL enters the connection state. The only difference between a newly created connection and a previously established connection is an LL connection supervision timeout value.

When two devices are connected, the two devices perform different roles.

An LL performing a master role is called a master, and an LL performing a slave role is called a slave. The master controls the timing of a connection event, and the connection event refers to a synchronization time point between the master and the slave.

Hereinafter, packets defined for a Bluetooth interface will be described in brief. BLE devices use the following packets.

Packet Format

The LL has only one packet format used for both an advertising channel packet and data channel packet.

Each packet includes four fields: a preamble field, an access address field, a PDU field, and a CRC field.

When one packet is transmitted on an advertising channel, the PDU may be an advertising channel PDU, and when one packet is transmitted on a data channel, the PDU may be a data channel PDU.

Advertising Channel PDU

The advertising channel PDU has a 16-bit header and a payload of various sizes.

The PDU type field of the advertising channel PDU included in the header indicates PDU types defined in Table 3 below.

TABLE 3

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called the advertising PDU and used in specific events.

ADV_IND: Connectable undirected advertising event

ADV_DIRECT_IND: Connectable directed advertising event

ADV_NONCONN_IND: Non-connectable undirected advertising event

ADV_SCAN_IND: Scannable undirected advertising event

The PDUs are transmitted by the LL in the advertising state and are received by the LL in the scanning state or initiating state.

Scanning PDU

The following advertising channel PDU types are called the scanning PDU and used in states described below.

SCAN_REQ: SCAN_REQ is transmitted by the LL in the scanning state and received by the LL in the advertising state.

SCAN_RSP: SCAN_RSP is transmitted by the LL in the advertising state and received by the LL in the scanning state.

Initiating PDU

The following advertising channel PDU type is called the initiating PDU.

CONNECT_REQ: CONNECT_REQ is transmitted by the LL in the initiating state and received by the LL in the advertising state.

Data Channel PDU

The data channel PDU has a 16-bit header and a payload of various sizes. The data channel PDU may include a message integrity check (MIC) field.

The procedures, states, packet formats, etc. in the BLE technology discussed above may be applied to perform methods proposed in the present disclosure.

Referring again to FIG. 4A, the load 455 may be a battery. The battery may store energy based on power outputted from the power pick-up unit 210. The mobile device 450 may not mandatorily include the battery. For example, the battery may be provided as a detachable external component. In another example, the wireless power receiver 200 may include a driving means for performing various operations of the electronic device, instead of the battery.

Although it is shown that the mobile device 450 includes the wireless power receiver 200 and the base station 400 includes the wireless power transmitter 100, the wireless power receiver 200 may be identified with the mobile device 450 and the wireless power transmitter 100 may be identified with the base station 400 in a broad sense.

When the communication and control unit 120 and the communication and control unit 220 include Bluetooth or BLE as the OB communication module or short-range communication module in addition to the IB communication module, the wireless power transmitter 100 including the communication and control unit 120 and the wireless power receiver 200 including the communication and control unit 220 may be illustrated as a simple block diagram such as FIG. 4C.

FIG. 4C is a block diagram illustrating a wireless power transfer system using BLE communication according to an embodiment of the present disclosure.

Referring to FIG. 4C, the wireless power transmitter 100 includes the power conversion unit 110 and the communication and control unit 120. The communication and control unit 120 includes an in-band communication module 121 and a BLE communication module 122.

The wireless power receiver 200 includes the power pickup unit 210 and the communication and control unit 220. The communication and control unit 220 includes an in-band communication module 221 and a BLE communication module 222.

In one aspect, the BLE communication modules 122 and 222 perform the architectures and operations shown in FIG. 4B. For example, the BLE communication modules 122 and 222 may be used to establish connection between the wireless power transmitter 100 and the wireless power receiver 200 and exchange control information and packets necessary for wireless power transfer.

In another aspect, the communication and control unit 120 may be configured to operate a profile for wireless charging. Here, the profile for wireless charging may be a GATT based on BLE transmission.

Figure 4D:
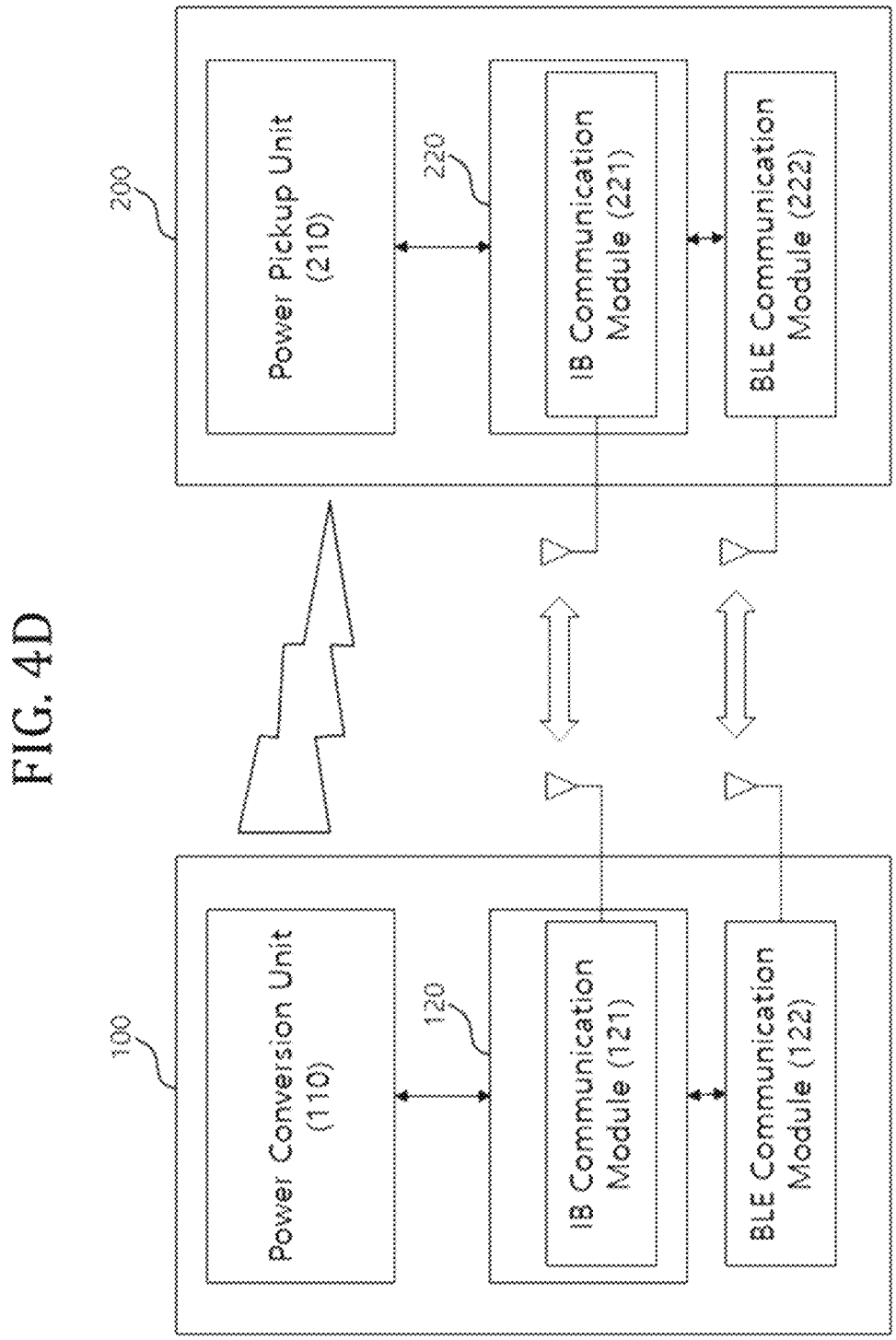
FIG. 4D is a block diagram illustrating a wireless power transfer system using BLE communication according to another embodiment of the present disclosure.

As shown in FIG. 4D, the communication and control units 120 and 220 include only the in-band communication modules 121 and 221, respectively. The BLE communication modules 122 and 222 may be provided separately from the communication and control units 120 and 220.

Hereinafter, a coil or coil unit may be referred to as a coil assembly, a coil cell, or a cell, which includes the coil and at least one element close to the coil.

FIG. 5 is a state transition diagram for explaining a wireless power transfer procedure.

Referring to FIG. 5, power transfer from the wireless power transmitter to the wireless power receiver according to an embodiment of the present disclosure may be broadly divided into a selection phase 510, a ping phase 520, an identification and configuration phase 530, a negotiation phase 540, a calibration phase 550, a power transfer phase 560, and a renegotiation phase 570.

The selection phase 510 is a transition phase including reference numerals S502, S504, S508, S510, and S512 when a specific error or a specific event is detected at the beginning of or during power transfer. The specific error and specific event will be described in detail later. In the selection phase 510, the wireless power transmitter may monitor whether an object is present on an interface surface. If the wireless power transmitter detects that an object is placed on the interface surface, the wireless power transmitter may transition to the ping phase 520. In the selection phase 510, the wireless power transmitter transmits an analog ping signal, which is a power (or pulse) signal with a very short duration. The wireless power transmitter may detect whether an object is present in an active area of the interface surface based on a current change in a transmitting coil or a primary coil.

When an object is detected in the selection phase 510, the wireless power transmitter may measure the quality factor of a wireless power resonance circuit (e.g., a power transmission coil and/or a resonance capacitor). According to an embodiment of the present disclosure, when an object is detected in the selection phase 510, the wireless power transmitter may measure the quality factor to determine whether a foreign object exists in the charging area along with the wireless power receiver. The inductance and/or series resistance component of the coil provided in the wireless power transmitter may be reduced due to a change in the environment, and the decrease may reduce the quality factor. To determine the presence or absence of a foreign object based on the measured quality factor, the wireless power transmitter may receive from the wireless power receiver a reference quality factor, which is measured in advance in a state where no foreign object is placed in the charging area. The wireless power transmitter may determine the presence or absence of a foreign object by comparing the measured quality factor with the reference quality factor, which is received during the negotiation phase 540. However, when the wireless power receiver has a low reference quality factor (for example, the reference quality factor of the wireless power receiver may decrease depending on the type, purpose, characteristics, etc. of the wireless power receiver), the difference between the reference quality factor and the quality factor measured under the presence of a foreign object may be insignificant so that it may be difficult to determine the presence of the foreign object. Accordingly, in this case, other determination factors should be further considered, or the presence of a foreign object should be determined based on another method.

In another embodiment of the present disclosure, when an object is detected in the selection phase 510, the quality factor may be measured within a specific frequency range (e.g., operating frequency range) to determine whether the object is placed with a foreign object in the charging area. The inductance and/or series resistance component of the coil of the wireless power transmitter may be reduced due to a change in the environmental, and thus the resonant frequency of the coil of the wireless power transmitter may be changed (shifted). That is, a quality factor peak frequency, which is a frequency at which the maximum quality factor is measured within the operating frequency band, may be shifted.

In the ping phase 520, if the wireless power transmitter detects an object, the wireless power transmitter wakes up the receiver and transmits a digital ping for identifying whether the detected object is the wireless power receiver. If the wireless power transmitter fails to receive a response signal for the digital ping such as a signal intensity packet from the receiver during the ping phase 520, the wireless power transmitter may transition back to the selection phase 510. In addition, if the wireless power transmitter receives a signal indicating the completion of the power transfer such as a charging complete packet from the receiver during the ping phase 520, the wireless power transmitter may transition back to the selection phase 510.

When the ping phase 520 is completed, the wireless power transmitter may transition to the identification and configuration phase 530 for identifying the receiver and collecting information on the configuration and state of the receiver.

During the identification and configuration phase 530, if the wireless power transmitter receives an unexpected packet or fails to receive a desired packet for a predetermined period of time, if a packet transmission error occurs, or if no power transfer contract is configured, the wireless power transmitter may transition to the selection phase 510.

Based on the value of a negotiation field in a configuration packet, which is received during the identification and configuration phase 530, the wireless power transmitter may check whether the wireless power transmitter needs to enter the negotiation phase 540. If negotiation is needed, the wireless power transmitter may enter the negotiation phase 540 and then perform a predetermined a foreign object detection (FOD) detection procedure. On the contrary, if no negotiation is needed, the wireless power transmitter may immediately enter the power transfer phase 560.

In the negotiation phase 540, the wireless power transmitter may receive a FOD status packet including the reference quality factor. Alternatively, the wireless power transmitter may receive an FOD status packet including a reference peak frequency. Alternatively, the wireless power transmitter may receive an FOD status packet including the reference quality factor and the reference peak frequency. In this case, the wireless power transmitter may determine a quality factor threshold for FOD based on the reference quality factor. The wireless power transmitter may determine a peak frequency threshold for FOD based on the reference peak frequency value.

The wireless power transmitter may detect whether a foreign object (FO) exists in the charging area based on the determined quality factor threshold for FOD and the currently measured quality factor (which is measured before the ping phase). The wireless power transmitter may control power transfer according to the FOD result. For example, when the FO is detected, the wireless power transmitter may stop the power transfer, but the present disclosure is not limited thereto.

The wireless power transmitter may detect whether an FO exists in the charging area based on the determined peak frequency threshold for FOD and the currently measured peak frequency (which is measured before the ping phase). The wireless power transmitter may control power transfer according to the FOD result. For example, when the FO is detected, the wireless power transmitter may stop the power transfer, but the present disclosure is not limited thereto.

When the FO is detected, the wireless power transmitter may return to the selection phase 510. On the other hand, when the FO is not detected, the wireless power transmitter may enter the power transfer phase 560 through the calibration phase 550. Specifically, when the FO is not detected, the wireless power transmitter may determine the strength of power received by the receiver and then measure power loss between the receiver and transmitter in the calibration phase 550 in order to determine the strength of power transmitted from the transmitting end. That is, the wireless power transmitter may estimate the power loss based on a difference between the transmitted power of the transmitter and the received power of the receiver in the calibration phase 550. In one embodiment, the wireless power transmitter may correct the threshold for FOD by reflecting the estimated power loss.

During the power transfer phase 560, if the wireless power transmitter receives an unexpected packet or fails to receive a desired packet for a predetermined period of time, if there is an error in the predetermined power transfer contract (power transfer contract violation), or if charging is completed, the wireless power transmitter may transition to the selection phase 510.

If the wireless power transmitter needs to reconfigure the power transfer contract according to a change in the state of the wireless power transmitter during the power transfer phase 560, the wireless power transmitter may transition to the renegotiation phase 570. In this case, if the renegotiation is normally completed, the wireless power transmitter may return to the power transfer phase 560.

In this embodiment, although the calibration phase 550 and the power transfer phase 560 are separated into different phases, the calibration phase 550 may be integrated into the power transfer phase 560. In this case, the operations in the calibration phase 550 may be performed during the power transfer phase 560.

The power transfer contract may be established based on information about the states and characteristics of the wireless power transmitter and receiver. For example, the wireless power transmitter state information may include information on the maximum amount of transmitted power, information on the maximum number of acceptable receivers, etc. The wireless power receiver state information may include information on required power, etc.

Figure 6:
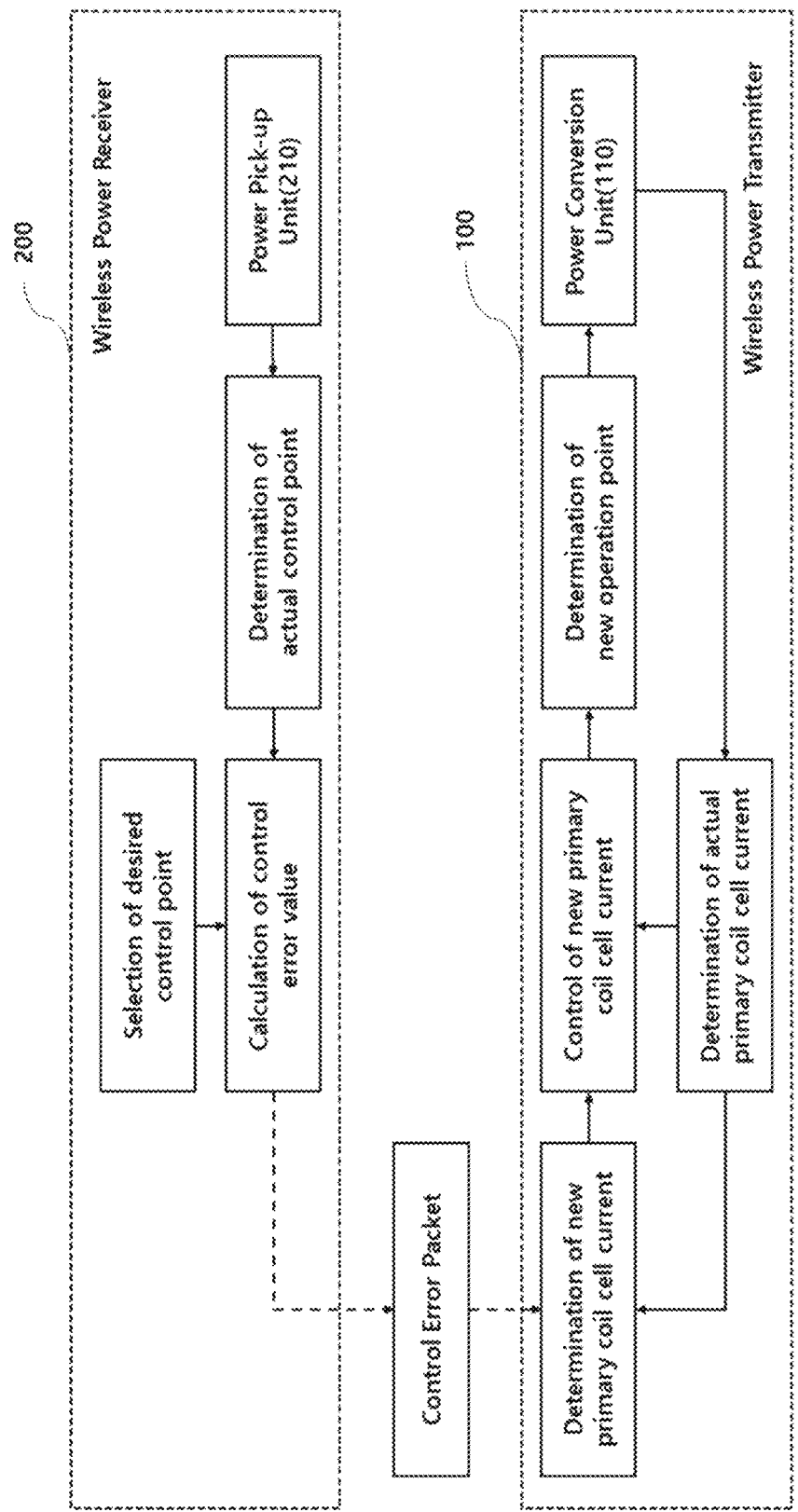
FIG. 6 illustrates a power control method according to an embodiment of the present disclosure.

FIG. 6 illustrates a power control method according to an embodiment of the present disclosure.

Referring to FIG. 6, in the power transfer phase 560, the wireless power transmitter 100 and the wireless power receiver 200 may control the amount of power transmitted for both communication and power transmission/reception. The wireless power transmitter and wireless power receiver operate at a specific control point. The control point represents a combination of the voltage and current provided at the output end of the wireless power receiver when the power transfer is performed.

More specifically, the wireless power receiver may select a desired control point such as a desired output current/voltage and the temperature of a specific location of the mobile device and additionally determine an actual control point. The wireless power receiver may calculate a control error value based on the desired control point and the actual control point and transmit the control error value to the wireless power transmitter as a control error packet.

In addition, the wireless power transmitter may control the power transfer by configuring/controlling a new operating point such as an amplitude, a frequency, and a duty cycle based on the received control error packet. Thus, the control error packet is transmitted/received at regular time intervals during the power transfer phase. In an embodiment, the wireless power receiver may set the control error value to a negative number to reduce the current of the wireless power transmitter. On the contrary, the wireless power receiver may set the control error value to a positive value to increase the current of the wireless power transmitter. In an induction mode, the wireless power receiver may control the power transfer by transmitting the control error packet to the wireless power transmitter as described above.

A resonance mode, which will be described below, may operate in a different way from the induction mode. In the resonance mode, one wireless power transmitter needs to be capable of simultaneously serving a plurality of wireless power receivers. However, when power transfer is controlled as in the induction mode, transmitted power may be controlled by communication with one wireless power receiver, and as a result, it may be difficult to control power transfer to additional wireless power receivers. Therefore, in the resonant mode of present disclosure, the wireless power transmitter may transmit basic power in common, and the wireless power receiver may control the amount of received power by controlling its own resonance frequency. However, the method described with reference to FIG. 6 is not completely excluded even in the resonance mode operation, and additional transmission power control may be performed according to the method of FIG. 6.

Figure 7:
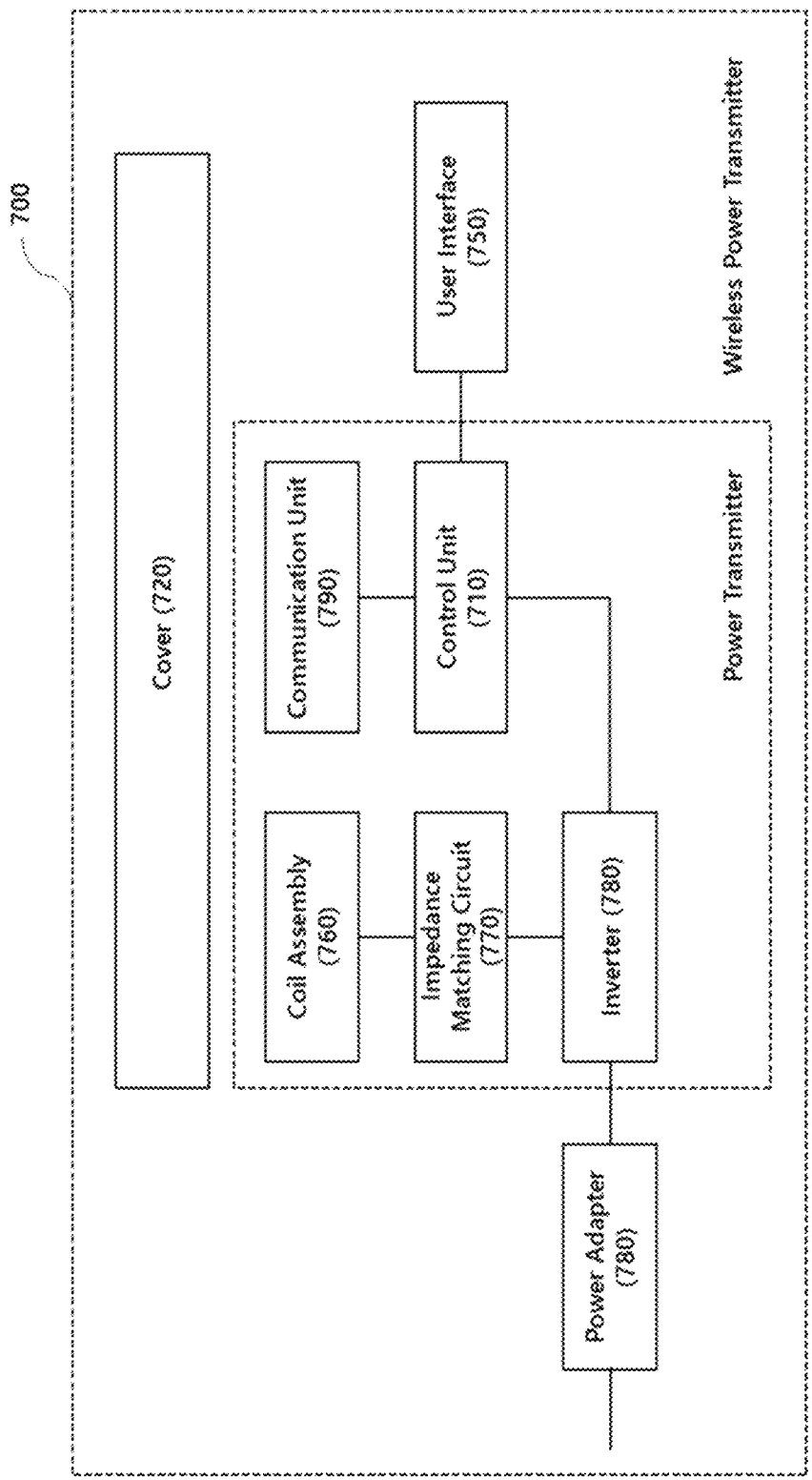
FIG. 7 is a block diagram of a wireless power transmitter according to another embodiment of the present disclosure.

FIG. 7 is a block diagram of a wireless power transmitter according to another embodiment of the present disclosure. The wireless power transmitter may be included in a wireless power transfer system operating in a magnetic resonance mode or a shared mode. The shared mode may refer to a mode in which a wireless power transmitter performs one-to-many communication and charging with wireless power receivers. The shared mode may be implemented based on magnetic induction or resonance.

Referring to FIG. 7, a wireless power transmitter 700 may include at least one of a cover 720 configured to cover a coil assembly, a power adapter 730 configured to supply power to a power transmitter 740, the power transmitter 740, or a user interface 750 configured to provide power transfer progress and other related information. In particular, the user interface 750 may be optionally included or may be included as another user interface 750 for the wireless power transmitter 700.

The power transmitter 740 may include at least one of a coil assembly 760, an impedance matching circuit 770, an inverter 780, a communication unit 790, or a control unit 710.

The coil assembly 760 may include at least one primary coil configured to generate a magnetic field. The coil assembly 760 may be referred to as a coil cell.

The coil assembly 760 may include at least one primary coil configured to generate a magnetic field. The coil assembly 760 may be referred to as a coil cell. The impedance matching circuit 770 may provide impedance matching between the inverter and the primary coil(s). The impedance matching circuit 770 may generate resonance at a suitable frequency to boost the primary coil current. If the power transmitter 740 is a multi-coil power transmitter, the impedance matching circuit may further include a multiplexer configured to route a signal from the inverter to a subset of the primary coils. The impedance matching circuit may be referred to as a tank circuit.

The impedance matching circuit 770 may include a capacitor, an inductor, and a switching device for switching connection thereof. The impedance matching may be performed as follows. First, the reflected wave of wireless power transmitted through the coil assembly 760 is detected. Then, the switching device is switched based on the detected reflected wave so that the connection state of the capacitor or inductor, the capacitance of the capacitor, or the inductance of the inductor is adjusted. In some cases, the impedance matching circuit 770 may be omitted. The present disclosure may include an embodiment in which the wireless power transmitter 700 does not include the impedance matching circuit 770.

The inverter 780 may convert a DC input into an AC signal. The inverter 780 may be a half-bridge inverter or a full-bridge inverter to generate pulse waves and duty cycles at adjustable frequencies. The inverter may also include a plurality of stages to adjust the input voltage level.

The communication unit 790 may perform communication with a power receiver. The power receiver performs load modulation to transmit requests and information to the power transmitter. Accordingly, the power transmitter 740 may monitor the amplitude and/or phase of the current and/or voltage of the primary coil in order to demodulate data transmitted by the power receiver based on the communication unit 790.

In addition, the power transmitter 740 may control output power to transmit data through the communication unit 790 based on frequency shift keying (FSK).

The control unit 710 may control communication and power transmission of the power transmitter 740. The control unit 710 may control the power transmission by adjusting the above-described operating point. The operating point may be determined by, for example, at least one of an operating frequency, a duty cycle, and an input voltage.

The communication unit 790 and the control unit 710 may be provided as separate units/devices/chipsets or as one unit/device/chipsets.

Figure 8:
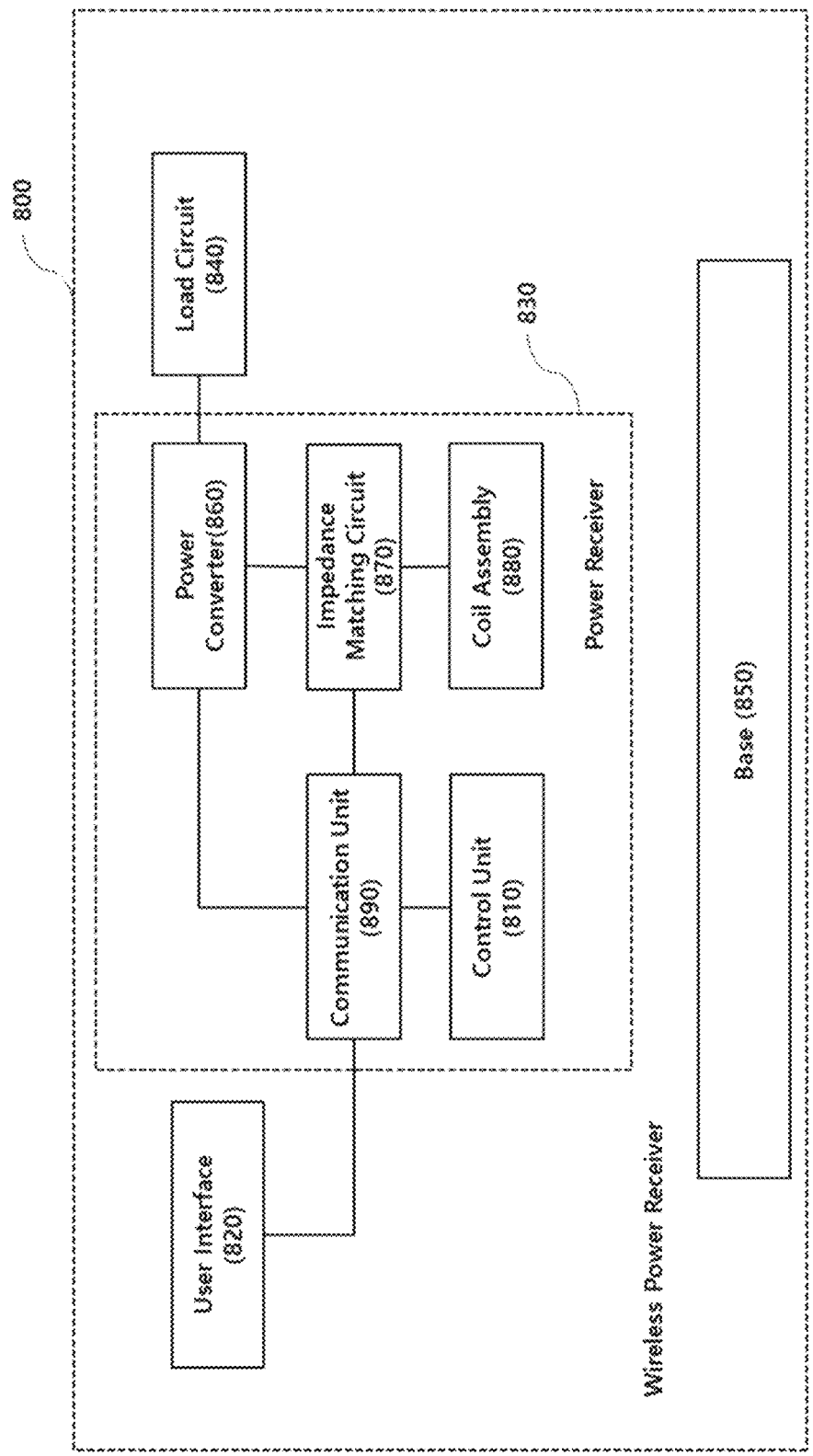
FIG. 8 illustrates a wireless power receiver according to another embodiment of the present disclosure.

FIG. 8 illustrates a wireless power receiver according to another embodiment of the present disclosure. The wireless power receiver may be included in a wireless power transfer system operating in the magnetic resonance mode or shared mode.

In FIG. 8, a wireless power receiving device 800 may include at least one of a user interface 820 configured to provide power transfer progress and other related information, a power receiver 830 configured to receives wireless power, a load circuit 840, or a base 850 configured to support and cover a coil assembly. In particular, the user interface 820 may be optionally included or may be included as another user interface 820 of the power receiver.

The power receiver 830 may include at least one of a power converter 860, an impedance matching circuit 870, a coil assembly 880, a communication unit 890, or a control unit 810.

The power converter 860 may convert AC power received from a secondary coil into a voltage and current suitable for the load circuit. In an embodiment, the power converter 860 may include a rectifier. The rectifier may rectify received wireless power in order to convert the received wireless power from AC power to DC power. The rectifier may use a diode or a transistor to convert the AC power into the DC power and use a capacitor and a resistor to smooth the DC power. A full-wave rectifier, a half-wave rectifier, a voltage multiplier, etc., which are implemented as a bridge circuit, may be used as the rectifier. Additionally, the power converter may adapt the reflected impedance of the power receiver.

The impedance matching circuit 870 may provide impedance matching between the secondary coil and a combination of the power converter 860 and the load circuit 840. In an embodiment, the impedance matching circuit 870 may generate resonance at a frequency near 100 kHz to improve power transfer. The impedance matching circuit 870 may include a capacitor, an inductor, and a switching device for switching a combination thereof. The impedance matching may be performed by controlling the switching device in the impedance matching circuit 870 based on the voltage, current, power, frequency, etc. of the received wireless power. In some cases, the impedance matching circuit 870 may be omitted. The present disclosure may include an embodiment in which the wireless power transmitter 800 does not include the impedance matching circuit 870.

The coil assembly 880 includes at least one secondary coil. In addition, the coil assembly 880 may optionally include an element for shielding a metal part of the receiver from the magnetic field.

The communication unit 890 may perform load modulation to provide requests and other information to the power transmitter.

To this end, the power receiver 830 may switch the resistor or capacitor to change the reflected impedance.

The control unit 810 may control received power. To this end, the control unit 810 may determine/calculate a difference between the actual operating point and desired operating point of the power receiver 830. In addition, the control unit 810 may adjust/reduce the difference between the actual operating point and desired operating point by adjusting the reflected impedance of the power transmitter and/or performing a request for adjusting the operating point of the power transmitter. When the difference is minimized, optimal power reception may be achieved.

The communication unit 890 and the control unit 810 may be provided as separate devices/chipsets or as one device/chipset.

Figure 9:
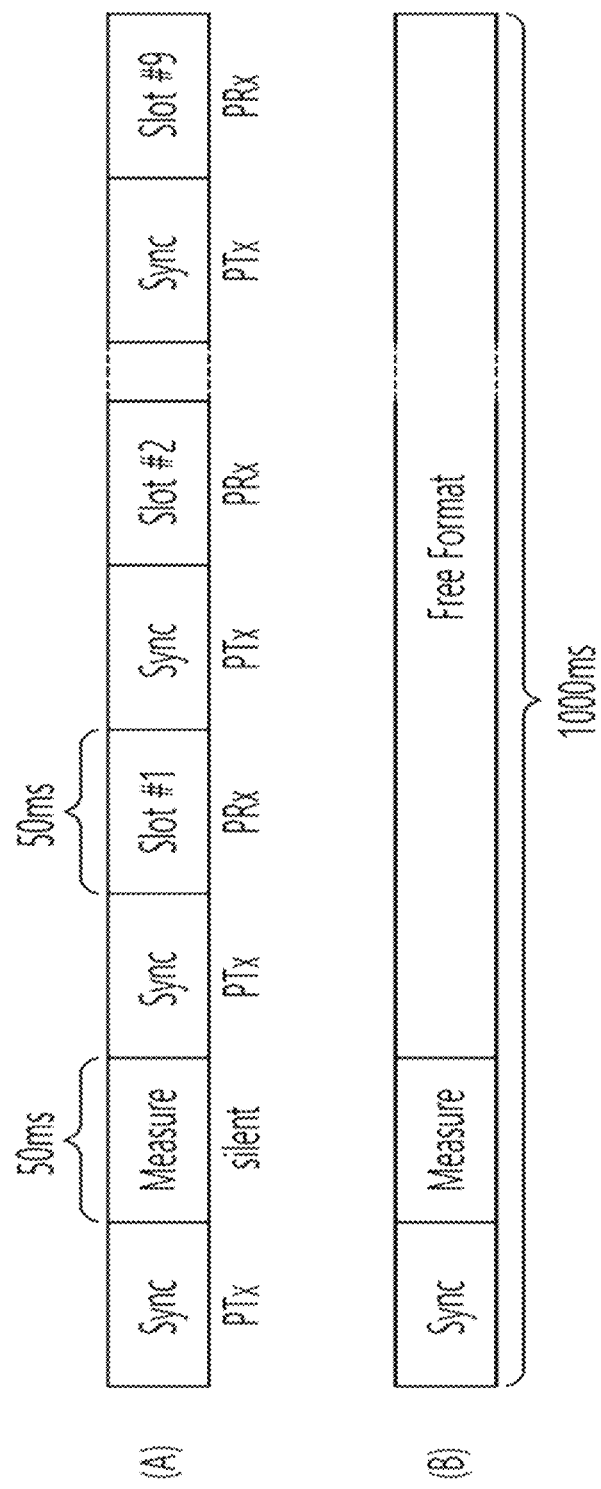
FIG. 9 illustrates a communication frame structure according to an embodiment of the present disclosure.

FIG. 9 illustrates a communication frame structure according to an embodiment of the present disclosure. The communication frame structure may be a communication frame structure operating in the shared mode.

Referring to FIG. 9, different types of frames may be used together in the shared mode. For example, a slotted frame having a plurality of slots as shown in (A) and a free-format frame having no specific shape as shown in (B) may be used in the shared mode. Specifically, the slotted frame is a frame for transmission of short data packets from the wireless power receiver 200 to the wireless power transmitter 100, and the free-format frame is a frame capable of transmission of long data packets due to no slots.

Meanwhile, the slotted frame and the free-format frame may be called various names by those skilled in the art. For example, the slotted frame may be referred to as a channel frame, and the free-format frame may be referred to as a message frame.

Specifically, the slotted frame may include a synchronization pattern indicating the start of the frame, a measurement slot, 9 slots, and additional synchronization patterns having the same time duration, which are located before the 9 slots, respectively.

Here, the additional synchronization pattern is different from the above-described synchronization pattern indicating the start of the frame. Specifically, an additional synchronization pattern may indicate information on adjacent slots (information on two consecutive slots located on the sides of the synchronization pattern), instead of indicating the start of the frame.

The synchronization pattern may be located between two consecutive slots among the 9 slots. In this case, the synchronization pattern may provide information on the two consecutive slots.

In addition, the 9 slots and the synchronization patterns provided before the 9 slots may have the same time duration. For example, each of the 9 slots may have a time duration of 50 ms. Also, each of the 9 synchronization patterns may have a time duration of 50 ms.

On the other hand, the free-format frame shown in (B) may not have a specific form except for the synchronization pattern indicating the start of the frame and the measurement slot. That is, the free-format frame is to perform a different role from the slotted frame. For example, the free-format frame may be used for communication of long data packets (e.g., additional owner information packets) between the wireless power transmitter and the wireless power receiver. Alternatively, when the wireless power transmitter includes a plurality of coils, the free-format frame may be used to select any one of the plurality of coils.

Hereinafter, synchronization patterns included in each frame will be described in detail with reference to the drawings.

FIG. 10 illustrates a structure of a synchronization pattern according to an embodiment of the present disclosure.

Referring to FIG. 10, the synchronization pattern includes a preamble, a start bit, a response field, a type field, an information field, and a parity bit. In FIG. 10, the start bit is denoted by ZERO.

Specifically, the preamble may include consecutive bits, all of which may be set to 0. That is, the preamble may be bits for matching the time length of the synchronization pattern.

The number of bits included in the preamble may depend on the operating frequency such that the length of the synchronization pattern is closest to 50 within a range not exceeding 50 ms. For example, when the operating frequency is 100 kHz, the synchronization pattern may include two preamble bits. When the operating frequency is 105 kHz, the synchronization pattern may include three preamble bits.

The start bit may be located behind the preamble and denoted by ZERO. ZERO may indicate the type of the synchronization pattern. Here, the synchronization pattern type may include frame synchronization including frame related information and slot synchronization including slot related information. That is, the synchronization pattern may correspond to either the frame synchronization, which is located between consecutive frames and indicates the start of a frame, or the slot synchronization, which is located between consecutive slots among a plurality of slots included in a frame and includes including information on the consecutive slot.

For example, if ZERO is 0, it may mean that the synchronization pattern is the slot synchronization between slots. If ZERO is 1, it may mean that the synchronization pattern is the frame synchronization located between frames.

The parity bit is the last bit of the synchronization pattern and may indicate information on the number of bits in the data fields (i.e., response field, type field, information field) of the synchronization pattern. For example, when the number of bits included in the data fields of the synchronization pattern is an even number, the parity bit may be 1. Otherwise (when the number of bits is an odd number), the parity bit may be 0.

The response field may include information on the response of the wireless power transmitter to communication with the wireless power receiver in a slot before the synchronization pattern. For example, the response field may be set to 00 if the wireless power transmitter does not detect communication with the wireless power receiver. The response field may be set to 01 if the wireless power transmitter has a communication error in communication with the wireless power receiver. The communication error may occur when two or more wireless power receivers attempt to access one slot and thus a collision occurs between the two or more wireless power receivers.

The response field may include information on whether a data packet is correctly received from the wireless power receiver. Specifically, the response field may be set to 10 (negative acknowledgement (NAK)) when the wireless power transmitter denies the data packet. The response field may be set to 11 (acknowledgement (ACK)) when the wireless power transmitter confirms the data packet.

The type field may indicate the type of the synchronization pattern. Specifically, when the synchronization pattern is the first synchronization pattern of the frame (that is, when the synchronization pattern is the first synchronization pattern of the frame located before the measurement slot), the type field may be set to 1 to indicate the frame synchronization.

When the synchronization pattern is not the first synchronization pattern of the frame in the slotted frame, the type field may be set to 0 to indicate the slot synchronization.

The value of the information field may be determined according to the synchronization pattern type indicated by the type field. For example, when the type field is 1 (frame synchronization), the information field may indicate the frame type. That is, the information field may indicate whether the current frame is the slotted frame or free-format frame. For example, when the information field is 00, it may indicate the slotted frame. When the information field is 01, it may indicate the free-format frame.

On the contrary, when the type field is 0 (slot synchronization), the information field may indicate the state of a next slot located after the synchronization pattern. Specifically, the information field may be set to 00 when the next slot is a slot allocated to a specific wireless power receiver. The information field may be set to 01 when the next slot is locked for temporary use by a specific wireless power receiver. The information field may be set to 10 when the next slot is a slot freely available to any wireless power receiver.

Figure 11:
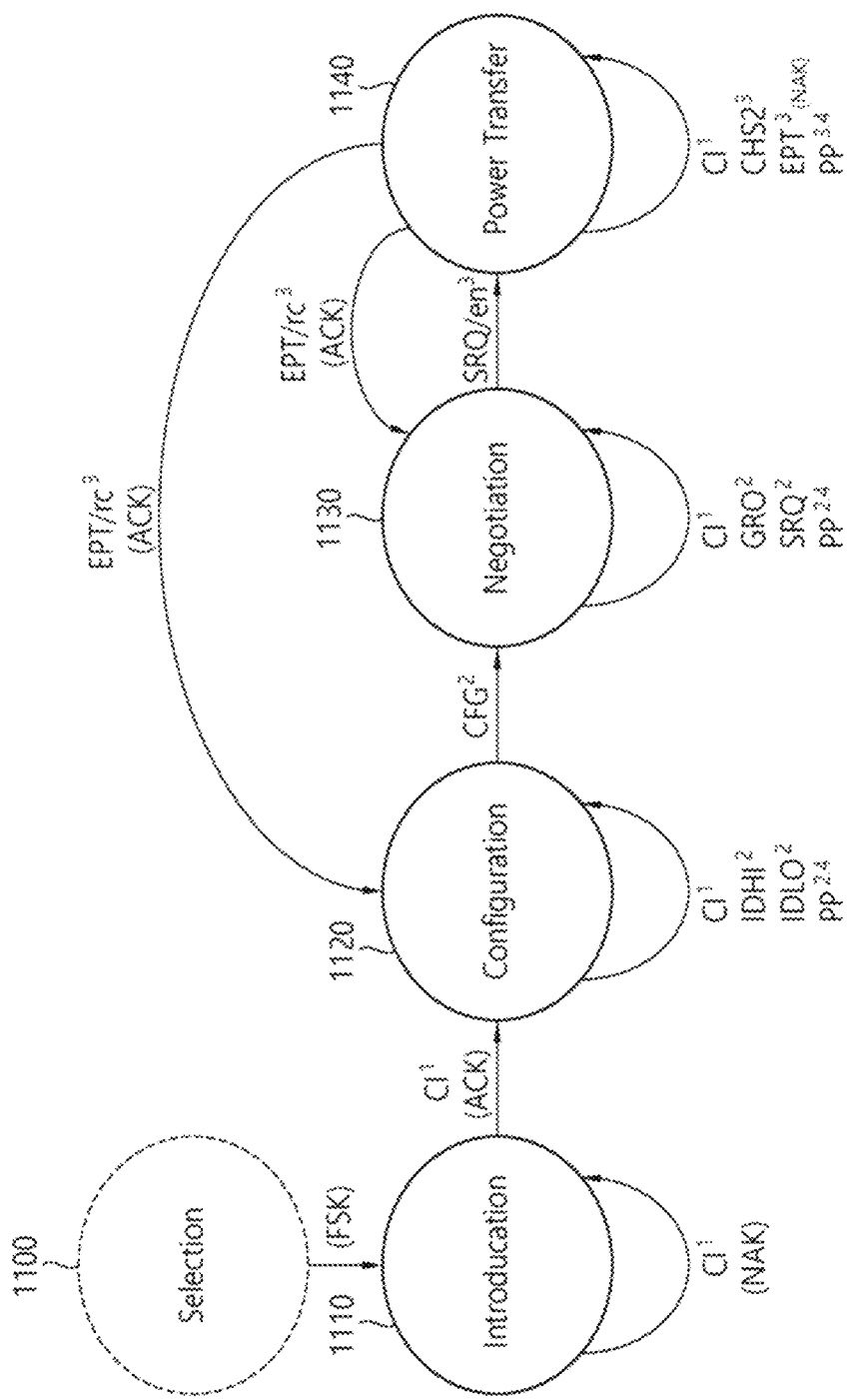
FIG. 11 illustrates operating states of a wireless power transmitter and receiver in a shared mode according to an embodiment of the present disclosure.

FIG. 11 illustrates operating states of a wireless power transmitter and receiver in the shared mode according to an embodiment of the present disclosure.

Referring to FIG. 11, the wireless power receiver operating in the shared mode may be in any one of a selection phase 1100, an introduction phase 1110, a configuration phase 1120, a negotiation phase 1130, and a power transfer phase 1140.

According to an embodiment of the present disclosure, the wireless power transmitter may transmit a wireless power signal to detect the wireless power receiver. That is, a process for detecting the wireless power receiver based on the wireless power signal may be referred to as analog ping.

Upon receiving the wireless power signal, the wireless power receiver may enter the selection phase 1100. After entering the selection phase 1100, the wireless power receiver may detect the presence of an FSK signal on the wireless power signal as described above.

That is, the wireless power receiver may perform communication in either an exclusive mode or the shared mode depending on the presence of the FSK signal.

Specifically, if the wireless power signal includes the FSK signal, the wireless power receiver may operate in the shared mode. Otherwise, the wireless power receiver may operate in the exclusive mode.

When the wireless power receiver operates in the shared mode, the wireless power receiver may enter the introduction phase 1110. The wireless power receiver may transmit a control information (CI) packet to the wireless power transmitter in the introduction phase 1110 in order to transmit CI packets in the configuration phase, negotiation phase, and power transfer phase. The CI packet may include a header and control related information. For example, the header in the CI packet may be 0X53.

In the introduction phase 1110, the wireless power receiver attempts to request free slots in order to transmit CI packets in the configuration, negotiation, and power transmission phases. The wireless power receiver selects a free slot and transmits the first CI packet. If the wireless power transmitter transmits an ACK for the CI packet, the wireless power transmitter enters the configuration phase. If the wireless power transmitter transmits a NACK, it may be interpreted to mean that another wireless power receiver is in the process of configuring and negotiating. In this case, the wireless power receiver attempts to request free slots again.

If the wireless power receiver receives the ACK in response to the CI packet, the wireless power receiver determines the position of a private slot in a frame by counting the remaining synchronization slots until the first frame synchronization. In all subsequent slot-based frames, the wireless power receiver transmits a CI packet through the corresponding slot.

If the wireless power transmitter allows the wireless power receiver to proceed to the configuration phase, the wireless power transmitter provides a series of locked slots for exclusive use of the wireless power receiver, which ensures that the wireless power receiver proceeds to the configuration phase without collision.

The wireless power receiver transmits sequences of data packets such as two identification data packets (IDHI and IDLO) in the locked slots. After completing this step, the wireless power receiver enters the negotiation phase. In the negotiation phase, the wireless power transmitter continues to provide the wireless power receiver with locked slots for exclusive use. This ensures that the wireless power receiver proceeds to the negotiation phase without collision.

The wireless power receiver transmits one or more negotiation data packets in the corresponding locked slots, and in this case, the negotiation data packets may be mixed with private data packets. Eventually, the sequence ends with a specific request (SRQ) packet. After completion of the sequence, the wireless power receiver enters the power transfer phase, and the wireless power transmitter stops providing locked slots.

In the power transfer phase, the wireless power receiver transmits a CI packet in an allocated slot and receives power. The wireless power receiver may include a regulator circuit. The regulator circuit may be included in a communication and control unit. The wireless power receiver may self-regulate the reflection impedance of the wireless power receiver based on the regulator circuit. In other words, the wireless power receiver may adjust the reflected impedance to transmit the amount of power required by an external load, which may prevent excessive power reception and overheating.

In the shared mode, the wireless power transmitter may not perform power adjustment in response to the received CI packet (depending on the operation mode), and thus, control may be required to prevent an overvoltage state.

Hereinafter, authentication between the wireless power transmitter and the wireless power receiver will be described.

A wireless power transfer system using IB communication may employ USB-C authentication. The authentication includes authentication of the wireless power transmitter by the wireless power receiver and authentication of the wireless power receiver by the wireless power transmitter.

FIG. 12 is a block diagram illustrating a wireless charging certificate format according to an embodiment of the present disclosure.

Referring to FIG. 12, the wireless charging certificate format may include a wireless charging standard certificate structure version (Qi Authentication Certificate Structure Version), a reserved bit, a PTx and leaf indicator (PTx Leaf), a certificate type, a signature offset, a serial number, an issuer ID, a subject ID, a public key, and a signature.

In the wireless charging certificate format, the PTx and leaf indicator is separated from the certificate type so that the PTx and leaf indicator and the certificate type are allocated to different bits in the same byte (B0).

The PTx and leaf indicator indicates not only whether the corresponding certificate relates to the wireless power transmitter but also whether the corresponding certificate is a leaf certificate. That is, the PTx and leaf indicator may indicate whether the corresponding certificate is the leaf certificate for the wireless power transmitter or not.

The PTx and leaf indicator may be 1 bit. If the PTx and leaf indicator is 0, it may indicate that the corresponding certificate is not the leaf certificate or that the corresponding certificate is the leaf certificate of the wireless power receiver. On the other hand, if the PTx and leaf indicator is 1, it may indicate that the corresponding certificate is the leaf certificate of the wireless power transmitter.

The certificate type is, for example, 2 bits. The certificate type may indicate that the corresponding certificate is any one of a root certificate, an intermediate certificate, and a leaf certificate. Alternatively, the certificate type may indicate that the corresponding certificate is for all of them.

The wireless power transmitter may inform the wireless power receiver whether the authentication function is supported through a capability packet (in the case of authentication of the wireless power transmitter by the wireless power receiver (authentication of PTx by PRx)). Hereinafter, the structure of indication information (capability packet and configuration packet) regarding whether or not the authentication function is supported will be described in detail.

FIG. 13 illustrates a structure of a capability packet of a wireless power transmitter according to an embodiment of the present disclosure.

Referring to FIG. 13, a capability packet having a corresponding header value of 0X31 is 3 bytes. The first byte (B0) includes a power class and a guaranteed power value. The second byte (B1) includes a reserved bit and a potential power value. The third byte (B2) includes an AI (AI), an AR (AR), a reserved bit, WPID, and Not Res Sens. Specifically, the AI is 1 bit. For example, if the value of the AI is '1b', it indicates that the wireless power transmitter may operate as an AI. In addition, the AR is 1 bit. For example, if the value of the AR is '1b', it indicates that the wireless power transmitter may operate as an AR.

FIG. 14 illustrates a structure of a configuration packet of a wireless power receiver according to an embodiment of the present disclosure.

Referring to FIG. 14, a configuration packet having a header value of 0X51 is 5 bytes. The first byte (B0) includes a power class and a maximum power value. The second byte (B1) includes an AI, an AR, and a reserved bit (Reserve). The third byte (B2) includes Prop, Reserve, ZERO, and Count. The fourth byte (B3) includes a window size and a window offset. The fifth byte (B4) includes Neg, polarity, depth, authentication (Auth), and Reserve. Specifically, the AI is 1 bit. For example, if the AI value is '1b', it indicates that the wireless power receiver may operate as an AI. In addition, the AR is 1 bit. For example, if the AR value is '1b', it indicates that the wireless power receiver may operate as an AR.

A message used in an authentication procedure is called an authentication message. The authentication message is used to carry information related to authentication. There are two types of authentication messages. One is an authentication request, and the other is an authentication response. The authentication request is sent by the AI, and the authentication response is sent by the AR. The wireless power transmitter and receiver may be the AI or AR. For example, when the wireless power transmitter is the AI, the wireless power receiver becomes the AR. On the contrary, when the wireless power receiver is the AI, the wireless power transmitter becomes the AR.

The authentication request message includes GET_DIGESTS (i.e., 4 bytes), GET_CERTIFICATE (i.e., 8 bytes), and CHALLENGE (i.e., 36 bytes).

The authentication response message includes DIGESTS (i.e., 4+32 bytes), CERTIFICATE (i.e., 4+Certificate Chain (3×512 bytes)=1540 bytes), CHALLENGE_AUTH (i.e., 168 bytes), and ERROR (i.e., 4 bytes).

The authentication message may be called an authentication packet, authentication data, and authentication control information. In addition, the GET_DIGEST message may be referred to as a GET_DIGEST packet, and the DIGESTS message may be referred to as a DIGEST packet.

Figure 15:
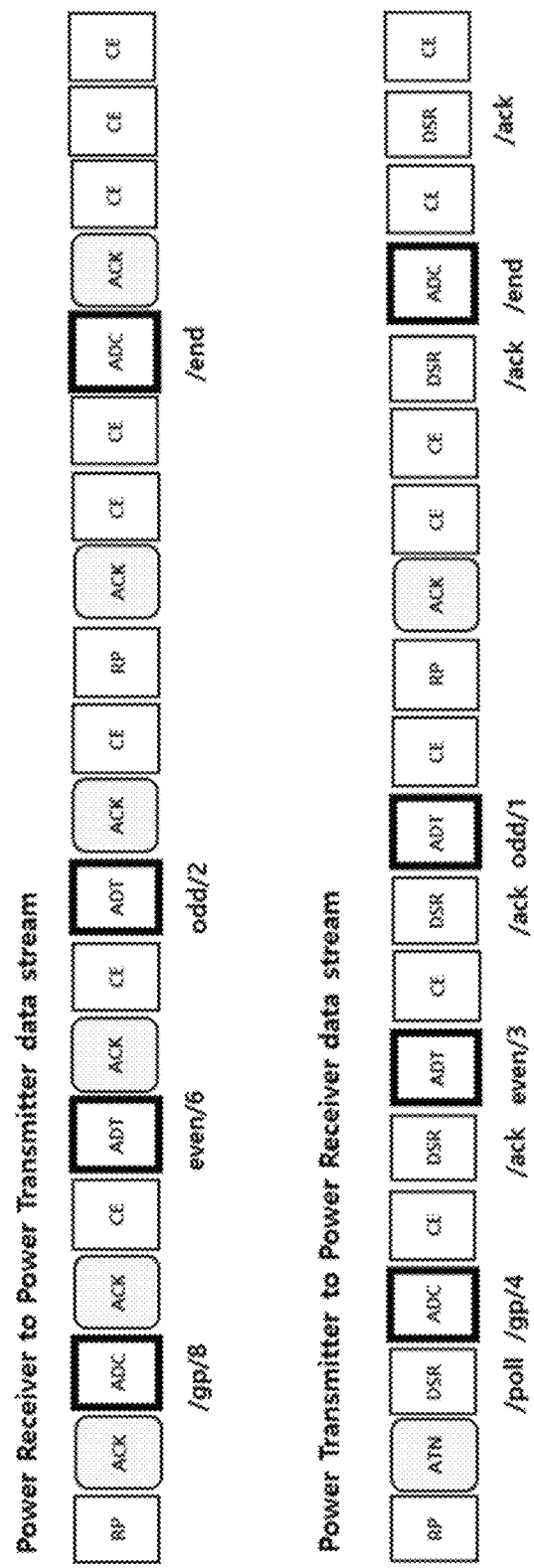
FIG. 15 illustrates an application-level data stream between a wireless power transmitter and receiver according to an embodiment of the present disclosure.

FIG. 15 illustrates an application-level data stream between a wireless power transmitter and receiver according to an embodiment of the present disclosure.

Referring to FIG. 15, a data stream may include an auxiliary data control (ADC) data packet and/or an auxiliary data transport (ADT) data packet.

The ADC data packet is used to open a data stream. The ADC data packet may indicate the type of message included in the stream and the number of data bytes. The ADT data packet is sequences of data including an actual message. An ADC/end data packet is used to notify the end of a stream. For example, the maximum number of data bytes in a data transport stream may be limited to 2047.

In order to inform whether the ADC data packet and ADT data packet are normally received, an ACK or NACK is used. Control information required for wireless charging such as a control error (CE) packet or DSR may be transmitted between the transmission timings of the ADC data packet and the ADT data packet.

Based on the above data stream structure, authentication-related information or other application-level information may be transmitted/received between the wireless power transmitter and receiver.

Figure 16:
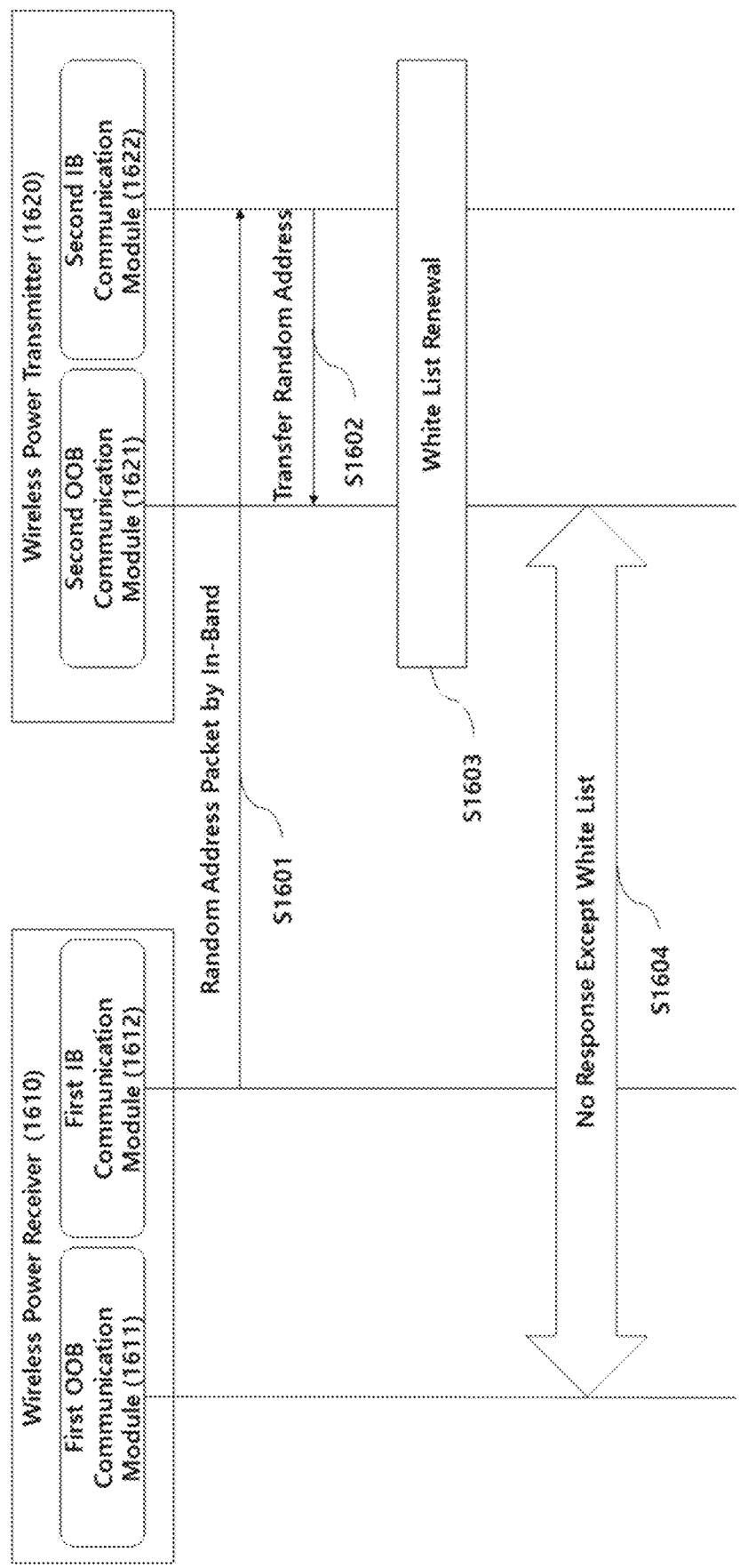
FIG. 16 is a flowchart illustrating operations of a wireless power transmitter and receiver according to an embodiment of the present disclosure.

FIG. 16 is a flowchart illustrating operations of a wireless power transmitter and receiver according to an embodiment of the present disclosure.

Referring to FIG. 16, a wireless power receiver 1610 may include a first OB communication module (first out-of-band (OOB) communication module) 1611 and a first IB communication module 1612. A wireless power transmitter 1620 may include a second OB communication module 1621 and a second IB communication 1622.

Each of the first IB communication module 1612 and the second IB communication module 1622 may transmit or receive a packet based on a coil provided therein.

Each of the first OB communication module 1611 and the second OB communication module 1621 may transmit or receive a packet on a short-range wireless communication antenna.

In an embodiment, each of the first OB communication module 1611 and the second OB communication module 1621 may be a BLE communication module, but the present disclosure is not limited thereto.

The first IB communication module 1612 may transmit a random address packet to the second IB communication module 1622 through IB communication (S1601).

The second IB communication module 1622 may transmit the received random address (packet) to the second OB communication module 1621 (S1602).

The wireless power transmitter 1620 may update a whitelist based on the random address (Whitelist Renewal) (S1603). Here, the whitelist may be updated by the second OB communication module 1621. However, this is merely an example, and the whitelist may be updated by a controller that is provided in the wireless power transmitter 1620 and configured to control wireless power transmission.

The second OB communication module 1621 may transmit a response signal to the wireless power receiver 1610 only when the wireless power receiver 1610 is included in the whitelist (No Response Except Whitelist) (S1604).

The wireless power transmitter 1620 in the embodiment of FIG. 16 may correspond to the wireless power transmitter or the power transmitter disclosed in FIGS. 1 to 11. Accordingly, the operations of the wireless power transmitter 1620 in this embodiment may be performed by one of the components of the wireless power transmitter in FIGS. 1 to 11 or a combination of two or more components. For example, the second IB communication module 1622 of the wireless power transmitter 1620 in this embodiment may be equivalent to the IB communication module 121 of FIG. 4C or 4D, and the second OB communication module 1621 of the wireless power transmitter 1620 may be equivalent to the OB communication module 122 of FIG. 4C or 4D.

In addition, the wireless power receiver 1610 in the embodiment of FIG. 16 may correspond to the wireless power receiver or the power receiver disclosed in FIGS. 1 to 11. Accordingly, the operations of the wireless power receiver 1610 in this embodiment may be performed by one of the components of the wireless power receiver in FIGS. 1 to 11 or a combination of two or more components. For example, the first IB communication module 1612 of the wireless power receiver 1610 in this embodiment may be equivalent to the IB communication module 221 of FIG. 4C or 4D, and the first OB communication module 1611 of the wireless power receiver 1610 may be equivalent to the OB communication module 222 of FIG. 4C or 4D.

Figure 17:
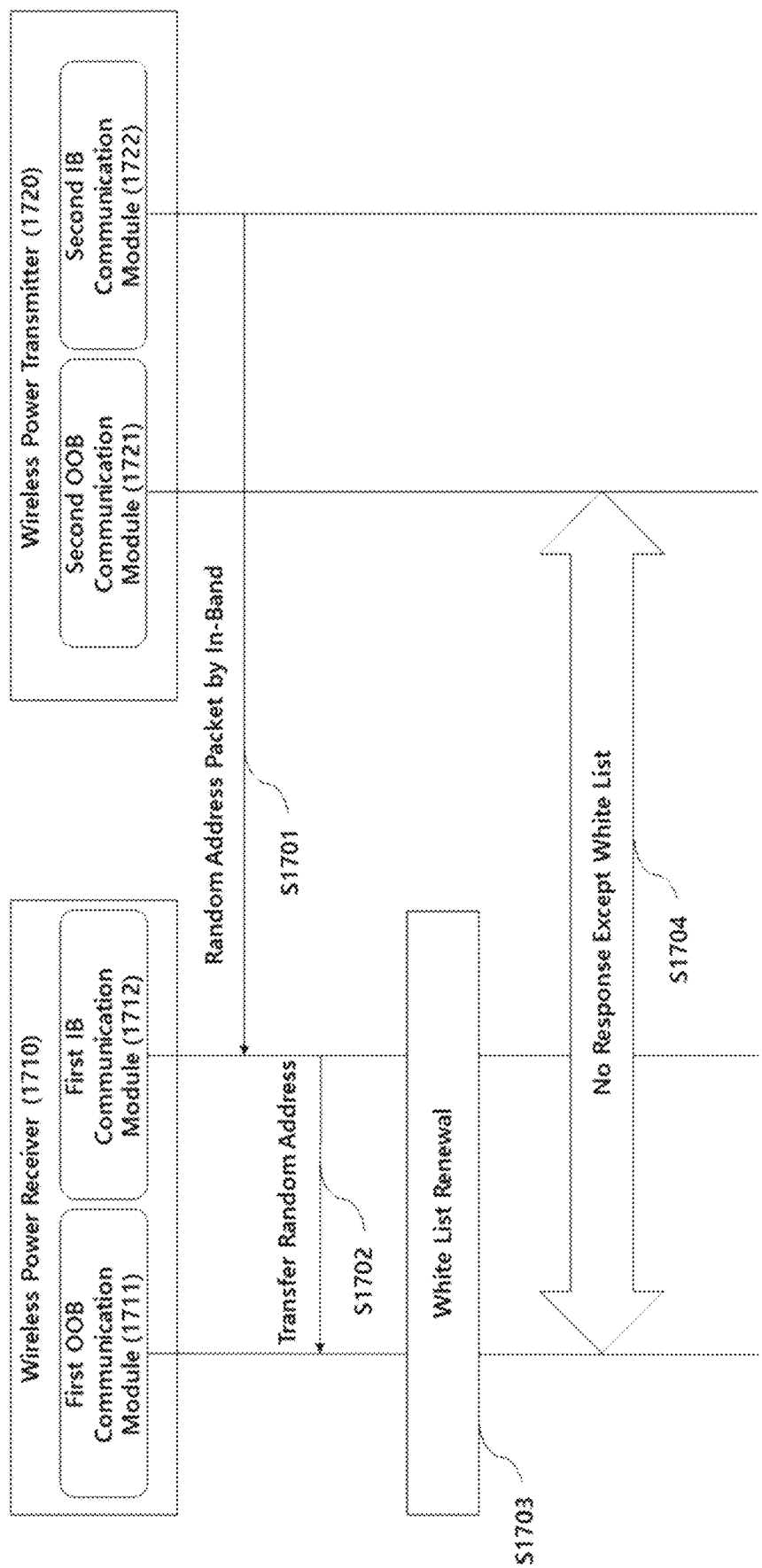
FIG. 17 is a flowchart illustrating operations of a wireless power transmitter and receiver according to another embodiment of the present disclosure.

In another example, the wireless power transmitter 1620 may establish connection with devices in the whitelist as shown in FIG. 17.

FIG. 17 is a flowchart illustrating operations of a wireless power transmitter and receiver according to another embodiment of the present disclosure.

Referring to FIG. 17, a wireless power receiver 1710 may include a first OB communication module 1711 and a first IB communication module 1712. A wireless power transmitter 1720 may include a second OB communication module 1721 and a second IB communication module 1722.

Each of the first IB communication module 1712 and the second IB communication module 1722 may transmit or receive a packet based on a coil provided therein.

Each of the first OB communication module 1711 and the second OB communication module 1721 may transmit or receive a packet on a short-range wireless communication antenna.

In an embodiment, each of the first OB communication module 1711 and the second OB communication module 1721 may be a BLE communication module, but the present disclosure is not limited thereto. Specifically, any one of the following technologies: Wi-Fi communication, radio frequency identification (RFID) communication, and Bluetooth communication may be applied.

The second IB communication module 1722 may transmit a random address packet to the first IB communication module 1712 through IB communication (S1701).

The first IB communication module 1712 may transmit the received random address (packet) to the first OB communication module 1711 (S1702).

The wireless power receiver 1710 may update a whitelist based on the random address (Whitelist Renewal) (S1703). Here, the whitelist may be updated by the first OB communication module 1711. However, this is merely an example, and the whitelist may be updated by a controller or processor that is provided in the wireless power receiver 1710 and configured to control wireless power reception.

The first OB communication module 1711 may transmit a response signal to the wireless power transmitter 1720 only when the wireless power transmitter 1720 is included in the whitelist (No Response Except Whitelist) (S1704).

According to an embodiment, the wireless power receiver 1710 may actively operate and manage the whitelist for wireless power transmitters to prevent cross-connection.

The wireless power transmitter 1720 in the embodiment of FIG. 17 may correspond to the wireless power transmitter or the power transmitter disclosed in FIGS. 1 to 11. Accordingly, the operations of the wireless power transmitter 1720 in this embodiment may be performed by one of the components of the wireless power transmitter in FIGS. 1 to 11 or a combination of two or more components. For example, the second IB communication module 1722 of the wireless power transmitter 1720 in this embodiment may be equivalent to the IB communication module 121 of FIG. 4C or 4D. The second OB communication module 1721 of the wireless power transmitter 1720 may be equivalent to the OB communication module 122 of FIG. 4C or 4D.

In addition, the wireless power receiver 1710 in the embodiment of FIG. 17 may correspond to the wireless power receiver or the power receiver disclosed in FIGS. 1 to 11. Accordingly, the operation of the wireless power receiver 1710 in this embodiment may be performed by one of the components of the wireless power receiver in FIGS. 1 to 11 or a combination of two or more components. For example, the first IB communication module 1712 of the wireless power receiver 1710 in this embodiment may be equivalent to the IB communication module 221 of FIG. 4C or 4D. The first OB communication module 1711 of the wireless power receiver 1710 may be equivalent to the OB communication module 222 of FIG. 4C or 4D.

Figure 18:
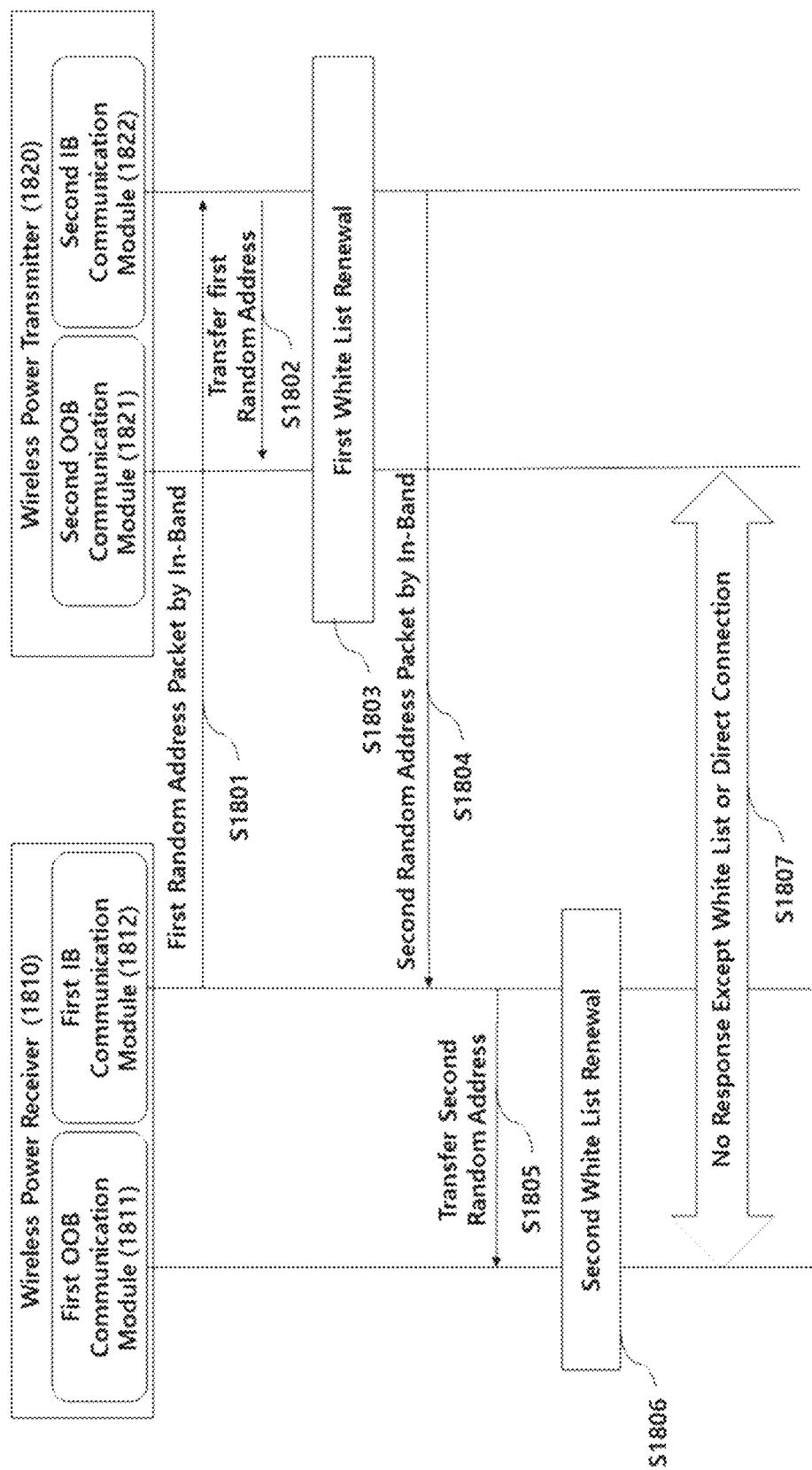
FIG. 18 is a flowchart illustrating operations of a wireless power transmitter and receiver according to a further embodiment of the present disclosure.

FIG. 18 is a flowchart illustrating operations of a wireless power transmitter and receiver according to a further embodiment of the present disclosure.

Referring to FIG. 18, a wireless power receiver 1810 may include a first OB communication module 1811 and a first IB communication module 1812. A wireless power transmitter 1820 may include a second OB communication module 1821 and a second IB communication module 1822.

Each of the first IB communication module 1812 and the second IB communication module 1822 may transmit or receive a packet based on a coil provided therein.

Each of the first OB communication module 1811 and the second OB communication module 1821 may transmit or receive a packet on a short-range wireless communication antenna.

In an embodiment, each of the first OB communication module 1811 and the second OB communication module 1821 may be a BLE communication module, but the present disclosure is not limited thereto. Specifically, any one of the following technologies: Wi-Fi communication, RFID communication, and Bluetooth communication may be applied.

The first IB communication module 1812 may transmit a first random address packet to the second IB communication module 1822 through IB communication (S1801).

The second IB communication module 1822 may transmit the received first random address (packet) to the second OB communication module 1821 (S1802).

The wireless power transmitter 1820 may update a first whitelist based on the first random address (First Whitelist Renewal) (S1803). Here, the first whitelist may be updated by the second OB communication module 1821. However, this is only an example, and the first whitelist may be updated by a controller or processor provided in the wireless power transmitter 1820 and configured to control wireless power transmission.

The wireless power transmitter 1820 may transmit a second random address packet to the first IB communication module 1812 through the second IB communication module 1822 (S1804).

The first IB communication module 1812 may transmit the received second random address to the first OB communication module 1811 (S1805).

The wireless power receiver 1810 may update a second whitelist based on the second random address (Second Whitelist Renewal) (S1806). Here, the second whitelist may be updated by the first OB communication module 1811. However, this is only an example, and the second while list may be updated by a controller or processor provided in the wireless power receiver 1810 and configured to control wireless power reception.

The first OB communication module 1811 may transmit a response signal to the wireless power transmitter 1820 only when the wireless power transmitter 1820 is included in the second whitelist, and the second OB communication module 1821 may transmit a response signal to the wireless power receiver 1810 only when the wireless power receiver 1810 is included in the first whitelist. The wireless power receiver 1810 and the wireless power transmitter 1820 may perform direct connection based on the first and second whitelists. (No Response Except Whitelist or Direct Connection) (S1807).

In the embodiment of FIG. 18, the wireless power receiver 1810 and the wireless power transmitter 1820 may establish connection with a device existing in their whitelists.

In another example, the wireless power transmitter 1820 may establish connection only with specific peer device(s) designated by the host and/or devices in its own whitelist (i.e., wireless power receivers).

In this way, the wireless power transmitter may prevent cross-connection by managing the whitelist for wireless power receivers. The cross-connection prevention may also be performed by the wireless power receiver. That is, the wireless power transmitter and the wireless power receiver may perform a cross check based on whitelist(s) to prevent the cross-connection.

The wireless power transmitter 1820 in the embodiment of FIG. 18 may correspond to the wireless power transmitter or the power transmitter disclosed in FIGS. 1 to 11. Accordingly, the operations of the wireless power transmitter 1820 in this embodiment may be performed by one of the components of the wireless power transmitter in FIGS. 1 to 11 or a combination of two or more components. For example, the second IB communication module 1822 of the wireless power transmitter 1820 in this embodiment may be equivalent to the IB communication module 121 of FIG. 4C or 4D. The second OB communication module 1821 of the wireless power transmitter 1820 may be equivalent to the OB communication module 122 of FIG. 4C or 4D.

The wireless power receiver 1810 in the embodiment of FIG. 18 may correspond to the wireless power receiver or the power receiver disclosed in FIGS. 1 to 11. Accordingly, the operations of the wireless power receiver 1810 in this embodiment may be performed by one of the components of the wireless power receiver in FIGS. 1 to 11 or a combination of two or more components. For example, the first IB communication module 1812 of the wireless power receiver 1810 in this embodiment may be equivalent to the IB communication module 221 of FIG. 4C or 4D. The first OB communication module 1811 of the wireless power receiver 1810 may be equivalent to the OB communication module 222 of FIG. 4C or 4D.

Figure 19:
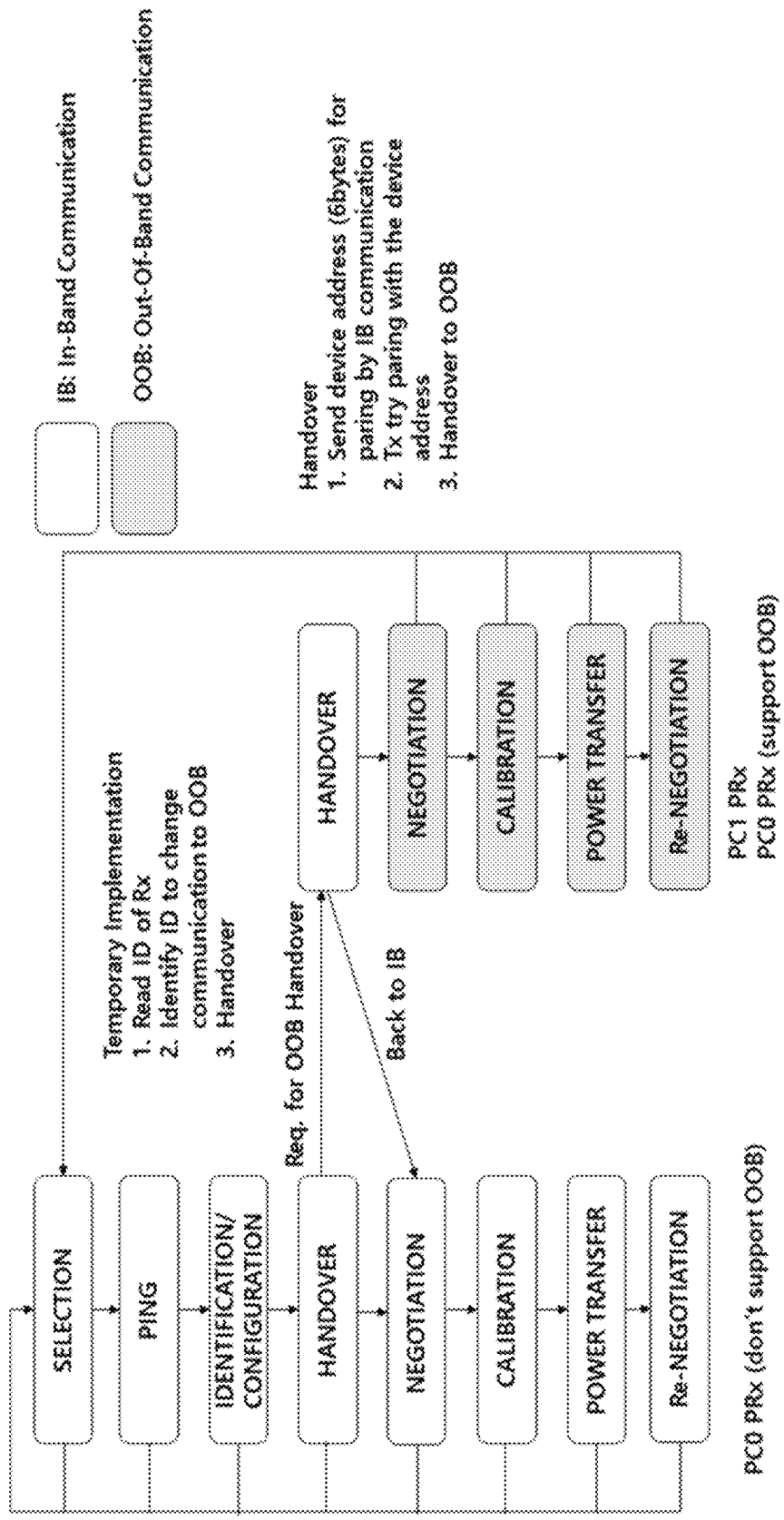
FIG. 19 is a block diagram illustrating state machines for power class 0 (PC0) and power class 1 (PC1) according to an embodiment of the present disclosure.

FIG. 19 is a block diagram illustrating state machines for PC0 and PC1 according to an embodiment of the present disclosure.

Hereinafter, a device filtering policy will be described.

Based on device filtering, a link manager may be configured to respond only to a specific set of devices (i.e., whitelist). That is, the link manager may ignore transmission or requests from devices not included in the whitelist.

For example, the device filtering may include an operation of responding to devices with MAC addresses in the whitelist and not responding to devices (advertisers, scanners, initiators, etc.) with MAC addresses out of the whitelist. The device filtering may be performed or managed under specific rules defined for each phase, such as advertising, scanning, and initiating.

First, advertisement filtering rules define how the LL of an advertiser processes scan requests and connection requests. For example, the LL of the advertiser may be configured to process scan requests or connect requests from devices in the whitelist. In another example, the LL of the advertiser may be configured to process scan requests received from all devices but process connection requests received from devices in the whitelist. In a further example, the LL of the advertiser may be configured to process connection requests from all devices but process scan requests received from devices in the whitelist.

Next, scanner filtering rules define how the LL of a scanner processes advertisement packets. For example, the LL of the scanner may process advertisement packets received from devices in the whitelist.

Finally, initiator filtering rules define how the LL of an initiator processes advertisement packets. For example, the LL of the scanner may process reachable advertisement packets from devices in the whitelist.

The privacy function of BLE may be implemented so that a device may hide a real address. In this case, the device may perform communication based on a random address rather than the real address. The random address may change over time. The random address may include the following two types of addresses.

(1) Static Address

The device may perform (or select) an operation of initializing the static address of the device to a new value after each power cycle. However, the device may not change the static address within a power cycle.

(2) Private Address

The private address may include a non-resolvable private address and a resolvable private address.

For the non-resolvable private address, a peer device may not discover a real address corresponding to the non-resolvable used address.

For the resolvable private address, the peer device may derive the real address corresponding to the resolvable used address based on the random address and/or the link key of connection.

According to the state machines according to FIG. 19, OB communication may be limited by a state machine corresponding to IB communication. Accordingly, information exchange through the IB communication is essential in configuration and negotiation phases. Thus, time delay overhead may occur during handover from the IB communication to the OB communication, and the charging start time may slightly increase.

According to one embodiment, if a wireless power transmitter and receiver have a previous OB communication connection record and know each other's configuration information (e.g., MAC address information, etc.), the wireless power transmitter and receiver may store the previous connection record and configuration information in the whitelist. In this case, devices (wireless power transmitter and/or wireless power receiver) stored in the whitelist may skip steps required for the handover to the OB communication (i.e., steps based on the IB communication) and directly perform the handover from IB to OB. (i.e., OB communication connection establishment). The above handover may be referred to as handover for reconnection.

The wireless power transmitter and receiver may exchange packets through the OB communication from a phase after the handover is completed.

The wireless power transmitter and/or receiver may determine the distance between the wireless power transmitter and receiver by using a received signal strength indicator (RSSI) value or a direct finding method based on the OB communication. In this case, if the RSSI value is above a predetermined level (that is, when a predetermined condition is satisfied), the wireless power transmitter and/or receiver may enter a handover phase for reconnection with devices included in the whitelist and attempt the reconnection.

In the state machines according to FIG. 19, there is a problem in that only one opportunity is given for the handover to the OB during a charging cycle and subsequent reconnection is impossible.

However, the 2.4 GHz band used for BLE communication is largely allocated to other communication, and thus, there may be significant interference between a BLE signal for wireless charging and other signals. If there is a problem in BLE connection in an environment where there is significant interference to OB frequencies for wireless charging, that is, when the handover to the OB fails, opportunities for OB reconnection are required.

Embodiments

In the following embodiments, even if handover from IB communication to OB communication fails, a wireless power transmitter (or wireless power receiver) may check whether the wireless power receiver (or wireless power transmitter) supports the OB communication (e.g., BLE communication) and then attempt reconnection.

In one aspect, the wireless power transmitter (or wireless power receiver) may store whether the wireless power receiver (or wireless power transmitter) supports the OB communication.

In another aspect, the wireless power transmitter (or wireless power receiver) may store the connection state of the OB communication of the wireless power receiver (or wireless power transmitter).

In a further aspect, the wireless power transmitter (or wireless power receiver) may store whether the wireless power receiver (or wireless power transmitter) supports the OB communication and the connection state of the OB communication.

In this case, whether the OB communication is supported and/or the connection state of the OB communication may be stored in a power contract between the wireless power transmitter and the wireless power receiver. When the state is changed, the power contract may be renewed. When the connection state of the OB (i.e., BLE) communication is changed, the wireless power transmitter and the wireless power receiver may enter a renegotiation phase to renew the power contract.

The wireless power receiver (or wireless power transmitter) may attempt the handover to the OB communication based on a MAC address packet at all phases of the state machine.

For example, the wireless power receiver (or wireless power transmitter) may transmit a MAC address packet to the wireless power transmitter (or wireless power receiver) through the IB communication at all phases of the state machine, and the wireless power receiver (or wireless power transmitter) may attempt the handover to the OB based on the received MAC address.

FIG. 20 is a diagram for explaining a method of adding information on whether OB (i.e., BLE) is supported and information on a connection state to a power contract according to an embodiment of the present disclosure.

Referring to FIG. 20, an initial power transfer contract 2000 includes the following parameters: guaranteed power, maximum power, received power packet format, FSK polarity and modulation depth, and BLE status. In particular, the BLE status parameter may include information on whether BLE is supported and information on a BLE connection state as shown in reference numeral 2010.

Figure 21:
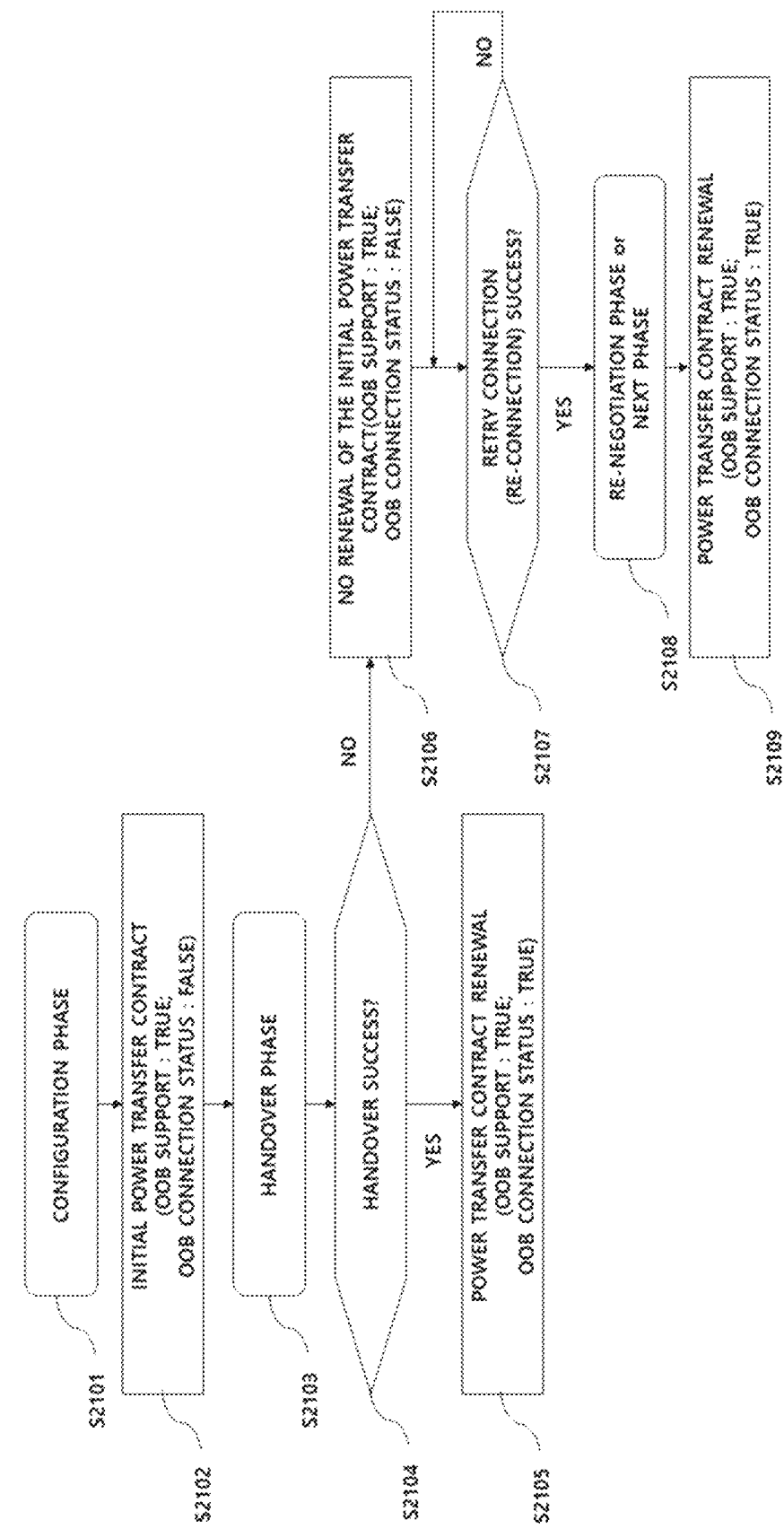
FIG. 21 is a flowchart illustrating a procedure for renewing a power transfer contract according to an embodiment of the present disclosure.

FIG. 21 is a flowchart illustrating a procedure for renewing a power transfer contract according to an embodiment of the present disclosure.

The power transfer contract renewal procedure according to the embodiment of FIG. 21 may be performed by a wireless power transmitter or receiver.

Hereinafter, a wireless power transmitter or receiver is collectively referred to as a wireless charger for convenience of description.

Referring to FIG. 21, a wireless charger may check whether a wireless power receiver (or wireless power transmitter) supports OB communication based on a handover flag in a configuration phase (S2101). For example, the handover flag may be included in a configuration packet. When the handover flag of the configuration packet received from the wireless power receiver is TRUE, the wireless power transmitter may confirm that the wireless power receiver supports the OB communication. In addition, when the handover flag of the configuration packet received from the wireless power transmitter is TRUE, the wireless power receiver may confirm that the wireless power transmitter supports the OB communication. Although this embodiment describes that the handover flag is included in the configuration packet, it is merely an example. In another embodiment, the handover flag may be configured to be transmitted through other packets transmitted and received at other phases of the state machine. For example, the handover flag may be received in a negotiation phase, and the wireless charger may generate and store an initial power transfer contract after the negotiation phase and enter a handover phase.

After the configuration phase, the wireless charger may write and store the initial power transfer contract including whether the wireless power receiver (or wireless power transmitter) supports the OB communication and/or the connection state of the OB communication (or whether the OB communication is connected) (Initial Power Transfer Contract) (S2102). For example, in the initial power transfer contract, the connection state of the OB communication may be set to FALSE, and whether the OB communication is supported may be set to TRUE.

After writing and storing the initial power transfer contract, the wireless charger may enter the handover phase to attempt handover to the OB when whether the wireless power receiver (or wireless power transmitter) supports the OB is set to TRUE (S2103).

The wireless charger may determine whether the handover (i.e., OB communication connection) is successful (Handover Success?) (S2014). When the OB communication connection between the wireless power transmitter and the wireless power receiver fails in the handover phase, the wireless charger may maintain the initial power transfer contract without any renewal (S2106). Accordingly, the connection state of the OB communication of the wireless power receiver (or wireless power transmitter) is FALSE, and whether the OB is supported is continuously maintained as TRUE.

Even when the handover fails in step S2104, the wireless charger may reattempt the OB connection (Retry Connection) (S2107). In this case, the wireless power transmitter and/or the wireless power receiver may attempt the OB connection separately or independently from the state machine. According to an embodiment, in step S2107, the wireless charger may attempt OB reconnection for a predetermined number of times until the handover to the OB is successful. If the wireless charger fails in the OB connection the predetermined number of times, the wireless charger may enter a predefined state machine phase, for example, a selection phase.

According to another embodiment, in step S2107, the wireless charger may attempt the OB reconnection for a predetermined time until the handover to the OB is successful. If the wireless charger fails in the OB connection until the expiration of the predetermined time, the wireless charger may enter a predefined state machine phase, for example, a selection phase.

For example, the wireless charger may attempt reconnection at a predetermined time period.

If the wireless charger succeeds in the OB connection after the reconnection attempt in step S2107, the wireless charger may enter a renegotiation phase (or a next phase after the last IB state machine) (Renegotiation Phase or Next Phase) (S2108) to renew the power transfer contract. (Power Transfer Contract Renewal) (S2109). In this case, in the renewed power transfer contract, the connection state of OB communication may be set to TRUE, and whether the OB support may be set to TRUE.

According to an embodiment, the power transfer contract may be performed at any phases other than the renegotiation phase. That is, the wireless charger may check the connection state of the OB communication of the wireless power transmitter or receiver based on the power transfer contract at the beginning of each phase step and then attempt the handover to the OB or the OB communication connection if the OB connection is enabled. Alternatively, the wireless charger may periodically check whether the power transfer contract is renewed during a power transfer phase.

The wireless power transmitter in the embodiments of FIG. 21 may correspond to the wireless power transmitter or the power transmitter disclosed in FIGS. 1 to 11. Accordingly, the operations of the wireless power transmitter in the embodiments may be performed by one of the components of the wireless power transmitter in FIGS. 1 to 11 or a combination of two or more components. For example, an OB (BLE) communication module of the wireless power transmitter in this embodiment may be equivalent to the OB communication module 122 of FIG. 4C or 4D.

The wireless power receiver in the embodiments of FIG. 21 may correspond to the wireless power receiver or the power receiver disclosed in FIGS. 1 to 11. Accordingly, the operations of the wireless power receiver in this embodiment may be performed by one of the components of the wireless power receiver in FIGS. 1 to 11 or a combination of two or more components. For example, an OB (BLE) communication module of the wireless power receiver in this embodiment may be equivalent to the OB communication module 222 of FIG. 4C or 4D.

Figure 22:
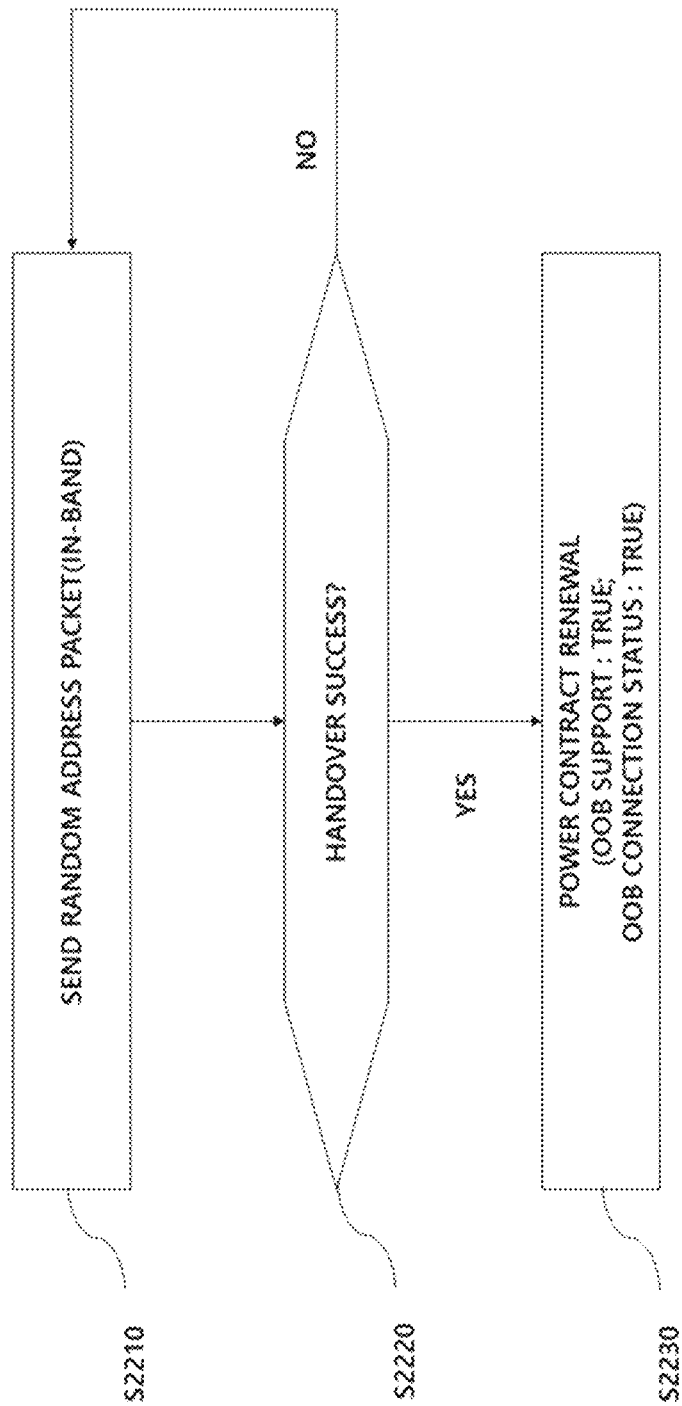
FIG. 22 is a flowchart illustrating a procedure for renewing a power transfer contract according to another embodiment of the present disclosure.

FIG. 22 is a flowchart illustrating a procedure for renewing a power transfer contract according to another embodiment of the present disclosure.

In the embodiment of FIG. 22, it is assumed that in FIG. 21, a wireless power transmitter (or wireless power receiver) enters a handover phase to attempt handover to OB communication when whether the wireless power receiver (or wireless power transmitter) supports the OB communication is set to TRUE.

If the wireless power transmitter (or wireless power receiver) fails in OB connection in the handover phase, the wireless power transmitter (or wireless power receiver) may attempt the OB connection continuously, periodically, a predetermined number of times, and/or for a predetermined time.

The power transfer contract renewal procedure according to the embodiment of FIG. 22 may be performed by the wireless power transmitter or receiver.

Hereinafter, a wireless power transmitter or receiver is collectively referred to as a wireless charger for convenience of description.

Referring to FIG. 22, the wireless charger may periodically transmit an address packet to the wireless power transmitter (or wireless power receiver) in order to attempt the handover to the OB (S2210).

Here, the address packet may include the MAC address of the wireless power receiver (or wireless power transmitter).

For example, the MAC address may be a random address.

In another example, the address packet may be transmitted through IB communication.

In a further example, the address value is randomly changed whenever a MAC address packet is transmitted, thereby preventing tracking. For example, the wireless power receiver may transmit the MAC address packet to the wireless power transmitter when the wireless power receiver fails in the handover to the OB. In this case, the MAC address packet may include another MAC address that is randomly selected (or generated) other than the existing MAC address.

The wireless charger may determine whether the handover is successful (S2220).

For example, after transmitting the MAC address packet to the wireless power transmitter (or wireless power receiver), the wireless charger may transmit an advertisement packet to the corresponding address for a predetermined time to attempt OB (i.e., BLE) communication connection. If the wireless charger succeeds in the OB communication connection, the wireless charger may determine that the handover is successful.

If the wireless charger succeeds in the handover, the wireless charger may renew the power transfer contract (Power Transfer Contract Renewal) (S2230).

For example, if the handover is successful, the wireless charger may enter a renegotiation phase to renew the power transfer contract.

In another example, if the handover is successful, the wireless charger may renew the power transfer contract by entering the last state machine phase before entering the handover phase. For example, if the wireless charger succeeds in the handover after transitioning from the power transfer phase of the IB to the handover phase, the wireless charger may return to the power transfer phase and renew the power transfer contract. In another example, if the wireless charger succeeds in the handover after transitioning from the negotiation phase of the IB to the handover phase, the wireless charger may return to the power transfer phase and renew the power transfer contract.

In a further example, if the handover is successful, the wireless charger may renew the power transfer contract by entering the next phase of the last state machine before entering the handover phase. For example, if the wireless charger succeeds in the handover after transitioning from a configuration and identification phase to the handover phase, the wireless charger may enter the negotiation phase to renew the power transfer contract.

Figure 23:
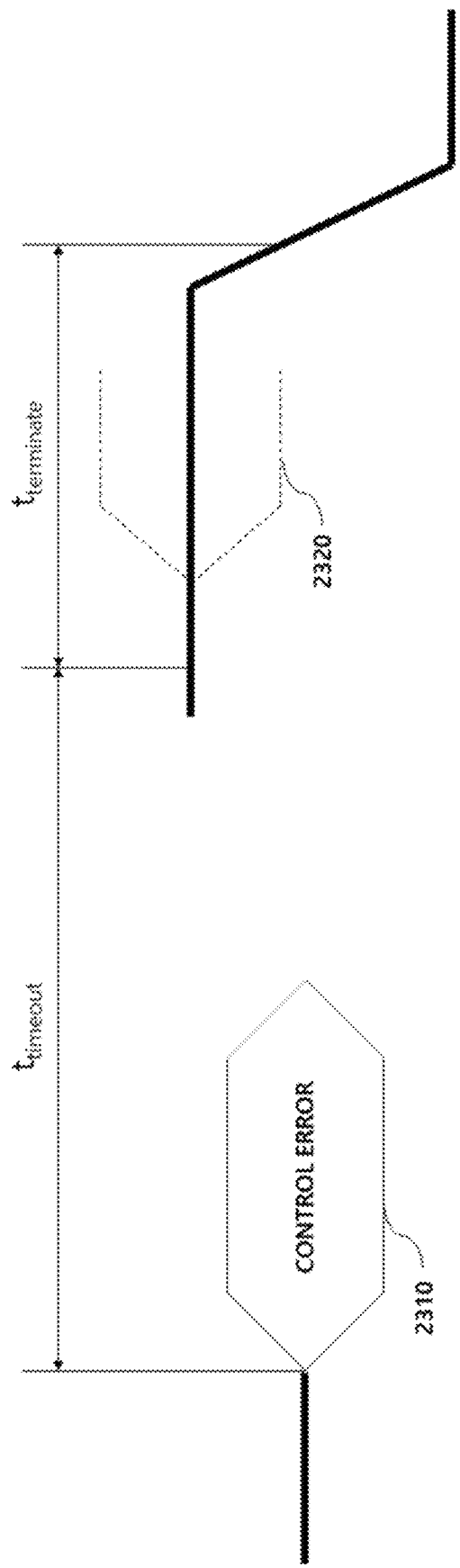
FIG. 23 illustrates a timeout procedure in case of packet loss.

FIG. 23 illustrates a timeout procedure in case of packet loss.

Referring to FIG. 23, an IB timeout and an OB timeout may be differently managed in WPC. First, for the IB timeout, if a wireless power transmitter does not correctly receive the start of a new CE packet 2320 within $t_{timeout}$ after the start of a previous CE packet 2310, the wireless power transmitter may remove a power signal within $t_{terminate}$.

For the OB timeout, a link supervision timeout parameter is used by a controller configured to monitor link loss. If, for any reason, no packets are received for a period longer than a link supervision timeout, the connection may be released.

In this case, the following disadvantages may occur: independence is required between a wireless power transmission module and a communication module; and a state machine is initialized when a communication error occurs.

According to an embodiment, a wireless power transmitter and/or receiver may include a plurality of communication modules and selectively use the plurality of communication modules.

For example, two communication modules may be provided in the wireless power transmitter, and two communication modules may be provided in the wireless power receiver. In this case, one of the two communication modules provided in the wireless power transmitter and/or receiver may be an IB communication module, and the other one may be an OB communication module.

In another example, three communication modules may be provided in the wireless power transmitter, and two communication modules may be provided in the wireless power receiver. In this case, the wireless power transmitter may include one IB communication module and two different OB communication modules, and the wireless power receiver may include one IB communication module and one OB communication module.

In a further example, three communication modules may be provided in the wireless power transmitter and receiver. In this case, one communication module may be an IB communication module and two communication modules may be OB communication modules. The two OB communication modules may support different data transmission rates.

The wireless power transmitter and receiver may perform communication by adaptively selecting an optimal communication module based on channel quality and required power for each communication module.

Figure 24:
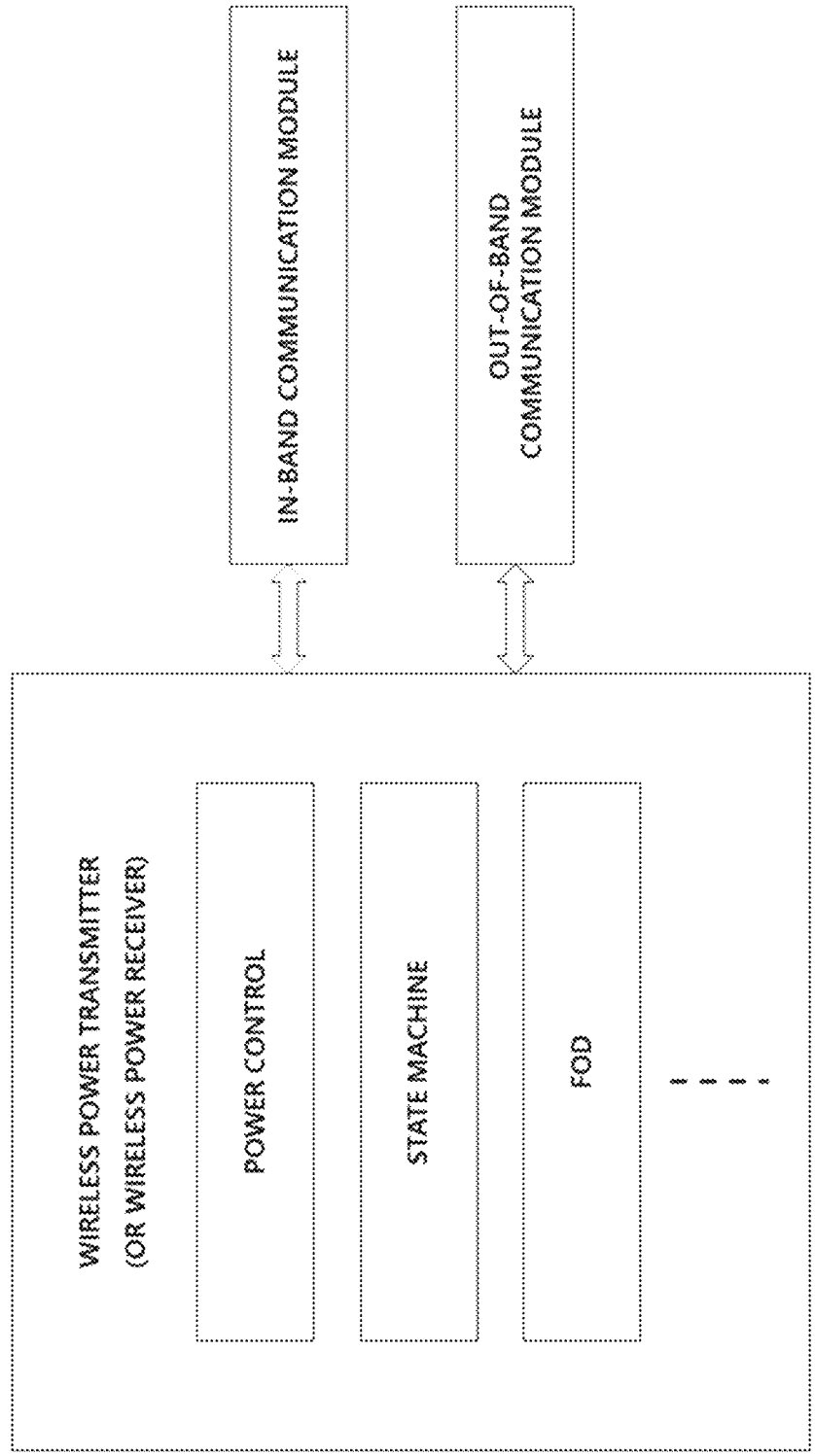
FIG. 24 is a functional block diagram of a wireless power transmitter or receiver according to an embodiment of the present disclosure.

FIG. 24 is a functional block diagram of a wireless power transmitter or receiver according to an embodiment of the present disclosure.

Referring to FIG. 24, the wireless power transmitter or receiver may perform a power control function, a state machine function, an FOD function, and so on. Here, the functions may be implemented by hardware such as circuit components, microprocessors, and memories as well as software.

The wireless power transmitter and/or receiver may include an IB communication module and an OB communication module. The IB communication module may perform the power control function, state machine function, FOD function, etc. The OB communication module may perform the power control function, state machine function, FOD function, etc.

The wireless power transmitter and/or receiver may select any one of the IB communication module and the OB communication module and perform the power control function, state machine function, FOD function, etc. based on the selected communication module.

The wireless power transmitter in the embodiments of FIG. 24 may correspond to the wireless power transmitter or the power transmitter disclosed in FIGS. 1 to 11. Accordingly, the operations of the wireless power transmitter in the embodiments may be performed by one of the components of the wireless power transmitter in FIGS. 1 to 11 or a combination of two or more components. For example, the IB communication module of the wireless power transmitter in the embodiments may be equivalent to the IB communication module 121 of FIG. 4C or 4D, and the OB communication module of the wireless power transmitter in the embodiments may be equivalent to the OB communication module 122 of FIG. 4C or 4D.

The wireless power receiver in the embodiments of FIG. 24 may correspond to the wireless power receiver or the power receiver disclosed in FIGS. 1 to 11. Accordingly, the operations of the wireless power receiver in the embodiments may be performed by one of the components of the wireless power receiver in FIGS. 1 to 11 or a combination of two or more components. For example, the IB communication module of the wireless power receiver in the embodiments may be equivalent to the IB communication module 221 of FIG. 4C or 4D, and the OB communication module of the wireless power receiver in the embodiments may be equivalent to the OB communication module 222 of FIG. 4C or 4D.

According to another embodiment, the wireless power transmitter and/or receiver may change the communication (i.e., handover) from IB communication to OB communication.

Figure 25:
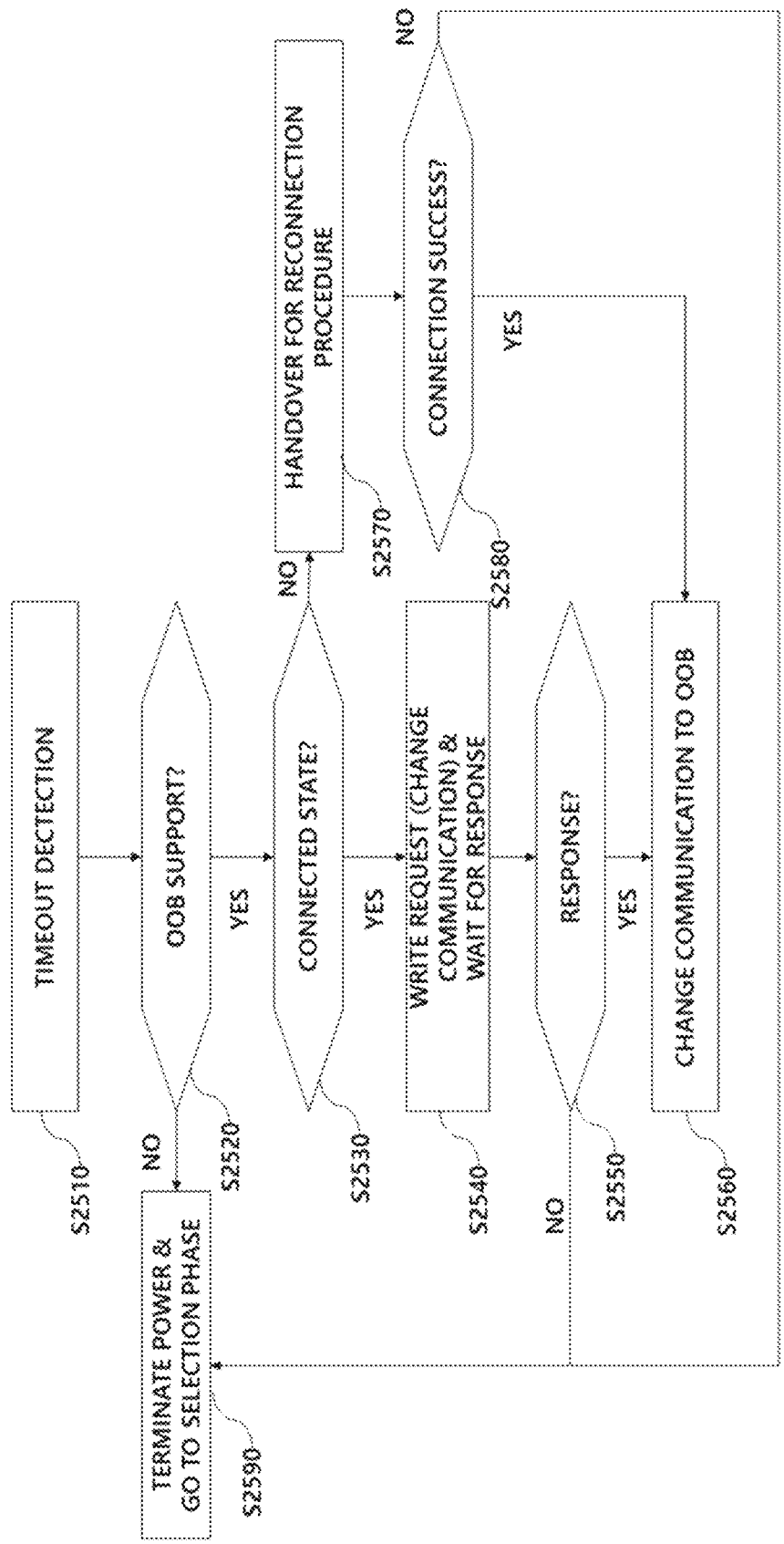
FIG. 25 is a flowchart illustrating a method by which a wireless power transmitter and/or wireless power receiver controls a communication connection according to an embodiment of the present disclosure.

FIG. 25 is a flowchart illustrating a procedure in which a wireless power transmitter and/or wireless power receiver changes communication from IB communication to OB communication according to an embodiment of the present disclosure.

Hereinafter, a wireless power transmitter and/or receiver is collectively referred to as a wireless charger for convenience of description.

Referring to FIG. 25, the wireless charger may perform packet monitoring to determine whether there occurs a timeout (S2510). Upon detecting the timeout, the wireless charger may determine whether the wireless power transmitter and/or receiver supports OB communication (OOB Support?) (S2520). For example, the timeout may be for IB communication. However, this is merely an example, and the timeout may be for the OB communication.

When it is determined that the OB communication is supported, the wireless charger may determine whether the OB (i.e., BLE) communication is connected (Connected State?) (S2530). Here, whether the OB communication is supported and whether the OB communication is connected may be specified or recorded in a power transfer contract.

For example, whether the OB communication is supported may be represented by as TRUE or FALSE. Depending on whether the OB communication is supported and/or whether the OB communication is connected, the wireless charger may perform subsequent operations.

If it is determined in step S2520 that the OB communication is not supported, the wireless charger may stop power transfer and enter a selection phase (Terminate Power & Go to Selection Phase) (S2590).

The wireless charger may determine whether the OB communication is supported and whether the OB communication is connected as either TRUE (YES) or FALSE (NO).

When the OB communication connection is TRUE, the wireless charger may transmit a write request signal requesting to change the communication and wait for reception of a response signal (S2540).

Upon receiving the response signal, the wireless charger may switch from the IB communication to the OB communication (S2560). In this case, the wireless charger may update the OB communication connection state of the power transfer contract from FALSE to TRUE. If the wireless charger receives no response signal, the wireless charger may terminate the power transfer and enter the selection phase.

For example, when the wireless power receiver (or wireless power transmitter) supports the OB communication and the OB communication is connected (when OOB Support=Yes (TRUE) and Connected State=Yes (TRUE)), the wireless power transmitter (or wireless power receiver) may request the wireless power receiver (or wireless power transmitter) to change the communication (handover to the OB communication) based on the write characteristics (i.e., Write Request). Thereafter, the wireless power transmitter (or wireless power receiver) may wait for a write response from the wireless power receiver (or wireless power transmitter) (Wait for Response). If the wireless power transmitter (or wireless power receiver) receives the write response from the wireless power receiver (or wireless power transmitter) (Response=Yes), the wireless power transmitter (or wireless power receiver) may change the communication to the OB communication (Change Communication to OOB) and wait for a next WPC packet through the OB communication. After transmitting the write response, the wireless power receiver (or wireless power transmitter) may generate a WPC packet according to the OB communication and transmit the WPC packet to the wireless power transmitter (or wireless power receiver) based on the OB communication. If the wireless power transmitter (or wireless power receiver) receives no write response from the wireless power receiver (or wireless power transmitter) (Response=No), the wireless power transmitter (or wireless power receiver) may stop the power transfer and initialize the state machine to enter the selection phase (Terminate Power & Go to Selection Phase).

In step S2530, if the OB communication connection state is FALSE, the wireless charger may enter a handover phase for performing a reconnecting procedure (S2570).

The wireless charger may determine whether the OB communication connection is successful by performing the OB reconnecting procedure (Connection Success?) (S2580).

If it is determined that the OB communication connection is successful, the wireless charger may change the communication to the OB communication and update the OB communication connection state of the power transfer contract from FALSE to TRUE (S2560).

If it is determined in step S2580 that the OB communication connection fails, the wireless charger may enter step S2590.

For example, when the wireless power transmitter (or wireless power receiver) supports the OB communication but the OB communication connection is not established (OOB Support=Yes and Connected State=No), the wireless power transmitter (or wireless power receiver) may enter the handover phase and perform a reconnection procedure (Handover for Reconnection Procedure). Thereafter, the wireless power transmitter (or wireless power receiver) may determine whether the OB communication connection is successful (Connection Success?). If the OB communication connection is successful (Connection Success=Yes), the wireless power transmitter (or wireless power receiver) may change the communication to the OB communication (Change Communication to GOB). If the wireless power transmitter (or wireless power receiver) eventually fails in the OB communication connection despite performing the reconnecting procedure, the wireless power transmitter (or wireless power receiver) may stop transmitting power (or receiving power), initialize the state machine, and enter the selection phase (Terminate Power & Go to Selection Phase).

Figure 26:
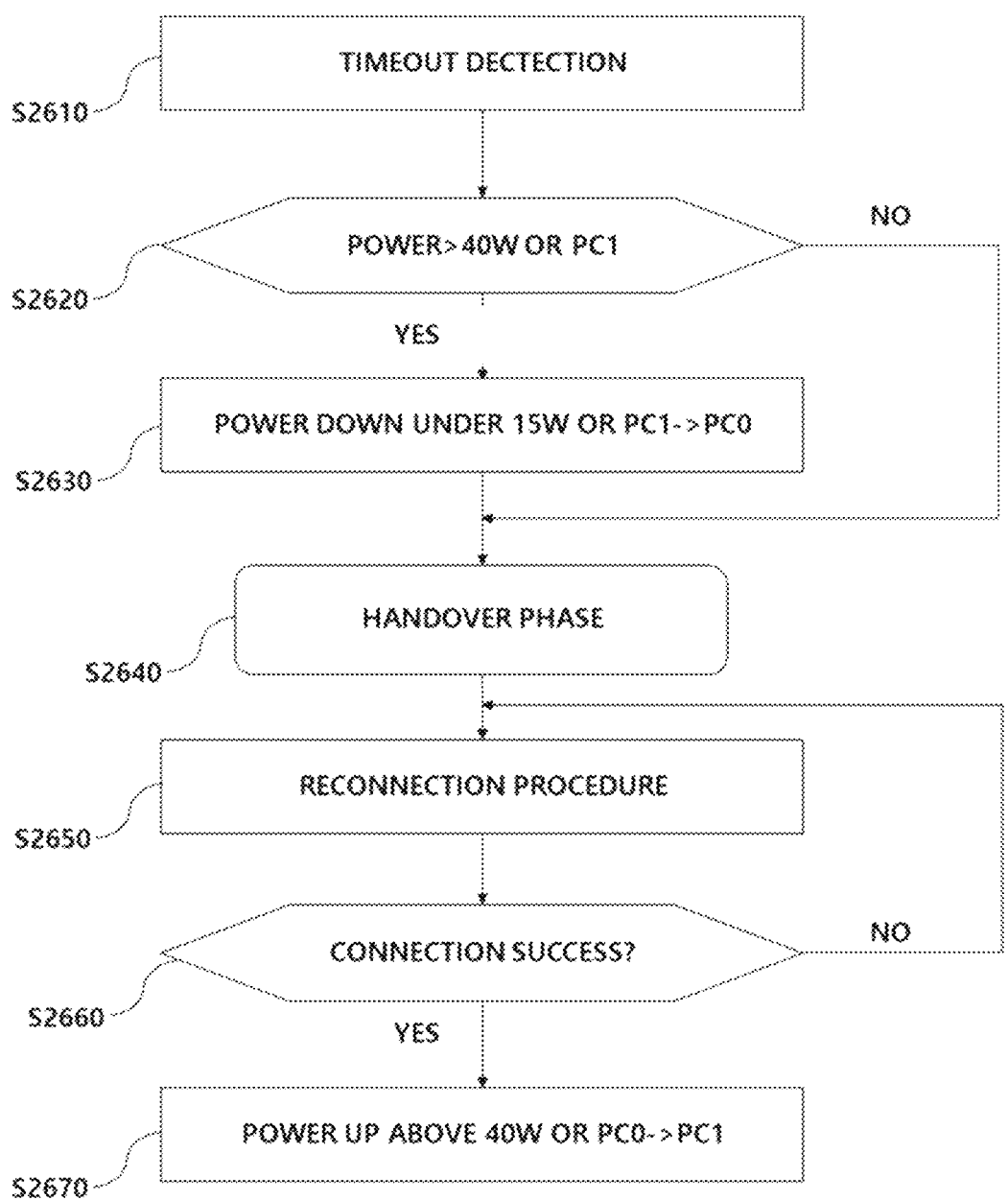
FIG. 26 is a flowchart illustrating a method by which a wireless power transmitter and/or wireless power receiver controls a communication connection according to another embodiment of the present disclosure.

FIG. 26 is a flowchart for explaining a method by which a wireless power transmitter and/or wireless power receiver controls communication connection according to another embodiment of the present disclosure.

Hereinafter, a wireless power transmitter and/or receiver is collectively referred to as a wireless charger for convenience of description.

Referring to FIG. 26, the wireless charger may perform packet monitoring to determine whether there occurs a timeout (Timeout Detection) (S2510). For example, the timeout may be for OB communication. However, this is merely an example, and the timeout may be for IB communication. For example, when the OB communication is BLE communication, the timeout may be a supervision timeout of the BLE communication.

When the wireless charger detects the timeout, the wireless charger may measure the level of current transmitted (or received) power and check whether the measured level of the transmitted (or received) power is PC1 or exceeds a first reference power level, for example, 40 watts (W) (S2620). Here, the first reference power level is set to 40 W, but this is merely an example. The power consumption (or required power) of a device supporting PC1 may vary depending on the type and kind of charging target device such as a laptop, an electric drill, or a drone, and thus, the first reference power level may vary depending on the power consumption.

If the power class corresponding to the level of the current transmitted (or received) power is PC1 or if the level of the current transmitted (or received) power is higher than or equal to a specific power level (e.g., 40 W), the wireless charger may perform an operation of limiting the transmitted (or received) power to a second reference power level, for example, 15 W or less or an operation of changing the power class from PC1 to PC0 (Power Down under 15 W OR PC1->PC0) (S2630).

The wireless charger may enter a handover phase after lowering the power level based on the timeout (S2640).

For example, the wireless charger may attempt OB communication connection to resume power transmission of 40 W or more, i.e., PC1 power transfer.

The wireless charger may enter the handover phase and perform a reconnection procedure (S2650). Here, the reconnecting procedure may mean a communication connecting procedure for reconnecting to the OB communication.

The wireless charger may determine whether the OB communication connection is successful through the reconnecting procedure (Connection Success?) (S2660).

If the OB communication connection is successful, the wireless charger may switch to the OB communication and control power transmission (or reception) to be higher than or equal to 40 W (Power Up above 40 W) or change the power class from PC0 to PC1 (S2670).

In step S2620, if the transmitted (or received) power level is out of PC1 and less than or equal to the first reference power, the wireless charger may enter the handover phase without performing an operation of lowering the power level (S2630).

In step S2660, if the wireless charger fails in the OB communication connection, the wireless charger may maintain an operation of limiting the power level to 15 W or less and enter step S2650 to attempt the OB communication connection again.

When there occurs a timeout, the wireless power transmitter may replace the communication module with an IB communication module and transmit power of 40 W or more based on the IB communication according to the choice of the manufacturer, instead of limiting the power transfer.

The wireless power transmitter may attempt OB reconnection by reentering the handover phase periodically while maintaining the power transmission of 40 W or more through the IB communication module.

In an embodiment, the wireless power transmitter and/or receiver may enter the handover phase at any phase of the state machine and attempt the OB reconnection.

In an embodiment, the wireless power transmitter and/or receiver may drive the state machine and the communication module independently so that the communication module may attempt the OB reconnection regardless of the state machine phase and renew a power transfer contract depending on the success or failure of the OB reconnection.

In an embodiment, when the wireless power transmitter and/or receiver discovers a device in a whitelist, the wireless power transmitter and/or receiver may perform handover to OB regardless of the current state machine phase.

In an embodiment, the wireless power transmitter and/or receiver may switch to the OB communication when an IB communication error occurs. The wireless power transmitter and/or receiver may switch to the IB communication when an OB communication error occurs. When there are errors in both the IB and OB communication, the wireless power transmitter and/or receiver may out a predetermined warning alarm and initialize the state machine.

In an embodiment, the wireless power transmitter and/or receiver may simultaneously maintain the IB communication and OB communication for a predetermined time after entering the handover phase. In this case, separate packets may be transmitted and received through the IB communication and OB communication.

In an embodiment, the wireless power transmitter and/or receiver may separate packets to be transmitted and received through the IB communication and OB communication based on at least one of the types, characteristics, sizes, usages, and periodicities of the packets.

In an embodiment, the wireless power transmitter and/or receiver may maintain information on the statistics on the number of OB connection attempts and success rates, block the OB connection based on the statistical information, or notify a peer device that the OB is not supported. Accordingly, the wireless power transmitter and/or receiver may prevent an unnecessary OB connection attempt in advance when the OB communication module fails, thereby minimizing power (or battery) consumption.

The wireless power transmitter according to the embodiments of FIGS. 25 and 26 may correspond to the wireless power transmitter or the power transmitter disclosed in FIGS. 1 to 11. Accordingly, the operations of the wireless power transmitter in the embodiments may be performed by one of the components of the wireless power transmitter in FIGS. 1 to 11 or a combination of two or more components. Specifically, the change of the communication of the wireless power transmitter and procedures and operations related thereto may be performed by the communication and control unit 120.

The wireless power receiver according to the embodiments of FIGS. 25 and 26 may correspond to the wireless power receiver or the power receiver disclosed in FIGS. 1 to 11. Accordingly, the operations of the wireless power receiver in the embodiments may be performed by one of the components of the wireless power receiver in FIGS. 1 to 11 or a combination of two or more components. Specifically, the change of the communication of the wireless power receiver and procedures and operations related thereto may be performed by the communication and control unit 220.

The steps of the methods or algorithms described in relation to the embodiments disclosed herein may be directly implemented by hardware and software modules that are executed by a processor or may be directly implemented by a combination thereof. The software module may reside in a storage medium (i.e., memory and/or storage) such as a RAM, flash memory, ROM, EPROM, EEPROM, register, hard disk, removable disk, or CD-ROM.

For example, the storage medium may be coupled to the processor, and the processor may read and write information from and to the storage medium. Alternatively, the storage medium may be integral with the processor. The processor and storage medium may reside within an application specific integrated circuit (ASIC). The ASIC may reside within a user terminal. Alternatively, the processor and storage medium may reside as separate components within the user terminal.

The above description is merely illustrative of the technical idea of present disclosure, and various modifications and variations may be made without departing from the essential characteristics of present disclosure by those with ordinary knowledge in the technical field to which present disclosure belongs.

Therefore, the embodiments disclosed in the present disclosure are intended to illustrate rather than to limit the technical idea of the present disclosure, and the scope of the technical idea of the present disclosure is not limited by these embodiments. The scope of protection of the present disclosure should be construed according to the following claims, and all technical ideas within the scope equivalent thereto should be construed as falling within the scope of the present disclosure.

INDUSTRIAL APPLICABILITY

The present disclosure may be applied to a wireless power transmitter for wirelessly transmitting power, a wireless power receiver for wirelessly receiving power, and a wireless charging system using the same.

The invention claimed is:

1. A method of controlling a communication connection by a wireless charger supporting in-band communication and out-band communication, the method comprising:
    receiving a first packet from a device through the in-band communication;
    creating a power transfer contract based on the first packet;
    establishing an out-band communication connection based on the power transfer contract; and
    performing power control through the out-band communication based on success of the out-band communication connection.

2. The method of claim 1, comprising:
    performing handover to out-band by entering a handover phase according to the power transfer contract; and
    maintaining the power transfer contract and performing an out-band reconnection procedure based on failure of the handover.

3. The method of claim 2, wherein the out-band reconnection procedure comprises:
    receiving a second packet including a random address from the device through the in-band communication; and
    registering the device related to the random address in a whitelist, and
    wherein the out-band reconnection procedure is performed with the device included in the whitelist.

4. The method of claim 3, wherein the out-band reconnection procedure is periodically repeated.

5. The method of claim 2, comprising:
    detecting a timeout of the out-band communication;
    determining whether the device supports the out-band communication based on the power transfer contract;
    determining an out-band communication connection state with the device based on the power transfer contract; and
    performing the out-band reconnection procedure based on the out-band communication being supported and the out-band communication being not connected,
    wherein based on the out-band communication being not supported, charging is stopped and the state machine is initialized.

6. The method of claim 5, comprising:
    transmitting a write request packet requesting to change communication based on the out-band communication being supported and the out-band communication being connected; and
    switching to the out-band communication based on reception of a response packet for the write request packet,
    wherein the charging is stopped and the state machine is initialized based on the response packet being not received.

7. The method of claim 1, wherein the first packet includes a handover flag, and wherein the first packet is received in a configuration phase of a state machine.

8. The method of claim 7, wherein the power transfer contract includes information on whether the device supports the out-band communication and information on an out-band communication connection state, wherein whether the out-band communication is supported is determined based on the handover flag, and wherein the power transfer contract is renewed based on the success of the out-band communication connection.

9. The method of claim 8, wherein the power transfer contract is renewed in a renegotiation phase of the state machine.

10. The method of claim 1, wherein the out-band communication is Bluetooth Low Energy (BLE) communication.

* * * * *